United States Patent
Stanek et al.

(10) Patent No.: US 12,465,657 B2
(45) Date of Patent: Nov. 11, 2025

(54) ENHANCED DELIVERY OF VIRAL PARTICLES TO THE STRIATUM AND CORTEX

(71) Applicant: Genzyme Corporation, Cambridge, MA (US)

(72) Inventors: Lisa M. Stanek, Bridgewater, NJ (US); Lamya S. Shihabuddin, West Newton, MA (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 17/816,139

(22) Filed: Jul. 29, 2022

(65) Prior Publication Data
US 2022/0395586 A1     Dec. 15, 2022

Related U.S. Application Data

(63) Continuation of application No. 15/549,962, filed as application No. PCT/US2016/017210 on Feb. 9, 2016, now abandoned.

(60) Provisional application No. 62/114,544, filed on Feb. 10, 2015, provisional application No. 62/220,997, filed on Sep. 19, 2015.

(51) Int. Cl.
| | | |
|---|---|---|
| A61K 48/00 | (2006.01) | |
| A61K 9/00 | (2006.01) | |
| C12N 7/00 | (2006.01) | |
| C12N 15/86 | (2006.01) | |

(52) U.S. Cl.
CPC ........ *A61K 48/0075* (2013.01); *A61K 9/0085* (2013.01); *C12N 7/00* (2013.01); *C12N 15/86* (2013.01); *C12N 2750/14122* (2013.01); *C12N 2750/14143* (2013.01); *C12N 2750/14152* (2013.01)

(58) Field of Classification Search
CPC .. A61K 48/0075; A61K 9/0085; A61K 48/00; C12N 7/00; C12N 15/86; C12N 2750/14122; C12N 2750/14143; C12N 2750/14152; A61P 25/00; A61P 25/08; A61P 25/14; A61P 25/16; A61P 25/28; A61P 43/00
See application file for complete search history.

(56) References Cited

U.S. PATENT DOCUMENTS

| | | |
|---|---|---|
| 4,692,147 A | 9/1987 | Duggan |
| 5,735,815 A | 4/1998 | Bair |
| 6,042,579 A | 3/2000 | Elsberry et al. |
| 6,566,118 B1 | 5/2003 | Atkinson et al. |
| 6,596,535 B1 | 7/2003 | Carter |
| 6,953,575 B2 | 10/2005 | Bankiewicz et al. |
| 6,989,264 B2 | 1/2006 | Atkinson et al. |
| 7,125,717 B2 | 10/2006 | Carter |
| 7,341,577 B2 | 3/2008 | Gill |
| 7,351,239 B2 | 4/2008 | Gill |
| 7,465,583 B2 | 12/2008 | Samulski et al. |
| 7,785,888 B2 | 8/2010 | Carter |
| 7,790,154 B2 | 9/2010 | Samulski et al. |
| 7,846,729 B2 | 12/2010 | Carter |
| 7,922,999 B2 | 4/2011 | Bankiewicz et al. |
| 8,093,054 B2 | 1/2012 | Carter |
| 8,137,948 B2 | 3/2012 | Qu et al. |
| 8,283,151 B2 | 10/2012 | Schmidt et al. |
| 8,361,457 B2 | 1/2013 | Samulski et al. |
| 11,957,765 B2 | 4/2024 | Passini |
| 2002/0141980 A1 | 10/2002 | Bankiewicz et al. |
| 2005/0032219 A1 | 2/2005 | Aubourg |
| 2006/0135945 A1 | 6/2006 | Bankiewicz et al. |
| 2007/0088295 A1* | 4/2007 | Bankiewicz ...... A61M 25/0662 604/523 |
| 2007/0259031 A1 | 11/2007 | Bankiewicz et al. |
| 2012/0066783 A1 | 3/2012 | Kay et al. |
| 2012/0164106 A1 | 6/2012 | Schaffer et al. |
| 2013/0323226 A1 | 12/2013 | Wilson et al. |
| 2019/0111157 A1* | 4/2019 | Stanek ................. A61K 9/0085 |
| 2022/0086972 A1 | 3/2022 | Wang et al. |

FOREIGN PATENT DOCUMENTS

| | | |
|---|---|---|
| BR | 112016025263 A2 | 2/2018 |
| CN | 104306986 A | 1/2015 |
| JP | 2022516295 A | 2/2022 |
| WO | WO-1999/061066 A2 | 12/1999 |
| WO | WO-2003/042397 A2 | 5/2003 |
| WO | WO-2006/042090 A1 | 4/2006 |
| WO | 2007024841 A2 | 3/2007 |
| WO | WO-2008/144585 A1 | 11/2008 |

(Continued)

OTHER PUBLICATIONS

Sanftner et al. "AAV2-mediated gene delivery to monkey putamen: evaluation of an infusion device and delivery parameters." Experimental neurology 194.2 (2005): 476-483 (Year: 2005).*
Matsushita et al. "Adeno-associated virus vectors can be efficiently produced without helper virus." Gene therapy 5.7 (1998): 938-945 (Year: 1998).*
Kells et al. "Efficient gene therapy-based method for the delivery of therapeutics to primate cortex." Proceedings of the National Academy of Sciences 106.7 (2009): 2407-2411 (Year: 2009).*
ACTB actin, beta [Gallus gallus (chicken) ] Gene ID: 396526, 4 pages.
Ayuso, E. et al. (Dec. 2010). "Production, Purification and Characterization of Adeno-Associated Vectors," Curr. Gene Ther. 10(6):423-436.

(Continued)

*Primary Examiner* — Fereydoun G Sajjadi
*Assistant Examiner* — Alexander W Nicol
(74) *Attorney, Agent, or Firm* — Morrison & Foerster LLP

(57) ABSTRACT

Provided herein are novel methods for delivering recombinant adeno-associated viral (rAAV) particles to the central nervous system of a mammal (e.g., a human). In aspects, the methods involve administering rAAV particles containing a heterologous nucleic acid to the striatum and causing expression of the heterologous nucleic acid in at least the cerebral cortex and the striatum of the mammal.

10 Claims, 18 Drawing Sheets

Specification includes a Sequence Listing.

(56) References Cited

FOREIGN PATENT DOCUMENTS

| WO | 2007024841 A3 | 4/2009 |
|---|---|---|
| WO | WO-2010/088560 A1 | 8/2010 |
| WO | WO-2010/148143 A1 | 12/2010 |
| WO | WO-2012/109667 A2 | 8/2012 |
| WO | WO-2015/168666 A2 | 11/2015 |

OTHER PUBLICATIONS

Bankiewicz, K. et al. (Jul. 2000). "Convection-Enhanced Delivery of AAV Vector in Parkinsonian Monkeys; In Vivo Detection of Gene Expression and Restoration of Dopaminergic Function Using Pro-Drug Approach," Exp. Neurol. 164(1):2-14.
Bevan, A. et al. (Nov. 2011, Aug. 2, 2011). "Systemic Gene Delivery in Large Species for Targeting Spinal Cord, Brain, and Peripheral Tissues for Pediatric Disorders," Mol. Ther. 19(11):1971-1980.
Boison, D. (Sep. 2010, e-pub. Jul. 15, 2010). "Inhibitory RNA in Epilepsy: Research Tool and Therapeutic Perspectives," Epilepsia 51(9):1659-1668, 16 pages.
Bossis, I. et al. (Jun. 2003). "Cloning of an Avian Adeno-Associated Virus (AAAV) and Generation of Recombinant AAAV Particles," J. Virol. 77(12):6799-6810.
Boulis, N. et al. (Dec. 2003). "Adeno-Associated Viral Vector Gene Expression in the Adult Rat Spinal Cord Following Remote Vector Delivery," Neurobiol. Dis. 14(3):535-541.
Conway, J. et al. (Nov. 1997). "Recombinant Adeno-Associated Virus Type 2 Replication and Packaging is Entirely Supported by a Herpes Simplex Virus Type 1 Amplicon Expressing Rep and Cap," J. el Virology 71(11):8780-8789.
Costantini, L. et al. (Jan. 2000). "Gene Therapy in the CNS," Gene Ther 7(2):93-109.
Davidson, B. et al. (Mar. 28, 2000, e-pub. Feb. 25, 2000). "Recombinant Adeno- Associated Virus Type 2, 4, and 5 Vectors: Transduction of Variant Cell Types and Regions in the Mammalian Central Nervous System," PNAS 97(7):3428-3432.
Dodiya, H. B. et al. (Mar. 1, 2010). "Differential Transduction Following Basal Ganglia Administration of Distinct Pseudotyped AAV Capsid Serotypes in Nonhuman Primates", Molecular Therapy 18(3):579-587.
Eberling, J. et al. (May 20, 2008, e-pub. Apr. 9, 2008). "Results from a Phase I Safety Trial of hAADC Gene Therapy for Parkinson Disease," Neurology 70(21):1980-1983.
Fiandaca, M. et al. (Aug. 2009, e-pub. Nov. 27, 2008). "Real-Time MR Imaging of Adeno-Associated Viral Vector Delivery to the Primate Brain," Neuroimage 47(Suppl 2): T27-T35, 18 pages.
Fiandaca, M. et al. (Jan. 2008, e-pub. Aug. 24, 2007). "Current Status of Gene Therapy Trials for Parkinson's Disease," Exp. Neurol. 209(1):51-57.
Forsayeth, J. et al. (Oct. 2006, e-pub. Jun. 16, 2006). "A Dose-Ranging Study of AAV-hAADC Therapy in Parkinsonian Monkeys," Mol Ther 14(4):571-577.
Fukuda, A. et al. (Sep. 2013, Sep. 5, 2013). "siRNA Treatment: "A Sword-in-the- Stone" for Acute Brain Injuries," Genes (Basel) 4(3):435-456, 22 pages.
Gao et al. (May 13, 2003, e-pub. Apr. 23, 2003). "Adeno-Associated Viruses Undergo Substantial Evolution in Primates During Natural Infections," PNAS 100(10):6081-6086.
Gao, G. et al. (Jun. 2004). "Clades of Adeno-Associated Viruses are Widely Disseminated in Human Tissues" J. Viral. 78(12):6381-6388.
Gao, G. et al. (Sep. 3, 2002, e-pub. Aug. 21, 2002). "Novel Adeno-Associated Viruses from Rhesus Monkeys as Vectors for Human Gene Therapy," PNAS 99(18):11854-11856.
Hadaczek P et al. (Mar. 1, 2006). "Convection-Enhanced Delivery of Adeno-Associated Virus Type 2 (AAV2) into the Striatum and Transport of AAV2 Within Monkey Brain", *Human Gene Therapy*, 17(3):291-302.
Hadaczek, P. et al. (Mar. 1, 2009). "Transduction of Nonhuman Primate Brain with Adeno-Associated Virus Serotype 1: Vector Trafficking and Immune Response", Human Gene Therapy 20(3):225-237.
Harper, S. et al. (Apr. 19, 2005, e-pub. Apr. 5, 2005). "RNA Interference Improves Motor and Neuropathological Abnormalities in a Huntington's Disease Mouse Model," Proc. Natl. Acad. Sci. USA 102(16):5820-5825.
Hauck, B. et al. (Jan. 2009, e-pub. Oct. 21, 2008). "Undetectable Transcription of Cap in a Clinical AAV Vector: Implications for Preformed Capsid in Immune Responses," Mol. Ther. 17(1):144-152.
International Preliminary Report on Patentability mailed Aug. 15, 2017, for PCT Application No. PCT/US2016/017210, filed Feb. 9, 2016, 13 pages.
International Search Report and Written Opinion of the International Searching Authority mailed Oct. 13, 2016, for PCT Application No. PCT/US2016/017210, filed Feb. 9, 2016, 25 pages.
Kaplitt, M. et al. (Jun. 23, 2007). "Safety And Tolerability Of Gene Therapy With An Adeno-Associated Virus (AAV) Borne GAD Gene For Parkinson's Disease: An Open Label, Phase I Trial," Lancet 369(9579):2097-2105.
Kaspar, B. et al. (Aug. 8, 2003). "Retrograde Viral Delivery of IGF-1 Prolongs Survival in a Mouse ALS Model," Science 301(5634):839-842.
Kaspar, B. et al. (Jan. 2002). "Targeted Retrograde Gene Delivery for Neuronal Protection," Mol. Ther. 5(1):50-56.
Kotin, R. (Jul. 1994). "Prospects for the Use of Adeno-Associated Virus as a Vector for Human Gene Therapy," Hum. Gene Ther. 5(7):793-801.
Krauze, M. et al. (2009). "Convection-Enhanced Delivery of Liposomes to Primate Brain," Methods Enzymol. 465:349-362.
Machida, Y. et al. (Apr. 28, 2006, e-pub Mar. 6, 2006). "rAAV-Mediated shRNA Ameliorated Neuropathology in Huntington Disease Model Mouse," Biochem. Bio phys. Res. Commun. 343(1):190-197.
Martin, J. et al. (Aug. 2013, e-pub. Aug. 9, 2013). "Generation and Characterization of Adeno-Associated Virus Producer Cell Lines for Research and Preclinical Vector Production," Human Gene Therapy Methods 24(4):253-269.
Miyazaki, J. et al. (Jul. 15, 1989). "Expression Vector System Based on the Chicken Beta-Actin Promoter Directs Efficient Production of Interleukin-5," Gene 79(2):269-277.
Nguyen, T. et al. (Mar. 2003). "Convective Distribution of Macromolecules in the Primate Brain Demonstrated Using Computerized Tomography and Magnetic Resonance Imaging," J. Neurosurg. 98(3):584-590.
Passini, M. et al. (Jun. 2003). "Intraventricular Brain Injection of Adeno-Associated Virus Type 1 (AAV1) in Neonatal Mice Results in Complementary Patterns of Neuronal Transduction to AAV2 and Total Long-Term Correction of Storage Lesions in the Brains of β-Glucuronidase-Deficient Mice," J. Virol. 77(12):7034-7040.
Pechan, P. et al. (Jan. 2009, e-pub. Jul. 17, 2008). "Novel Anti-VEGF Chimeric Molecules Delivered by AAV Vectors for Inhibition of Retinal Neovascularization," Gene Ther. 16(1):10-16.
Pouladi, M. et al. (May 15, 2012, e-pub. Feb. 9, 2012). "Marked Differences in Neurochemistry and Aggregates Despite Similar Behavioural and Neuropathological Features of Huntington Disease in the Full-Length BACHD and YAC128 Mice," Hum. Mol.Genet. 21(10):2219-2232.
Qu, G. et al. (Mar. 2007, e-pub. Dec. 28, 2006). "Separation of Adeno-Associated Virus Type 2 Empty Particles from Genome Containing Vectors by Anion-Exchange Column Chromatography," J. Virol. Methods 140(1-2):183-192.
Ramaswamy, S. et al. (2007). "Animal Models of Huntington's Disease," ILAR J. 48(4):356-373.
Ramaswamy, S. et al. (Apr. 1, 2009). "Intrastriatal, CERE-120 (AAV-Neurturin) Protects Striatal And Cortical Neurons And Delays Motor Deficits In A Transgenic Mouse Model Of Huntington's Disease", *Neurobiology of Disease, Blackwell Scientific Publications*, Oxford, GB, 34(1):40-50.

(56) References Cited

OTHER PUBLICATIONS

Richardson, R. et al. (Jul. 2011, e-pub. Mar. 23, 2011). "T2 Imaging in Monitoring of Intraparenchymal Real-Time Convection-Enhanced Delivery," Neurosurgery 69(1):154-163.
Richardson, R. et al. (Jun. 2011, e-pub. Apr. 14, 2011). "Novel Platform for MRI-Guided Convection-Enhanced Delivery of Therapeutics: Preclinical Validation in Nonhuman Primate Brain," Stereotact. Funct. Neurosurg. 89(3):141-151.
Richardson, R. et al. (Jun. 2011, e-pub. Feb. 22, 2011). "Interventional MRI-Guided Putaminal Delivery of AAV2-GDNF for a Planned Clinical Trial in Parkinson's Disease," Mol. Ther. 19(6):1048-1057.
Rodriguez-Lebron, E. et al. (Oct. 2005). "Intrastriatal rAAV-Mediated Delivery of Anti-huntingtin shRNAs Induces Partial Reversal of Disease Progression in R6/1 Huntington's Disease Transgenic Mice," Mol. Ther. 12(4):618-633, 27 pages.
Saito, R. el al. (May 2011). "Regression of Recurrent Glioblastoma Infiltrating the Brainstem After Convection-Enhanced Delivery of Nimustine Hydrochloride," J Neurosurg Pediatr 7(5):522-526.
San Sebastian, W. et al: (Dec. 26, 2013). "Adeno-Associated Virus Type 6 is Retrogradely Transported in the Non-Human Primate Brain", *Gene Therapy* 20(12):1178-1183.
Shifang, L. (Oct. 31, 2005). "Application Of Recombinant Adeno-Associated Virus Vectors In Gene Transfer To Central Nervous System", Chinese Journal Of Neurology 4(10):1062-1065, 11 pages. (English Translation).
Slow, E. et al. (Jul. 1, 2003). "Selective Striatal Neuronal Loss in a YAC128 Mouse Model of Huntington Disease," Hum. Mol. Genet. 12(13):1555-1567.
Sondhi, D. et al. (2005). "AAV2-mediated CLN2 Gene Transfer to Rodent and Non-Human Primate Brain Results in Long-Term TPP-I Expression Compatible with Therapy for LINCL," *Gene Therapy* 12:1618-1632.
Stanek, L et al. (May 1, 2014). "Silencing Mutant Huntingtin by Adeno-Associated Virus- Mediated RNA Interference Ameliorates Disease Manifestations in the YAC128 Mouse Model of Huntington's Disease," *Human Gene Therapy* 25(5):461-474.
Thorne, B. et al. (Jul. 2009). "Manufacturing Recombinant Adeno-Associated Viral Vectors from Producer Cell Clones," Human Gene Therapy 20(7):707-714.
Van Der Bom, I. M. J. et al. (Dec. 31, 2013). "Finding the Striatum in Sheep: Use of a Multi-Modal Guided Approach for Convection Enhanced Delivery", Journal of Huntington's Disease 2(1):41-45.

Vite, C.H. et al. (2003). Adeno-Associated Virus Vector-Mediated Transduction in the Cat Brain, *Gene Therapy* 10(22):1874-1881.
Von Horsten, S. et al. (Mar. 15, 2003). "Transgenic Rat Model of Huntington's Disease," Hum. Mol. Genet. 12(6):617-624.
Wang, C. et al. (Dec. 31, 2003). "Recombinant AAV Serotype 1 Transduction Efficiency And Tropism In The Murine Brain", Gene Therapy 10(17):1528-1534.
Wang, N. et al. (May 2014, e-pub. Apr. 28, 2014). "Neuronal Targets of Mutant Huntingtin Genetic Reduction to Ameliorate Huntington's Disease Pathogenesis in Mice," Nature medicine 20(5):536-541, 16 pages.
Wang, Z. et al. (Dec. 2003). "Rapid and Highly Efficient Transduction by Double-Stranded Adeno-Associated Virus Vectors In Vitro and In Vivo," Gene Ther 10(26):2105-2111.
Xiao, X. et al. (Mar. 1998). "Production of High-Titer Recombinant Adeno-Associated Virus Vectors in the Absence of Helper Adenovirus," J Virol. 72(3):2224-2232.
Yang, S.H. et al. (Jun. 12, 2008, e-pub. May 18, 2008). "Towards a Transgenic Model of Huntington's Disease in a Non-Human Primate," Nature 453(7197):921-924.
Zhang, S. et al. (2012). "Transduction of Striatum and Cortex Tissues by Adeno-Associated Viral Vectors Produced by Herpes Simplex Virus-and Baculovirus-based Methods," *J Virol Meth.* 179(1):276-280.
Zhong, L. et al. (Jun. 3, 2008, e-pub. May 29, 2008). "Next Generation of Adeno-Associated Virus 2 Vectors: Point Mutations in Tyrosines Lead to High-Efficiency Transduction at Lower Doses," Proc Natl Acad Sci USA 105(22):7827-7832.
European Extended Search Report mailed on Jul. 21, 2023, for EP Application No. 23150591.8, filed on Jan. 6, 2023, 12 pages.
Hadaczek, P. et al. (2016, e-pub. Jun. 29, 2016). "Widespread AAV1-And AAV2-Mediated Transgene Expression In The Nonhuman Primate Brain: Implications For Huntington's Disease," Molecular Therapy-Methods & Clinical Development 3(16037):1-11.
Huang, X. et al. (Nov. 2013). "AAV2 Production with Optimized N/P Ration and PEI-mediated Transfection Results in low Toxicity and High Titer for In Vitro and In Vivo Application," J. Virol. Methods 193(2):270-277, 18 pages.
San Sebastian, W. et al. (Feb. 2012, e-pub. Oct. 21, 2011). "Safety and Tolerability of Magnetic Resonance Imaging-Guided Convection-Enhanced Delivery of AAV2-hAADC with a Novel Delivery Platform in Nonhuman Primate Striatum," Human Gene Therapy 23(2):210-217.

* cited by examiner

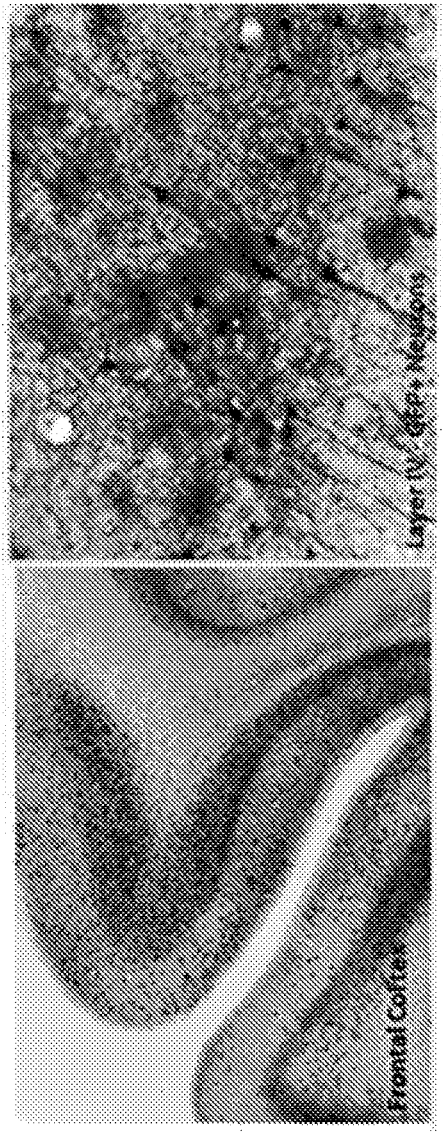
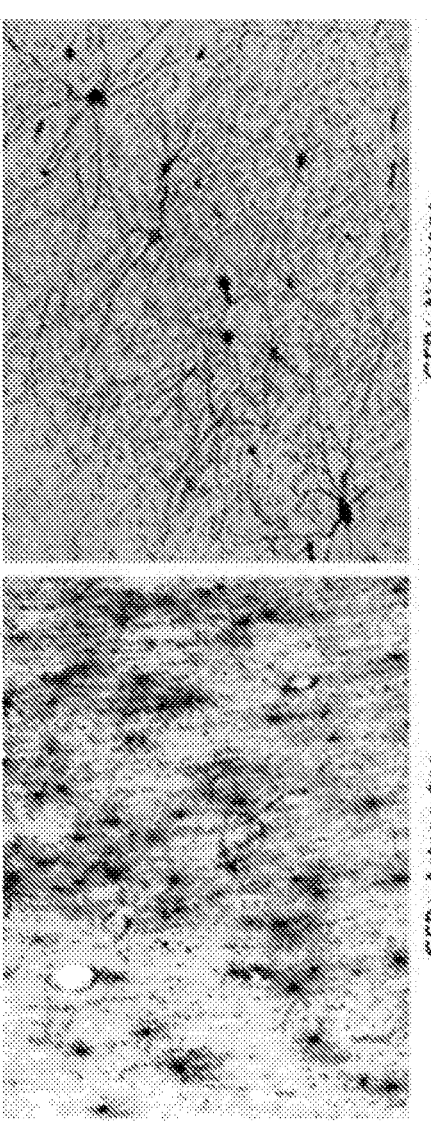
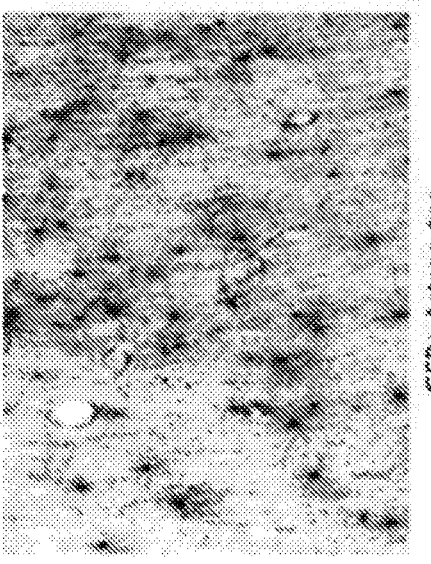

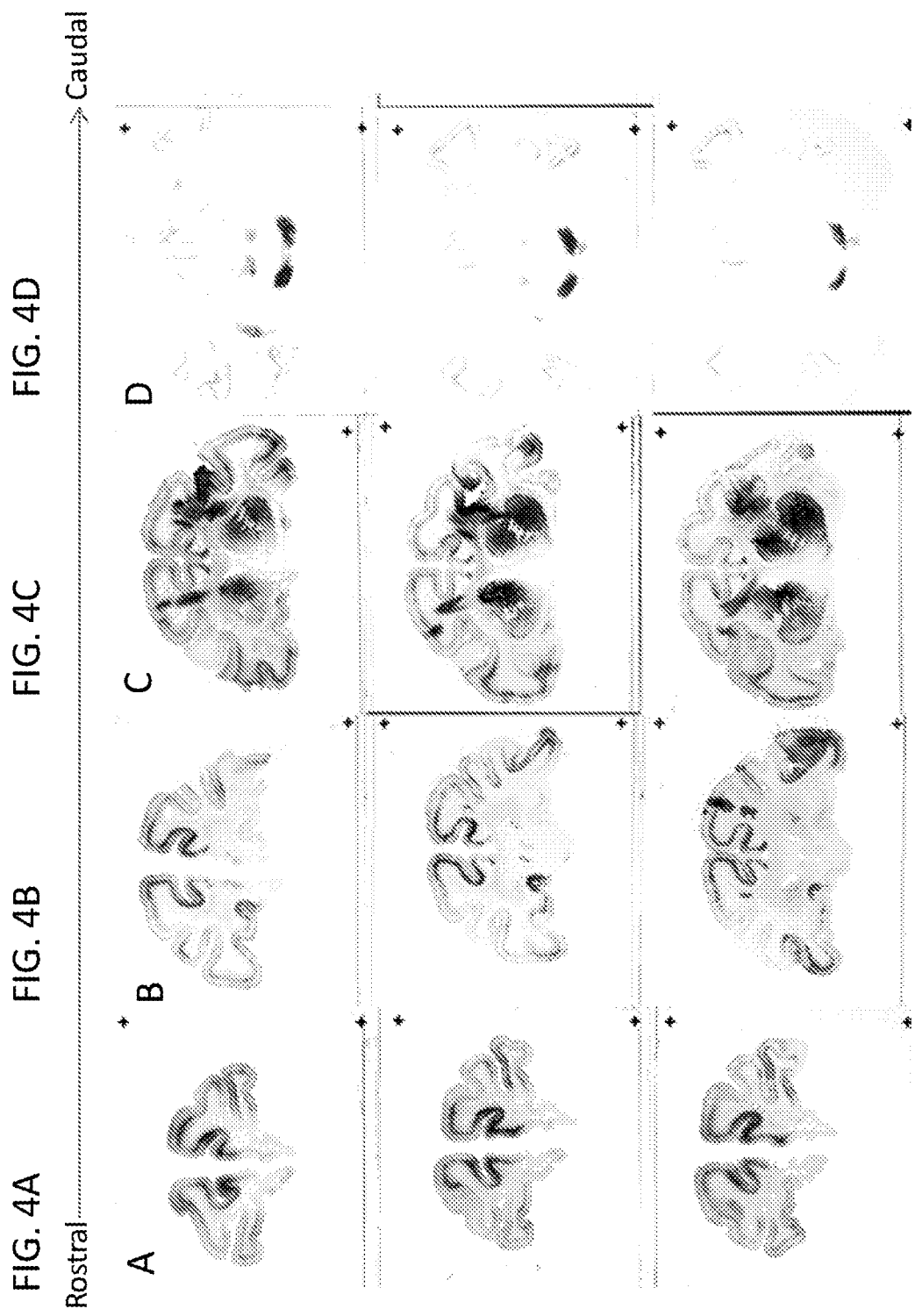

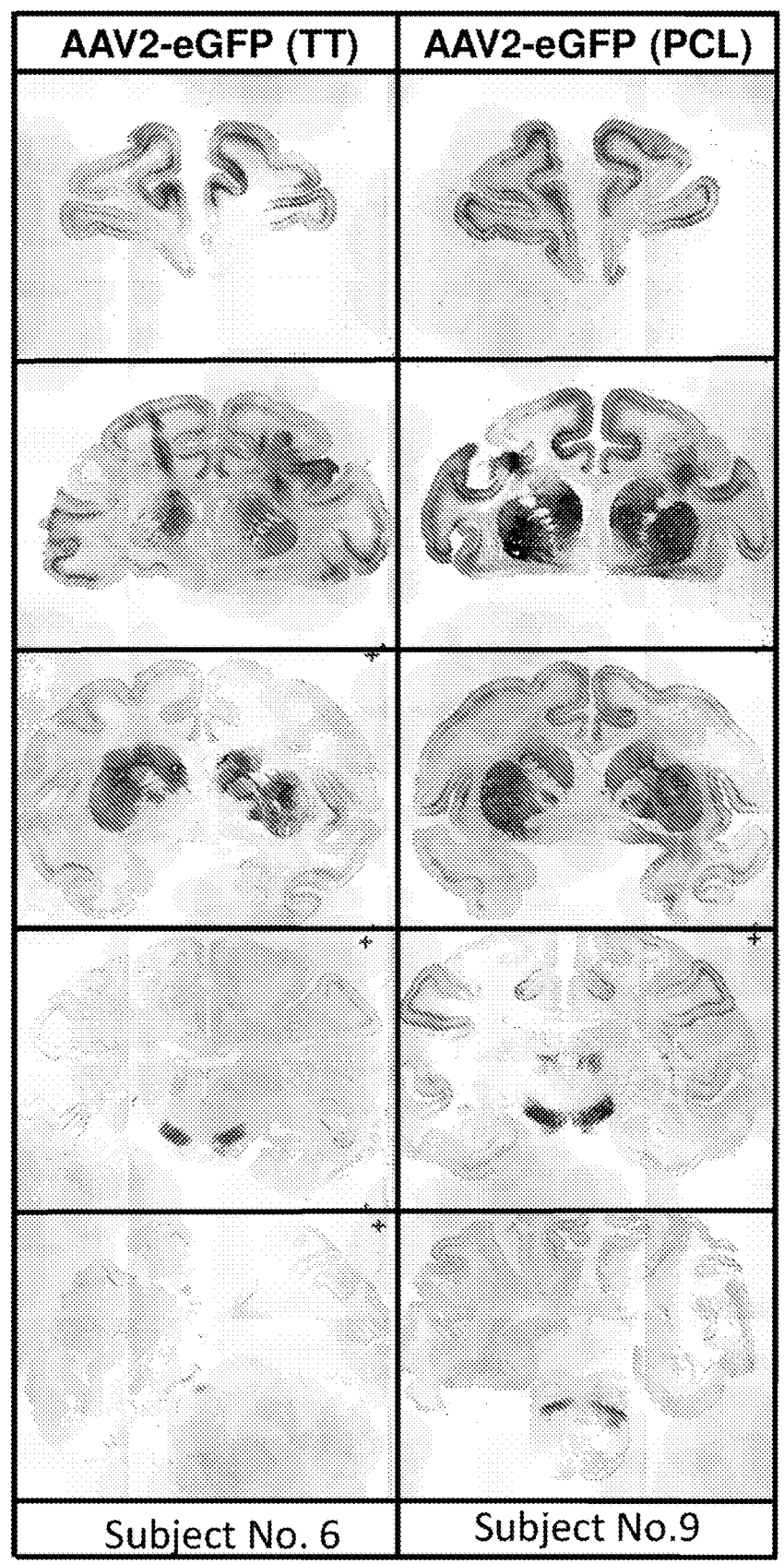
FIG. 7 (cont.'d)

SEQUENCE LISTING

```
Sequence total quantity: 1
SEQ ID NO: 1            moltype = DNA  length = 78
FEATURE                 Location/Qualifiers
source                  1..78
                        mol_type = other DNA
                        organism = synthetic construct
SEQUENCE: 1
cactccctct ctgcgcgctc gctcgctcac tgaggccggg cgaccaaagg tcgcccacgc   60
ccgggctttg cccgggcg                                                 78
```

ENHANCED DELIVERY OF VIRAL PARTICLES TO THE STRIATUM AND CORTEX

CROSS-REFERENCE TO RELATED APPLICATIONS

This application is a continuation of U.S. patent application Ser. No. 15/549,962, which adopts the international filing date of Feb. 9, 2016, which is a National Phase application under 35 U.S.C. § 371 of International Application No. PCT/US2016/017210 filed Feb. 9, 2016, which claims priority to U.S. Provisional Application No. 62/114,544, filed Feb. 10, 2015, and U.S. Provisional Application No. 62/220,997, filed Sep. 19, 2015, each of which is incorporated herein by reference in its entirety.

SUBMISSION OF SEQUENCE LISTING

The contents of the electronic sequence listing (159792012701SEQLIST.xml; Size: 1,980 bytes; and Date of Creation: Jul. 26, 2022) is herein incorporated by reference in its entirety.

FIELD OF THE INVENTION

The present invention relates to the delivery of AAV gene therapy vectors to the brain, e.g., the striatum and/or cortex.

SUMMARY OF THE INVENTION

Adeno-associated virus (AAV)-based vectors have become the preferred vector system for neurologic gene therapy, with an excellent safety record established in multiple clinical trials (Kaplitt et al., (2007) *Lancet* 369:2097-2105; Eberling et al., (2008) *Neurology* 70:1980-1983; Fiandaca et al., (2009) *Neuroimage* 47 Suppl. 2:T27-35). Effective treatment of neurologic disorders has been hindered by problems associated with the delivery of AAV vectors to affected cell populations. This delivery issue has been especially problematic for disorders involving the cerebral cortex. Simple injections do not distribute AAV vectors effectively, relying on diffusion, which is effective only within a 1- to 3-mm radius. An alternative method, convection-enhanced delivery (CED) (Nguyen et al., (2003) *J. Neurosurg.* 98:584-590), has been used clinically in gene therapy (AAV2-hAADC) for Parkinson's disease (Fiandaca et al., (2008) *Exp. Neurol.* 209:51-57). The underlying principle of CED involves pumping infusate into brain parenchyma under sufficient pressure to overcome the hydrostatic pressure of interstitial fluid, thereby forcing the infused particles into close contact with the dense perivasculature of the brain. Pulsation of these vessels acts as a pump, distributing the particles over large distances throughout the parenchyma (Hadaczek et al., (2006) *Hum. Gene Ther.* 17:291-302). To increase the safety and efficacy of CED a reflux-resistant cannula (Krauze et al., (2009) *Methods Enzymol.* 465:349-362) can be employed along with monitored delivery with real-time MRI. Monitored delivery allows for the quantification and control of aberrant events, such as cannula reflux and leakage of infusate into ventricles (Eberling et al., (2008) *Neurology* 70:1980-1983; Fiandaca et al., (2009) *Neuroimage* 47 Suppl. 2:T27-35; Saito et al., (2011) *Journal of Neurosurgery Pediatrics* 7:522-526). However, there is still a need for improved procedures to achieve widespread expression of AAV vectors in the cortex and/or striatum.

The invention provides a method for delivering a recombinant adeno-associated viral (rAAV) particle to the central nervous system of a mammal comprising administering the rAAV particle to the striatum, wherein the rAAV particle comprises a rAAV vector encoding a heterologous nucleic acid that is expressed in at least the cerebral cortex and striatum of the mammal. In some aspects, the invention provides a method for delivering a rAAV particle to the central nervous system of a mammal comprising administering the rAAV particle to the striatum, wherein the rAAV particle comprises an rAAV vector encoding a heterologous nucleic acid that is expressed in at least the cerebral cortex and striatum of the mammal and wherein the rAAV particle comprises an AAV serotype 1 (AAV1) capsid. In some aspects, the invention provides a method for delivering a rAAV particle to the central nervous system of a mammal comprising administering the rAAV particle to the striatum, wherein the rAAV particle comprises an rAAV vector encoding a heterologous nucleic acid that is expressed in at least the cerebral cortex and striatum of the mammal and wherein the rAAV particle comprises an AAV serotype 2 (AAV2) capsid. In some embodiments, the mammal is a human.

In some embodiments, the rAAV particle is administered to at least the putamen and the caudate nucleus of the striatum. In some embodiments, the rAAV particle is administered to at least the putamen and the caudate nucleus of each hemisphere of the striatum. In some embodiments, the rAAV particle is administered to at least one site in the caudate nucleus and two sites in the putamen. In some embodiments, the ratio of rAAV particles administered to the putamen to rAAV particles administered to the caudate nucleus is at least about 2:1. In some embodiments, the heterologous nucleic acid is expressed in at least the frontal cortex, occipital cortex, and/or layer IV of the mammal. In some embodiments, the heterologous nucleic acid is expressed at least in the prefrontal association cortical areas, the premotor cortex, the primary somatosensory cortical areas, sensory motor cortex, parietal cortex, occipital cortex, and/or primary motor cortex. In some embodiments, the rAAV particle undergoes retrograde or anterograde transport in the cerebral cortex. In some embodiments, the heterologous nucleic acid is further expressed in the thalamus, subthalamic nucleus, globus pallidus, substantia nigra and/or hippocampus. In some embodiments, the rAAV particle is administered to the caudate nucleus and the putamen at a rate of greater than 1 µL/min to about 5 µL/min.

In some embodiments of the above aspects and embodiments, the rAAV particle comprises an AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV2/2-7m8, AAV DJ, AAV2 N587A, AAV2 E548A, AAV2 N708A, AAV V708K, a goat AAV, AAV1/AAV2 chimeric, bovine AAV, or mouse AAV capsid rAAV2/HBoV1 serotype capsid. In some embodiments, the AAV serotype is AAV1, AAV2, AAV5, AAV6, AAV7, AAV8, AAVrh8, AAVrh8R, AAV9, AAV10, or AAVrh10. In some embodiments, the rAAV vector comprises the heterologous nucleic acid flanked by one or more AAV inverted terminal repeat (ITR) sequences. In some embodiments, the heterologous nucleic acid is flanked by two AAV ITRs. In some embodiments, the AAV ITRs are AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV DJ, a goat AAV, bovine AAV, or mouse AAV serotype ITRs. In some embodiments, the AAV ITRs are AAV2 ITRs. In some embodiments, the ITR and the capsid of the rAAV particle are derived from the same AAV serotype. In some embodiments, the ITR and the capsid are derived from AAV2. In other embodiments, the ITR and the capsid of the rAAV viral particles are derived from different AAV serotypes. In some embodiments, the ITR is derived from AAV2 and the capsid is derived from AAV1.

In some embodiments of the above aspects and embodiments, the heterologous nucleic acid is operably linked to a promoter. In some embodiments, the promoter expresses the heterologous nucleic acid in a cell of the CNS. In some embodiments, the promoter expresses the heterologous nucleic acid in a brain cell. In some embodiments, the promoter expresses the heterologous nucleic acid in a neuron and/or a glial cell. In some embodiments, the neuron is a medium spiny neuron of the caudate nucleus, a medium spiny neuron of the putamen, a neuron of the cortex layer IV and/or a neuron of the cortex layer V. In some embodiments, the glial cell is an astrocyte. In some embodiments, the promoter is a CBA promoter, a minimum CBA promoter, a CMV promoter or a GUSB promoter. In other embodiments, the promoter is inducible. In further embodiments, the rAAV vector comprises one or more of an enhancer, a splice donor/splice acceptor pair, a matrix attachment site, or a polyadenylation signal. In some embodiments, the rAAV vector is a self-complementary rAAV vector. In some embodiments, the vector comprises a first nucleic acid sequence encoding the heterologous nucleic acid and a second nucleic acid sequence encoding a complement of the heterologous nucleic acid, wherein the first nucleic acid sequence can form intrastrand base pairs with the second nucleic acid sequence along most or all of its length. In some embodiments, the first nucleic acid sequence and the second nucleic acid sequence are linked by a mutated AAV ITR, wherein the mutated AAV ITR comprises a deletion of the D region and comprises a mutation of the terminal resolution sequence.

In some embodiments of the above aspects and embodiments, the heterologous nucleic acid encodes a therapeutic polypeptide or therapeutic nucleic acid. In some embodiments, the heterologous nucleic acid encodes a therapeutic polypeptide. In some embodiments, the therapeutic polypeptide is an enzyme, a neurotrophic factor, a polypeptide that is deficient or mutated in an individual with a CNS-related disorder, an antioxidant, an anti-apoptotic factor, an anti-angiogenic factor, and an anti-inflammatory factor, alpha-synuclein, acid beta-glucosidase (GBA), beta-galactosidase-1 (GLB1), iduronate 2-sulfatase (IDS), galactosylceramidase (GALC), a mannosidase, alpha-D-mannosidase (MAN2B1), beta-mannosidase (MANBA), pseudoarylsulfatase A (ARSA), N-acetylglucosamine-1-phosphotransferase (GNPTAB), acid sphingomyelinase (ASM), Niemann-Pick C protein (NPC1), acid alpha-1,4-glucosidase (GAA), hexosaminidase beta subunit, HEXB, N-sulfoglucosamine sulfohydrolase (MPS3A), N-alpha-acetylglucosaminidase (NAGLU), heparin acetyl-CoA, alpha-glucosaminidase N-acetyltransferase (MPS3C), N-acetylglucosamine-6-sulfatase (GNS), alpha-N-acetylgalactosaminidase (NAGA), beta-glucuronidase (GUSB), hexosaminidase alpha subunit (HEXA), huntingtin (HTT), lysosomal acid lipase (LIPA), Aspartylglucosaminidase, Alpha-galactosidase A, Palmitoyl protein thioesterase, Tripeptidyl peptidase, Lysosomal transmembrane protein, Cysteine transporter, Acid ceramidase, Acid alpha-L-fucosidase, cathepsin A, alpha-L-iduronidase, Arylsulfatase B, Arylsulfatase A, N-acetylgalactosamine-6-sulfate, Acid beta-galactosidase, or alpha-neuramidase. In other embodiments, the heterologous nucleic acid encodes a therapeutic nucleic acid. In some embodiments, the therapeutic nucleic acid is an siRNA, an shRNA, an RNAi, an miRNA, an antisense RNA, a ribozyme or a DNAzyme. In some embodiments, the therapeutic polypeptide or the therapeutic nucleic acid is used to treat a disorder of the CNS.

In some embodiments of the above aspects and embodiments, the disorder of the CNS is a lysosomal storage disease (LSD), Huntington's disease, epilepsy, Parkinson's disease, Alzheimer's disease, stroke, corticobasal degeneration (CBD), corticogasal ganglionic degeneration (CBGD), frontotemporal dementia (FTD), multiple system atrophy (MSA), progressive supranuclear palsy (PSP) or cancer of the brain. In some embodiments, the disorder is a lysosomal storage disease selected from the group consisting of Aspartylglusoaminuria, Fabry, Infantile Batten Disease (CNL1), Classic Late Infantile Batten Disease (CNL2), Juvenile Batten Disease (CNL3), Batten form CNL4, Batten form CNL5, Batten form CNL6, Batten form CNL7, Batten form CNL8, Cystinosis, Farber, Fucosidosis, Galactosidosialidosis, Gaucher disease type 1, Gaucher disease type 2, Gaucher disease type 3, GM1 gangliosidosis, Hunter disease, Krabbe disease, a mannosidosis disease, β mannosidosis disease, Maroteaux-Lamy, metachromatic leukodystrophy disease, Morquio A, Morquio B, mucolipidosis II/III disease, Niemann-Pick A disease, Niemann-Pick B disease, Niemann-Pick C disease, Pompe disease, Sandhoff disease, Sanfillipo A disease, Sanfillipo B disease, Sanfillipo C disease, Sanfillipo D disease, Schindler disease, Schindler-Kanzaki, sialidosis, Sly disease, Tay-Sachs disease, and Wolman disease.

In some embodiments of the above aspects and embodiments, the rAAV particle is in a composition. In further embodiments, the composition is a pharmaceutical composition comprising a pharmaceutically acceptable excipient.

In some embodiments of the above aspects and embodiments, the rAAV particle was produced by triple transfection of a nucleic acid encoding the rAAV vector, a nucleic acid encoding AAV rep and cap, and a nucleic acid encoding AAV helper virus functions into a host cell, wherein the transfection of the nucleic acids to the host cells generates a host cell capable of producing rAAV particles. In other embodiments, the rAAV particle was produced by a producer cell line comprising one or more of nucleic acid encoding the rAAV vector, a nucleic acid encoding AAV rep and cap, and a nucleic acid encoding AAV helper virus functions.

In some embodiments of the above aspects and embodiments, the rAAV particle is delivered by stereotactic delivery. In some embodiments, the rAAV particle is delivered by convection enhanced delivery. In some embodiments, the rAAV particle is delivered using a CED delivery system. In some embodiments, the CED system comprises a cannula. In some embodiments, the cannula is a reflux-resistant cannula or a stepped cannula. In some embodiments, the CED system comprises a pump. In some embodiments, the pump is a manual pump. In some embodiments, the pump is an osmotic pump. In some embodiments, the pump is an infusion pump.

In some aspects, the invention provides a method for delivering rAAV particles to the central nervous system of a mammal comprising administering a composition comprising the rAAV particles to the striatum by CED, wherein the composition is administered to the striatum at a rate of greater than 1 μL/min to about 5 μL/min. In some aspects, the invention provides a method for delivering rAAV particles to the central nervous system of a mammal comprising administering a composition comprising the rAAV particles to the striatum by CED, wherein the composition comprises rAAV particles and poloxamer. In some embodiments, the poloxamer is poloxamer 188. In some embodiments, the concentration of poloxamer in the composition is ranges from about 0.0001% to about 0.01%. In some embodiments, the concentration of poloxamer in the composition is about 0.001%. In some embodiments, the composition further comprises sodium chloride, wherein the concentration of sodium chloride in the composition ranges from about 100 mM to about 250 mM. In some embodiments, the concentration of sodium chloride in the composition is about 180 mM. In some embodiments, the composition further comprises sodium phosphate, wherein the concentration of sodium phosphate in the composition ranges from about 5 mM to about 20 mM and the pH is about 7.0 to about 8.0. In some embodiments, the composition further comprises sodium phosphate, wherein the concentration of sodium phosphate in the composition is about 10 mM and the pH is about 7.5. In some embodiments, the composition is administered to the caudate nucleus and the putamen at a rate of greater than 1 µL/min to about 5 µL/min. In some embodiments, the amount of the composition delivered to the putamen is about twice the volume delivered to the caudate nucleus. In some embodiments, about 20 µL to about 50 µL of the composition is administered to the caudate nucleus of each hemisphere and about 40 µL to about 100 µL of the composition is administered to the putamen of each hemisphere. In some embodiments, about 30 µL of the composition is administered to the caudate nucleus of each hemisphere and about 60 µL of the composition is administered to the putamen of each hemisphere.

In some embodiments, the invention provides a method of treating a disorder of the CNS in a mammal comprising administering an effective amount of a rAAV particle to the mammal by the methods described above.

In some aspects, the invention provides a method of treating Huntington's Disease in a mammal comprising administering an effective amount of a rAAV particle to the striatum, wherein the rAAV particle comprises an rAAV vector encoding a heterologous nucleic acid that is expressed in at least the cerebral cortex and striatum of the mammal. In some embodiments, the rAAV particle comprises an AAV1 capsid or an AAV2 capsid. In other aspects, the invention provides a method of treating Parkinson's disease in a mammal comprising administering an effective amount of a rAAV particle to the striatum, wherein the rAAV particle comprises a rAAV vector encoding a heterologous nucleic acid that is expressed in at least the cerebral cortex and striatum of the mammal. In some embodiments, the rAAV particle comprises an AAV2 capsid. In some embodiments, the mammal is a human.

In some embodiments, the rAAV particle is administered to at least the putamen and the caudate nucleus of the striatum. In some embodiments, the rAAV particle is administered to at least the putamen and the caudate nucleus of each hemisphere of the striatum. In some embodiments, the rAAV particle is administered to at least one site in the caudate nucleus and two sites in the putamen. In some embodiments, the ratio of rAAV particles administered to the putamen to rAAV particles administered to the caudate nucleus is at least about 2:1. In some embodiments, the heterologous nucleic acid is expressed in at least the frontal cortex, occipital cortex, and/or layer IV of the mammal. In some embodiments, the heterologous nucleic acid is expressed at least in the prefrontal association cortical areas, the premotor cortex, the primary somatosensory cortical areas, sensory motor cortex, parietal cortex, occipital cortex, and/or primary motor cortex. In some embodiments, the rAAV particle undergoes retrograde or anterograde transport in the cerebral cortex. In some embodiments, the heterologous nucleic acid is further expressed in the thalamus, subthalamic nucleus, globus pallidus, substantia nigra and/or hippocampus.

In some embodiments of the above aspects and embodiments, the rAAV particle comprises an AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV2/2-7m8, AAV DJ, AAV2 N587A, AAV2 E548A, AAV2 N708A, AAV V708K, a goat AAV, AAV1/AAV2 chimeric, bovine AAV, or mouse AAV capsid rAAV2/HBoV1 serotype capsid. In some embodiments, the AAV serotype is AAV1, AAV2, AAV5, AAV6, AAV7, AAV8, AAVrh8, AAVrh8R, AAV9, AAV10, or AAVrh10. In some embodiments, the rAAV vector comprises the heterologous nucleic acid flanked by one or more AAV inverted terminal repeat (ITR) sequences. In some embodiments, the heterologous nucleic acid is flanked by two AAV ITRs. In some embodiments, the AAV ITRs are AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV DJ, a goat AAV, bovine AAV, or mouse AAV serotype ITRs. In some embodiments, the AAV ITRs are AAV2 ITRs. In some embodiments, the ITR and the capsid of the rAAV particle are derived from the same AAV serotype. In some embodiments, the ITR and the capsid are derived from AAV2. In other embodiments, the ITR and the capsid of the rAAV viral particles are derived from different AAV serotypes. In some embodiments, the ITR is derived from AAV2 and the capsid is derived from AAV1.

In some embodiments of the above aspects and embodiments, the heterologous nucleic acid is operably linked to a promoter. In some embodiments, the promoter expresses the heterologous nucleic acid in a cell of the CNS. In some embodiments, the promoter expresses the heterologous nucleic acid in a brain cell. In some embodiments, the promoter expresses the heterologous nucleic acid in a neuron and/or a glial cell. In some embodiments, the neuron is a medium spiny neuron of the caudate nucleus, a medium spiny neuron of the putamen, a neuron of the cortex layer IV and/or a neuron of the cortex layer V. In some embodiments, the glial cell is an astrocyte. In some embodiments, the promoter is a CBA promoter, a minimum CBA promoter, a CMV promoter or a GUSB promoter. In other embodiments, the promoter is inducible. In further embodiments, the rAAV vector comprises one or more of an enhancer, a splice donor/splice acceptor pair, a matrix attachment site, or a polyadenylation signal. In some embodiments, the rAAV vector is a self-complementary rAAV vector. In some embodiments, the vector comprises a first nucleic acid sequence encoding the heterologous nucleic acid and a second nucleic acid sequence encoding a complement of the heterologous nucleic acid, wherein the first nucleic acid sequence can form intrastrand base pairs with the second nucleic acid sequence along most or all of its length. In some embodiments, the first nucleic acid sequence and the second nucleic acid sequence are linked by a mutated AAV ITR, wherein the mutated AAV ITR comprises a deletion of the D region and comprises a mutation of the terminal resolution sequence.

In some embodiments of the above aspects and embodiments, the heterologous nucleic acid encodes a therapeutic polypeptide or therapeutic nucleic acid. In some embodiments, the therapeutic polypeptide or the therapeutic nucleic acid inhibits the expression of HTT or inhibits the accumulation of HTT in cells of the CNS of the mammal with Huntington's disease. In some embodiments, the heterologous nucleic acid encodes an siRNA, an shRNA, an RNAi, an miRNA, an antisense RNA, a ribozyme or a DNAzyme. In some embodiments, the heterologous nucleic acid encodes a miRNA that targets huntingtin. In some embodiments, the huntingtin comprises a mutation associated with Huntington's disease.

In some embodiments of the above aspects and embodiments, the heterologous nucleic acid encodes a therapeutic polypeptide or therapeutic nucleic acid for treating Huntington's disease. In some embodiments, the therapeutic polypeptide or the therapeutic nucleic acid inhibits the expression of HTT or inhibits the accumulation of HTT in cells of the CNS of the mammal with Huntington's disease. In some embodiments, the heterologous nucleic acid encodes an siRNA, an shRNA, an RNAi, an miRNA, an antisense RNA, a ribozyme or a DNAzyme. In some embodiments, the heterologous nucleic acid encodes a miRNA that targets huntingtin. In some embodiments, the huntingtin comprises a mutation associated with Huntington's disease.

In some embodiments of the above aspects and embodiments, the heterologous nucleic acid encodes a therapeutic polypeptide or therapeutic nucleic acid for treating Parkinson's disease. In some embodiments, the therapeutic polypeptide is glial-derived growth factor (GDNF), brain-derived growth factor (BDNF), tyrosine hydroxlase (TH), GTP-cyclohydrolase (GTPCH), and/or amino acid decarboxylase (AADC).

In some embodiments of the above aspects and embodiments, the rAAV particle is in a composition. In further embodiments, the composition is a pharmaceutical composition comprising a pharmaceutically acceptable excipient.

In some embodiments of the above aspects and embodiments, the rAAV particle was produced by triple transfection of a nucleic acid encoding the rAAV vector, a nucleic acid encoding AAV rep and cap, and a nucleic acid encoding AAV helper virus functions into a host cell, wherein the transfection of the nucleic acids to the host cells generates a host cell capable of producing rAAV particles. In other embodiments, the rAAV particle was produced by a producer cell line comprising one or more of nucleic acid encoding the rAAV vector, a nucleic acid encoding AAV rep and cap, and a nucleic acid encoding AAV helper virus functions.

In some embodiments of the above aspects and embodiments, the rAAV particle is delivered by stereotactic delivery. In some embodiments, the rAAV particle is delivered by convection enhanced delivery. In some embodiments, the rAAV particle is delivered using a CED delivery system. In some embodiments, the CED system comprises a cannula. In some embodiments, the cannula is a reflux-resistant cannula or a stepped cannula. In some embodiments, the CED system comprises a pump. In some embodiments, the pump is a manual pump. In some embodiments, the pump is an osmotic pump. In some embodiments, the pump is an infusion pump.

In some aspects, the invention provides a system for expression of a heterologous nucleic acid in the cerebral cortex and striatum of a mammal, comprising a) a composition comprising rAAV particles, wherein the rAAV particles comprise a rAAV vector encoding the heterologous nucleic acid; and b) a device for delivery of the rAAV particles to the striatum. In some embodiments, the rAAV particle comprises an AAV1 capsid or an AAV2 capsid. In some embodiments, the mammal is a human.

In some embodiments of the system of the invention, the rAAV particle is administered to the putamen and the caudate nucleus of the striatum. In some embodiments, the rAAV particle is administered to at least one site in the caudate nucleus and two sites in the putamen. In some embodiments, the ratio of rAAV particles administered to the putamen to rAAV particles administered to the caudate nucleus is at least about 2:1. In some embodiments, the heterologous nucleic acid is expressed in at least the frontal cortex, occipital cortex, and/or layer IV of the mammal. In some embodiments, the heterologous nucleic acid is expressed at least in the prefrontal association cortical areas, the premotor cortex, the primary somatosensory cortical areas, sensory motor cortex, parietal cortex, occipital cortex, and/or primary motor cortex. In some embodiments, the rAAV particle undergoes retrograde or anterograde transport in the cerebral cortex. In some embodiments, the heterologous nucleic acid is further expressed in the thalamus, subthalamic nucleus, globus pallidus, substantia nigra and/or hippocampus.

In some embodiments of the system of the invention, the rAAV particle comprises an AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV2/2-7m8, AAV DJ, AAV2 N587A, AAV2 E548A, AAV2 N708A, AAV V708K, a goat AAV, AAV1/AAV2 chimeric, bovine AAV, or mouse AAV capsid rAAV2/HBoV1 serotype capsid. In some embodiments, the AAV serotype is AAV1, AAV2, AAV5, AAV6, AAV7, AAV8, AAVrh8, AAVrh8R, AAV9, AAV10, or AAVrh10. In some embodiments, the rAAV vector comprises the heterologous nucleic acid flanked by one or more AAV inverted terminal repeat (ITR) sequences. In some embodiments, the heterologous nucleic acid is flanked by two AAV ITRs. In some embodiments, the AAV ITRs are AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV DJ, a goat AAV, bovine AAV, or mouse AAV serotype ITRs. In some embodiments, the AAV ITRs are AAV2 ITRs. In some embodiments, the ITR and the capsid of the rAAV particle are derived from the same AAV serotype. In some embodiments, the ITR and the capsid are derived from AAV2. In other embodiments, the ITR and the capsid of the rAAV viral particles are derived from different AAV serotypes. In some embodiments, the ITR is derived from AAV2 and the capsid is derived from AAV1.

In some embodiments of the system of the invention, the heterologous nucleic acid is operably linked to a promoter. In some embodiments, the promoter expresses the heterologous nucleic acid in a cell of the CNS. In some embodiments, the promoter expresses the heterologous nucleic acid in a brain cell. In some embodiments, the promoter expresses the heterologous nucleic acid in a neuron and/or a glial cell. In some embodiments, the neuron is a medium spiny neuron of the caudate nucleus, a medium spiny neuron of the putamen, a neuron of the cortex layer IV and/or a neuron of the cortex layer V. In some embodiments, the glial cell is an astrocyte. In some embodiments, the promoter is a CBA promoter, a minimum CBA promoter, a CMV promoter or a GUSB promoter. In other embodiments, the promoter is inducible. In further embodiments, the rAAV vector comprises one or more of an enhancer, a splice donor/splice acceptor pair, a matrix attachment site, or a polyadenylation signal. In some embodiments, the rAAV vector is a self-complementary rAAV vector. In some embodiments, the vector comprises a first nucleic acid sequence encoding the heterologous nucleic acid and a second nucleic acid sequence encoding a complement of the heterologous nucleic acid, wherein the first nucleic acid sequence can form intrastrand base pairs with the second nucleic acid sequence along most or all of its length. In some embodiments, the first nucleic acid sequence and the second nucleic acid sequence are linked by a mutated AAV ITR, wherein the mutated AAV ITR comprises a deletion of the D region and comprises a mutation of the terminal resolution sequence.

In some embodiments of the system of the invention, the heterologous nucleic acid encodes a therapeutic polypeptide or therapeutic nucleic acid. In some embodiments, the heterologous nucleic acid encodes a therapeutic polypeptide. In some embodiments, the therapeutic polypeptide is an enzyme, a neurotrophic factor, a polypeptide that is deficient or mutated in an individual with a CNS-related disorder, an antioxidant, an anti-apoptotic factor, an anti-angiogenic factor, and an anti-inflammatory factor, alpha-synuclein, acid beta-glucosidase (GBA), beta-galactosidase-1 (GLB1), iduronate 2-sulfatase (IDS), galactosylceramidase (GALC), a mannosidase, alpha-D-mannosidase (MAN2B1), beta-mannosidase (MANBA), pseudoarylsulfatase A (ARSA), N-acetylglucosamine-1-phosphotransferase (GNPTAB), acid sphingomyelinase (ASM), Niemann-Pick C protein (NPC1), acid alpha-1,4-glucosidase (GAA), hexosaminidase beta subunit, HEXB, N-sulfoglucosamine sulfohydrolase (MPS3A), N-alpha-acetylglucosaminidase (NAGLU), heparin acetyl-CoA, alpha-glucosaminidase N-acetyltransferase (MPS3C), N-acetylglucosamine-6-sulfatase (GNS), alpha-N-acetylgalactosaminidase (NAGA), beta-glucuronidase (GUSB), hexosaminidase alpha subunit (HEXA), huntingtin (HTT), lysosomal acid lipase (LIPA), Aspartylglucosaminidase, Alpha-galactosidase A, Palmitoyl protein thioesterase, Tripeptidyl peptidase, Lysosomal transmembrane protein, Cysteine transporter, Acid ceramidase, Acid alpha-L-fucosidase, cathepsin A, alpha-L-iduronidase, Arylsulfatase B, Arylsulfatase A, N-acetylgalactosamine-6-sulfate, Acid beta-galactosidase, or alpha-neuramidase. In other embodiments, the heterologous nucleic acid encodes a therapeutic nucleic acid. In some embodiments, the therapeutic nucleic acid is an siRNA, an shRNA, an RNAi, an miRNA, an antisense RNA, a ribozyme or a DNAzyme. In some embodiments, the therapeutic polypeptide or the therapeutic nucleic acid is used to treat a disorder of the CNS.

In some embodiments of the system of the invention, the disorder of the CNS is a lysosomal storage disease (LSD), Huntington's disease, epilepsy, Parkinson's disease, Alzheimer's disease, stroke, corticobasal degeneration (CBD), corticogasal ganglionic degeneration (CBGD), frontotemporal dementia (FTD), multiple system atrophy (MSA), progressive supranuclear palsy (PSP) or cancer of the brain. In some embodiments, the disorder is a lysosomal storage disease selected from the group consisting of Aspartylglusoaminuria, Fabry, Infantile Batten Disease (CNL1), Classic Late Infantile Batten Disease (CNL2), Juvenile Batten Disease (CNL3), Batten form CNL4, Batten form CNL5, Batten form CNL6, Batten form CNL7, Batten form CNL8, Cystinosis, Farber, Fucosidosis, Galactosidosialidosis, Gaucher disease type 1, Gaucher disease type 2, Gaucher disease type 3, GM1 gangliosidosis, Hunter disease, Krabbe disease, α mannosidosis disease, β mannosidosis disease, Maroteaux-Lamy, metachromatic leukodystrophy disease, Morquio A, Morquio B, mucolipidosis II/III disease, Niemann-Pick A disease, Niemann-Pick B disease, Niemann-Pick C disease, Pompe disease, Sandhoff disease, Sanfillipo A disease, Sanfillipo B disease, Sanfillipo C disease, Sanfillipo D disease, Schindler disease, Schindler-Kanzaki, sialidosis, Sly disease, Tay-Sachs disease, and Wolman disease.

In some embodiments, the rAAV of the invention comprises a heterologous nucleic acid encoding a therapeutic polypeptide or therapeutic nucleic acid for treating Huntington's disease. In some embodiments, the therapeutic polypeptide or the therapeutic nucleic acid inhibits the expression of HTT or inhibits the accumulation of HTT in cells of the CNS of the mammal with Huntington's disease. In some embodiments, the heterologous nucleic acid encodes an siRNA, an shRNA, an RNAi, an miRNA, an antisense RNA, a ribozyme or a DNAzyme. In some embodiments, the heterologous nucleic acid encodes a miRNA that targets huntingtin. In some embodiments, the huntingtin comprises a mutation associated with Huntington's disease.

In some embodiments, the rAAV particle of the invention comprises a heterologous nucleic acid encodes a therapeutic polypeptide or therapeutic nucleic acid for treating Parkinson's disease. In some embodiments, the therapeutic polypeptide is glial-derived growth factor (GDNF), brain-derived growth factor (BDNF), tyrosine hydroxlase (TH), GTP-cyclohydrolase (GTPCH), and/or amino acid decarboxylase (AADC).

In some embodiments of the system of the invention, the rAAV particle is in a composition. In further embodiments, the composition is a pharmaceutical composition comprising a pharmaceutically acceptable excipient.

In some embodiments of the system of the invention, the rAAV particle was produced by triple transfection of a nucleic acid encoding the rAAV vector, a nucleic acid encoding AAV rep and cap, and a nucleic acid encoding AAV helper virus functions into a host cell, wherein the transfection of the nucleic acids to the host cells generates a host cell capable of producing rAAV particles. In other embodiments, the rAAV particle was produced by a producer cell line comprising one or more of nucleic acid encoding the rAAV vector, a nucleic acid encoding AAV rep and cap, and a nucleic acid encoding AAV helper virus functions.

In some embodiments of the system of the invention, the rAAV particle is delivered by stereotactic delivery. In some embodiments, the rAAV particle is delivered by convection enhanced delivery. In some embodiments, the rAAV particle is delivered using a CED delivery system. In some embodiments, the CED system comprises a cannula. In some embodiments, the cannula is a reflux-resistant cannula or a stepped cannula. In some embodiments, the CED system comprises a pump. In some embodiments, the pump is a manual pump. In some embodiments, the pump is an osmotic pump. In some embodiments, the pump is an infusion pump.

In some aspects, the invention provides a kit for use in any of the methods described above where the kit comprising rAAV particles, wherein the rAAV particles comprise a rAAV vector encoding a heterologous nucleic acid that is expressed in at least the cerebral cortex and striatum of the mammal. In some embodiments, the rAAV particles comprise an AAV serotype 1 (AAV1) capsid. In some embodiments, the rAAV particles comprise an AAV serotype 2 (AAV2) capsid.

In some aspects, the invention provides a kit for treating Huntington's Disease in a mammal, comprising a composition comprising an effective amount of rAAV particles, wherein the rAAV particles comprise an rAAV vector encoding a heterologous nucleic acid that is expressed in at least the cerebral cortex and striatum of the mammal. In some aspects, the invention provides a kit for treating Parkinson's disease in a mammal, comprising a composition comprising an effective amount of rAAV particles, wherein the rAAV particles comprise a rAAV vector encoding a heterologous nucleic acid that is expressed in at least the cerebral cortex and striatum of the mammal. In some embodiments, the rAAV particles of the kits comprise an AAV serotype 1 (AAV1) capsid or an AAV serotype 2 (AAV2) capsid. In some embodiments, the kit further comprising a device for delivery of the rAAV particles to the striatum. In some embodiments, the rAAV particles of the kit are in a composition. In some embodiments, the composition comprises a buffer and/or a pharmaceutically acceptable excipient. In further embodiments, the kit comprises instructions for delivery of the composition of rAAV particles to the striatum.

In some aspects, the invention provides a rAAV particle for use in any of the methods described above. In some aspects, the invention provides a rAAV particle for use in delivering a recombinant adeno-associated viral (rAAV) particle to the central nervous system of a mammal, wherein the rAAV particle comprises a rAAV vector encoding a heterologous nucleic acid that is expressed in at least the cerebral cortex and striatum of the mammal. In some aspects, the invention provides a rAAV particle for use in delivering a recombinant adeno-associated viral (rAAV) particle to the central nervous system of a mammal, wherein the rAAV particle comprises a rAAV vector encoding a heterologous nucleic acid that is expressed in at least the cerebral cortex and striatum of the mammal, and wherein the rAAV particle further comprises an AAV serotype 1 (AAV1) capsid. In some aspects, the invention provide a rAAV particle for use in delivering a recombinant adeno-associated viral (rAAV) particle to the central nervous system of a mammal, wherein the rAAV particle comprises a rAAV vector encoding a heterologous nucleic acid that is expressed in at least the cerebral cortex and striatum of the mammal, and wherein the rAAV particle further comprises an AAV serotype 1 (AAV2) capsid.

In some aspects, the invention provides a rAAV particle for use in treating Huntington's disease in a mammal, wherein the rAAV particle comprises a rAAV vector encoding a heterologous nucleic acid that is expressed in at least the cerebral cortex and striatum of the mammal. In some aspects, the invention provides a rAAV particle for use in treating Parkinson's disease in a mammal, wherein the rAAV particle comprises a rAAV vector encoding a heterologous nucleic acid that is expressed in at least the cerebral cortex and striatum of the mammal. In some embodiments, the rAAV particle comprises an AAV2 capsid. In some embodiments, the mammal is a human.

In some embodiments, the rAAV particle of the invention is administered to at least the putamen and the caudate nucleus of the striatum. In some embodiments, the rAAV particle is administered to at least the putamen and the caudate nucleus of each hemisphere of the striatum. In some embodiments, the rAAV particle is administered to at least one site in the caudate nucleus and two sites in the putamen. In some embodiments, the ratio of rAAV particles administered to the putamen to rAAV particles administered to the caudate nucleus is at least about 2:1. In some embodiments, the heterologous nucleic acid is expressed in at least the frontal cortex, occipital cortex, and/or layer IV of the mammal. In some embodiments, the heterologous nucleic acid is expressed at least in the prefrontal association cortical areas, the premotor cortex, the primary somatosensory cortical areas, sensory motor cortex, parietal cortex, occipital cortex, and/or primary motor cortex. In some embodiments, the rAAV particle undergoes retrograde or anterograde transport in the cerebral cortex. In some embodiments, the heterologous nucleic acid is further expressed in the thalamus, subthalamic nucleus, globus pallidus, substantia nigra and/or hippocampus.

In some embodiments of the above aspects and embodiments, the rAAV particle of the invention comprises an AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV2/2-7m8, AAV DJ, AAV2 N587A, AAV2 E548A, AAV2 N708A, AAV V708K, a goat AAV, AAV1/AAV2 chimeric, bovine AAV, or mouse AAV capsid rAAV2/HBoV1 serotype capsid. In some embodiments, the AAV serotype is AAV1, AAV2, AAV5, AAV6, AAV7, AAV8, AAVrh8, AAVrh8R, AAV9, AAV10, or AAVrh10. In some embodiments, the rAAV vector comprises the heterologous nucleic acid flanked by one or more AAV inverted terminal repeat (ITR) sequences. In some embodiments, the heterologous nucleic acid is flanked by two AAV ITRs. In some embodiments, the AAV ITRs are AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV DJ, a goat AAV, bovine AAV, or mouse AAV serotype ITRs. In some embodiments, the AAV ITRs are AAV2 ITRs. In some embodiments, the ITR and the capsid of the rAAV particle are derived from the same AAV serotype. In some embodiments, the ITR and the capsid are derived from AAV2. In other embodiments, the ITR and the capsid of the rAAV viral particles are derived from different AAV serotypes. In some embodiments, the ITR is derived from AAV2 and the capsid is derived from AAV1.

In some embodiments of the above aspects and embodiments, the heterologous nucleic acid is operably linked to a promoter. In some embodiments, the promoter expresses the heterologous nucleic acid in a cell of the CNS. In some embodiments, the promoter expresses the heterologous nucleic acid in a brain cell. In some embodiments, the promoter expresses the heterologous nucleic acid in a neuron and/or a glial cell. In some embodiments, the neuron is a medium spiny neuron of the caudate nucleus, a medium spiny neuron of the putamen, a neuron of the cortex layer IV and/or a neuron of the cortex layer V. In some embodiments, the glial cell is an astrocyte. In some embodiments, the promoter is a CBA promoter, a minimum CBA promoter, a CMV promoter or a GUSB promoter. In other embodiments, the promoter is inducible. In further embodiments, the rAAV vector comprises one or more of an enhancer, a splice donor/splice acceptor pair, a matrix attachment site, or a polyadenylation signal. In some embodiments, the rAAV vector is a self-complementary rAAV vector. In some embodiments, the vector comprises a first nucleic acid sequence encoding the heterologous nucleic acid and a second nucleic acid sequence encoding a complement of the heterologous nucleic acid, wherein the first nucleic acid sequence can form intrastrand base pairs with the second nucleic acid sequence along most or all of its length. In some embodiments, the first nucleic acid sequence and the second nucleic acid sequence are linked by a mutated AAV ITR, wherein the mutated AAV ITR comprises a deletion of the D region and comprises a mutation of the terminal resolution sequence.

In some embodiments of the above aspects and embodiments, the heterologous nucleic acid encodes a therapeutic polypeptide or therapeutic nucleic acid. In some embodiments, the heterologous nucleic acid encodes a therapeutic polypeptide. In some embodiments, the therapeutic polypeptide is an enzyme, a neurotrophic factor, a polypeptide that is deficient or mutated in an individual with a CNS-related disorder, an antioxidant, an anti-apoptotic factor, an anti-angiogenic factor, and an anti-inflammatory factor, alpha-synuclein, acid beta-glucosidase (GBA), beta-galactosidase-1 (GLB1), iduronate 2-sulfatase (IDS), galactosylceramidase (GALC), a mannosidase, alpha-D-mannosidase (MAN2B1), beta-mannosidase (MANBA), pseudoarylsulfatase A (ARSA), N-acetylglucosamine-1-phosphotransferase (GNPTAB), acid sphingomyelinase (ASM), Niemann-Pick C protein (NPC1), acid alpha-1,4-glucosidase (GAA), hexosaminidase beta subunit, HEXB, N-sulfoglucosamine sulfohydrolase (MPS3A), N-alpha-acetylglucosaminidase (NAGLU), heparin acetyl-CoA, alpha-glucosaminidase N-acetyltransferase (MPS3C), N-acetylglucosamine-6-sulfatase (GNS), alpha-N-acetylgalactosaminidase (NAGA), beta-glucuronidase (GUSB), hexosaminidase alpha subunit (HEXA), huntingtin (HTT), lysosomal acid lipase (LIPA), Aspartylglucosaminidase, Alpha-galactosidase A, Palmitoyl protein thioesterase, Tripeptidyl peptidase, Lysosomal transmembrane protein, Cysteine transporter, Acid ceramidase, Acid alpha-L-fucosidase, cathepsin A, alpha-L-iduronidase, Arylsulfatase B, Arylsulfatase A, N-acetylgalactosamine-6-sulfate, Acid beta-galactosidase, or alpha-neuramidase. In other embodiments, the heterologous nucleic acid encodes a therapeutic nucleic acid. In some embodiments, the therapeutic nucleic acid is an siRNA, an shRNA, an RNAi, an miRNA, an antisense RNA, a ribozyme or a DNAzyme. In some embodiments, the therapeutic polypeptide or the therapeutic nucleic acid is used to treat a disorder of the CNS.

In some embodiments of the above aspects and embodiments, the disorder of the CNS is a lysosomal storage disease (LSD), Huntington's disease, epilepsy, Parkinson's disease, Alzheimer's disease, stroke, corticobasal degeneration (CBD), corticogasal ganglionic degeneration (CBGD), frontotemporal dementia (FTD), multiple system atrophy (MSA), progressive supranuclear palsy (PSP) or cancer of the brain. In some embodiments, the disorder is a lysosomal storage disease selected from the group consisting of Aspartylglusoaminuria, Fabry, Infantile Batten Disease (CNL1), Classic Late Infantile Batten Disease (CNL2), Juvenile Batten Disease (CNL3), Batten form CNL4, Batten form CNL5, Batten form CNL6, Batten form CNL7, Batten form CNL8, Cystinosis, Farber, Fucosidosis, Galactosidosialidosis, Gaucher disease type 1, Gaucher disease type 2, Gaucher disease type 3, GM1 gangliosidosis, Hunter disease, Krabbe disease, α mannosidosis disease, β mannosidosis disease, Maroteaux-Lamy, metachromatic leukodystrophy disease, Morquio A, Morquio B, mucolipidosis II/III disease, Niemann-Pick A disease, Niemann-Pick B disease, Niemann-Pick C disease, Pompe disease, Sandhoff disease, Sanfillipo A disease, Sanfillipo B disease, Sanfillipo C disease, Sanfillipo D disease, Schindler disease, Schindler-Kanzaki, sialidosis, Sly disease, Tay-Sachs disease, and Wolman disease.

In some embodiments of the above aspects and embodiments, the rAAV particle is in a composition. In further embodiments, the composition is a pharmaceutical composition comprising a pharmaceutically acceptable excipient.

In some embodiments of the above aspects and embodiments, the rAAV particle was produced by triple transfection of a nucleic acid encoding the rAAV vector, a nucleic acid encoding AAV rep and cap, and a nucleic acid encoding AAV helper virus functions into a host cell, wherein the transfection of the nucleic acids to the host cells generates a host cell capable of producing rAAV particles. In other embodiments, the rAAV particle was produced by a producer cell line comprising one or more of nucleic acid encoding the rAAV vector, a nucleic acid encoding AAV rep and cap, and a nucleic acid encoding AAV helper virus functions.

In some embodiments of the above aspects and embodiments, the rAAV particle is delivered by stereotactic delivery. In some embodiments, the rAAV particle is delivered by convection enhanced delivery. In some embodiments, the rAAV particle is delivered using a CED delivery system. In some embodiments, the CED system comprises a cannula. In some embodiments, the cannula is a reflux-resistant cannula or a stepped cannula. In some embodiments, the CED system comprises a pump. In some embodiments, the pump is a manual pump. In some embodiments, the pump is an osmotic pump. In some embodiments, the pump is an infusion pump.

All references cited herein, including patent applications and publications, are incorporated by reference in their entirety.

BRIEF DESCRIPTION OF THE DRAWINGS

FIGS. 3A-3D show representative brain sections demonstrating cortical expression of GFP in the frontal cortex (FIGS. 3A & 3B) and occipital cortex (FIGS. 3C & 3D) in both astrocytes (FIGS. 3A & 3C) and cortical neurons (FIGS. 3B & 3D) after infusion of AAV1-GFP (TT) into Rhesus monkey caudate and putamen.

FIGS. 4A-4D show representative brain sections stained for GFP 30 days after infusion of AAV2-GFP (TT) into Rhesus monkey caudate and putamen. Sections in FIGS. 4A-4D extend through the brain in the rostral to caudal direction. Sections from three representative animals are displayed in each panel.

FIG. 9A: High magnification (40×) of the target structure caudate nucleus transduced with AAV1-eGFP (TT) of subject number 1. Dark-brown GFP+ neurons stained by DAB are visible against densely stained network of positive neuronal fibers. Such a robust signal was detected in all monkeys injected with AAV1-eGFP vector produced by both TT and PCL methods. FIG. 9B: Fragment of prefrontal cortex of subject number 1 (FIG. 7) demonstrating massive transport of vector AAV1-eGFP from the sites of injection (striatum) to cortical regions. Based on morphology of GFP+ cells, both neurons and astrocytes were detected in the cortex. FIG. 9C: Higher magnification (40×) of the frame indicated in FIG. 9B showing numerous cortical neurons expressing GFP. FIG. 9D: High (40×) magnification of the cortex from subject number 1 showing GFP+ cells of astrocytic morphology. FIG. 9E: High magnification (40×) of the target structure putamen transduced with AAV2-eGFP (TT) of subject number 6. Dark-brown DAB signal show expression of GFP in neurons and their densely stained network of fibers. FIG. 9F: Fragment of prefrontal cortex of subject number 6 (FIG. 7) demonstrating massive transport of vector AAV2-eGFP from the striatum (injection site) to cortical regions. The vast majority of GFP-positive cells had neuronal morphology (magnification 2.5×). FIG. 9G: Higher magnification (40×) of the frame indicated in FIG. 9F showing numerous cortical neurons expressing GFP. FIG. 9H: Higher magnification (20×) of internal capsule of subject number 6 showing GFP+ cells with astrocytic morphology.

FIG. 10A: Section from caudate nucleus (target structure) from subject number 1 stained with antibodies against GFP (green channel for DyLight™ 488 dye; left column) and neuronal marker NeuN (red channel for DyLight™ 549 dye; middle column). Merged pictures (magnification 20×; right column) from both channels show numerous neurons expressing GFP, verifying neuronal tropism of AAV1-eGFP. FIG. 10B: The same staining was performed for a section from prefrontal cortex of subject number 1 showing neuronal transduction in a distal brain structure receiving neuronal projections from the striatum and is evidence of retrograde transport of AAV1-eGFP. FIG. 10C: Section from caudate nucleus (target structure) from subject number 1 stained with antibodies against GFP (green channel for DyLight™ 488 dye; left column) and astrocytic marker S-100 (red channel for DyLight™ 549 dye; middle column). Merged pictures (magnification 20×; right column) from both channels show numerous astrocytes expressing GFP, verifying that AAV1-eGFP also transduces astrocytes. FIG. 10D: Section from caudate nucleus (target structure) from subject number 6 stained with antibodies against GFP (green channel for DyLight™ 488 dye; left column) and neuronal marker NeuN (red channel for DyLight™ 549 dye; middle column). Merged pictures (magnification 20×; right column) from both channels show numerous neurons expressing GFP, verifying neuronal tropism of AAV2-eGFP. FIG. 10E: Section from caudate nucleus (target structure) from subject number 3 stained with antibodies against GFP (green channel for DyLight™ 488 dye; left column) and microglia marker Iba-1 (red channel for DyLight™ 549 dye; middle column). The lack of co-staining of both markers in merged picture (magnification 20×; right column) indicates that AAV1 does not transduce microglia, and this was also the case for AAV2 (data not shown).

FIG. 11C). Scheme for the technique of counting GFP+ neurons in PAT (inner shading) and OPAT (outer shading) is shown in FIG. 11B. Data from individual counts for each monkey and brain structure are shown in Table 8 (PAT) and Table 9 (OPAT).

FIG. 12A: H&E-stained section from subject number 3 shows numerous perivascular cuffs in the left putamen transduced with AAV1-eGFP (TT). One blood vessel is magnified (5×) in the right bottom corner. FIG. 12B: H&E-stained section from subject number 5 shows only a few localized perivascular cuffs in the left caudate nucleus transduced with AAV1-eGFP (PCL). A few blood vessels are magnified (5×) in the left bottom corner.

(FIG. 13A) AAV1 and AAV2-eGFP vectors made by a triple transfection (TT) process. (FIG. 13B) AAV1 and AAV2-eGFP vectors made by a producer cell line (PCL) process.

DETAILED DESCRIPTION

Figure 1:
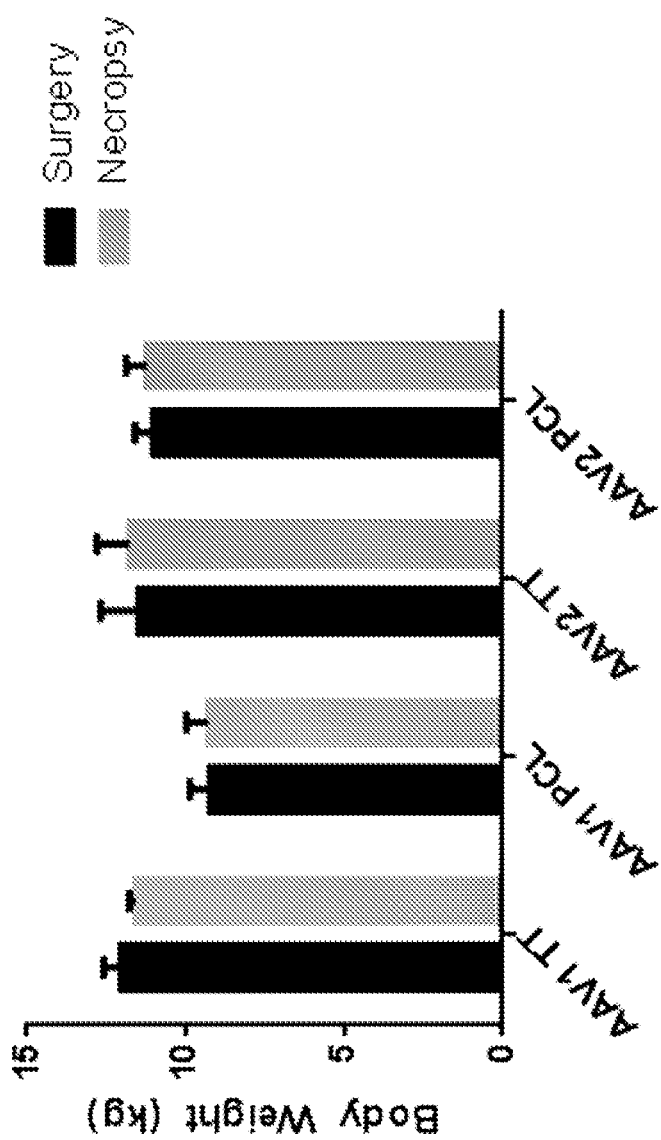
FIG. 1 shows Rhesus monkey body weights, taken immediately prior to surgery (black) and at the time of necropsy (gray), in animals administered AAV1 and AAV2 vectors made by triple transfection (TT) and producer cell line (PCL) processes.

As discussed in detail herein, the inventors have discovered that AAV vectors (e.g., AAV1 and AAV2 vectors) efficiently target both striatal and cortical structures in the Rhesus monkey brain when delivered to the striatum (e.g., by convection enhanced delivery, CED). These studies also evaluated two different manufacturing platforms, and these studies demonstrate that AAV generated by triple transfection and producer cell lines target both striatal and cortical structures in the Rhesus monkey brain. Intrastriatal delivery of rAAV particles (e.g., AAV1 and AAV2 vectors) produced using both platforms was able to transduce neurons located a considerable distance from the infusion site (e.g., cortical structures), as well as neurons in the striatum. Accordingly, the present invention provides methods for delivering a recombinant adeno-associated viral (rAAV) particle containing a rAAV vector encoding a heterologous nucleic acid to the central nervous system of a mammal by administering the rAAV particle to the striatum where the heterologous nucleic acid is expressed in at least the cerebral cortex and striatum of the mammal.

The invention also provides methods for treating a CNS disorder (e.g., Huntington's disease) in a mammal by administering to the striatum a rAAV particle encoding a heterologous nucleic acid that is expressed in at least the cerebral cortex and striatum, as well as systems and kits for expression of a heterologous nucleic acid in the cerebral cortex and striatum of a mammal using a rAAV particle described herein. The methods in the invention may also utilize a delivery device (e.g., a CED device) for delivery of the rAAV particle to the striatum of a mammal, and likewise, the systems and kits of the invention may further include a device for delivery of the rAAV particle to the striatum of a mammal.

I. General Techniques

The techniques and procedures described or referenced herein are generally well understood and commonly employed using conventional methodology by those skilled in the art, such as, for example, the widely utilized methodologies described in *Molecular Cloning: A Laboratory Manual* (Sambrook et al., 4th ed., Cold Spring Harbor Laboratory Press, Cold Spring Harbor, N.Y., 2012); *Current Protocols in Molecular Biology* (F. M. Ausubel, et al. eds., 2003); the series *Methods in Enzymology* (Academic Press, Inc.); *PCR 2: A Practical Approach* (M. J. MacPherson, B. D. Hames and G. R. Taylor eds., 1995); *Antibodies, A Laboratory Manual* (Harlow and Lane, eds., 1988); *Culture of Animal Cells: A Manual of Basic Technique and Specialized Applications* (R. I. Freshney, 6th ed., J. Wiley and Sons, 2010); *Oligonucleotide Synthesis* (M. J. Gait, ed., 1984); *Methods in Molecular Biology*, Humana Press; *Cell Biology: A Laboratory Notebook* (J. E. Cellis, ed., Academic Press, 1998); *Introduction to Cell and Tissue Culture* (J. P. Mather and P. E. Roberts, Plenum Press, 1998); *Cell and Tissue Culture: Laboratory Procedures* (A. Doyle, J. B. Griffiths, and D. G. Newell, eds., J. Wiley and Sons, 1993-8); *Handbook of Experimental Immunology* (D. M. Weir and C. C. Blackwell, eds., 1996); *Gene Transfer Vectors for Mammalian Cells* (J. M. Miller and M. P. Calos, eds., 1987); *PCR: The Polymerase Chain Reaction*, (Mullis et al., eds., 1994); *Current Protocols in Immunology* (J. E. Coligan et al., eds., 1991); *Short Protocols in Molecular Biology* (Ausubel et al., eds., J. Wiley and Sons, 2002); *Immunobiology* (C. A. Janeway et al., 2004); *Antibodies* (P. Finch, 1997); *Antibodies: A Practical Approach* (D. Catty., ed., IRL Press, 1988-1989); *Monoclonal Antibodies: A Practical Approach* (P. Shepherd and C. Dean, eds., Oxford University Press, 2000); *Using Antibodies: A Laboratory Manual* (E. Harlow and D. Lane, Cold Spring Harbor Laboratory Press, 1999); *The Antibodies* (M. Zanetti and J. D. Capra, eds., Harwood Academic Publishers, 1995); and *Cancer: Principles and Practice of Oncology* (V. T. DeVita et al., eds., J.B. Lippincott Company, 2011).

II. Definitions

A "vector," as used herein, refers to a recombinant plasmid or virus that comprises a nucleic acid to be delivered into a host cell, either in vitro or in vivo.

The term "polynucleotide" or "nucleic acid" as used herein refers to a polymeric form of nucleotides of any length, either ribonucleotides or deoxyribonucleotides. Thus, this term includes, but is not limited to, single-, double- or multi-stranded DNA or RNA, genomic DNA, cDNA, DNA-RNA hybrids, or a polymer comprising purine and pyrimidine bases, or other natural, chemically or biochemically modified, non-natural, or derivatized nucleotide bases. The backbone of the polynucleotide can comprise sugars and phosphate groups (as may typically be found in RNA or DNA), or modified or substituted sugar or phosphate groups. Alternatively, the backbone of the polynucleotide can comprise a polymer of synthetic subunits such as phosphoramidates and thus can be an oligodeoxynucleoside phosphoramidate (P—$NH_2$) or a mixed phosphoramidate-phosphodiester oligomer. In addition, a double-stranded polynucleotide can be obtained from the single stranded polynucleotide product of chemical synthesis either by synthesizing the complementary strand and annealing the strands under appropriate conditions, or by synthesizing the complementary strand de novo using a DNA polymerase with an appropriate primer.

The terms "polypeptide" and "protein" are used interchangeably to refer to a polymer of amino acid residues, and are not limited to a minimum length. Such polymers of amino acid residues may contain natural or non-natural amino acid residues, and include, but are not limited to, peptides, oligopeptides, dimers, trimers, and multimers of amino acid residues. Both full-length proteins and fragments thereof are encompassed by the definition. The terms also include post-expression modifications of the polypeptide, for example, glycosylation, sialylation, acetylation, phosphorylation, and the like. Furthermore, for purposes of the present invention, a "polypeptide" refers to a protein which includes modifications, such as deletions, additions, and substitutions (generally conservative in nature), to the native sequence, as long as the protein maintains the desired activity. These modifications may be deliberate, as through site-directed mutagenesis, or may be accidental, such as through mutations of hosts which produce the proteins or errors due to PCR amplification.

A "recombinant viral vector" refers to a recombinant polynucleotide vector comprising one or more heterologous sequences (i.e., nucleic acid sequence not of viral origin). In the case of recombinant AAV vectors, the recombinant nucleic acid is flanked by at least one inverted terminal repeat sequences (ITRs). In some embodiments, the recombinant nucleic acid is flanked by two ITRs.

A "recombinant AAV vector (rAAV vector)" refers to a polynucleotide vector comprising one or more heterologous sequences (i.e., nucleic acid sequence not of AAV origin) that are flanked by at least one or two AAV inverted terminal repeat sequences (ITRs). Such rAAV vectors can be replicated and packaged into infectious viral particles when present in a host cell that has been infected with a suitable helper virus (or that is expressing suitable helper functions) and that is expressing AAV rep and cap gene products (i.e. AAV Rep and Cap proteins). When a rAAV vector is incorporated into a larger polynucleotide (e.g., in a chromosome or in another vector such as a plasmid used for cloning or transfection), then the rAAV vector may be referred to as a "pro-vector" which can be "rescued" by replication and encapsidation in the presence of AAV packaging functions and suitable helper functions. An rAAV vector can be in any of a number of forms, including, but not limited to, plasmids, linear artificial chromosomes, complexed with lipids, encapsulated within liposomes, and encapsidated in a viral particle; for example, an AAV particle. A rAAV vector can be packaged into an AAV virus capsid to generate a "recombinant adeno-associated viral particle (rAAV particle)".

"Heterologous" means derived from a genotypically distinct entity from that of the rest of the entity to which it is compared or into which it is introduced or incorporated. For example, a polynucleotide introduced by genetic engineering techniques into a different cell type is a heterologous polynucleotide (and, when expressed, can encode a heterologous polypeptide). Similarly, a cellular sequence (e.g., a gene or portion thereof) that is incorporated into a viral vector is a heterologous nucleotide sequence with respect to the vector. A heterologous nucleic acid may refer to a nucleic acid derived from a genotypically distinct entity from that of the rest of the entity to which it is compared or into which it is introduced or incorporated.

The term "heterologous nucleic acid" refers to a polynucleotide that is introduced into a cell and is capable of being transcribed into RNA and optionally, translated and/or expressed under appropriate conditions. In some aspects, it confers a desired property to a cell into which it was introduced, or otherwise leads to a desired therapeutic or diagnostic outcome. In another aspect, it may be transcribed into a molecule that mediates RNA interference, such as miRNA, siRNA, or shRNA.

"Chicken β-actin (CBA) promoter" refers to a polynucleotide sequence derived from a chicken β-actin gene (e.g., Gallus gallus beta actin, represented by GenBank Entrez Gene ID 396526). As used herein, "chicken β-actin promoter" may refer to a promoter containing a cytomegalovirus (CMV) early enhancer element, the promoter and first exon and intron of the chicken β-actin gene, and the splice acceptor of the rabbit beta-globin gene, such as the sequences described in Miyazaki, J. et al. (1989) Gene 79(2):269-77. As used herein, the term "CAG promoter" may be used interchangeably. As used herein, the term "CMV early enhancer/chicken beta actin (CAG) promoter" may be used interchangeably.

The terms "genome particles (gp)," "genome equivalents," or "genome copies" as used in reference to a viral titer, refer to the number of virions containing the recombinant AAV DNA genome, regardless of infectivity or functionality. The number of genome particles in a particular vector preparation can be measured by procedures such as described in the Examples herein, or for example, in Clark et al. (1999) Hum. Gene Ther., 10:1031-1039; Veldwijk et al. (2002)Mol. Ther., 6:272-278.

The term "vector genome (vg)" as used herein may refer to one or more polynucleotides comprising a set of the polynucleotide sequences of a vector, e.g., a viral vector. A vector genome may be encapsidated in a viral particle. Depending on the particular viral vector, a vector genome may comprise single-stranded DNA, double-stranded DNA, or single-stranded RNA, or double-stranded RNA. A vector genome may include endogenous sequences associated with a particular viral vector and/or any heterologous sequences inserted into a particular viral vector through recombinant techniques. For example, a recombinant AAV vector genome may include at least one ITR sequence flanking a promoter, a sequence of interest (e.g., a heterologous nucleic acid), and a polyadenylation sequence. A complete vector genome may include a complete set of the polynucleotide sequences of a vector. In some embodiments, the nucleic acid titer of a viral vector may be measured in terms of vg/mL. Methods suitable for measuring this titer are known in the art (e.g., quantitative PCR).

The terms "infection unit (iu)," "infectious particle," or "replication unit," as used in reference to a viral titer, refer to the number of infectious and replication-competent recombinant AAV vector particles as measured by the infectious center assay, also known as replication center assay, as described, for example, in McLaughlin et al. (1988) J. Virol., 62:1963-1973.

The term "transducing unit (tu)" as used in reference to a viral titer, refers to the number of infectious recombinant AAV vector particles that result in the production of a functional heterologous nucleic acid product as measured in functional assays such as described in Examples herein, or for example, in Xiao et al. (1997) Exp. Neurobiol., 144:113-124; or in Fisher et al. (1996) J Virol., 70:520-532 (LFU assay).

An "inverted terminal repeat" or "ITR" sequence is a term well understood in the art and refers to relatively short sequences found at the termini of viral genomes which are in opposite orientation.

An "AAV inverted terminal repeat (ITR)" sequence, a term well-understood in the art, is an approximately 145-nucleotide sequence that is present at both termini of the native single-stranded AAV genome. The outermost 125 nucleotides of the ITR can be present in either of two alternative orientations, leading to heterogeneity between different AAV genomes and between the two ends of a single AAV genome. The outermost 125 nucleotides also contains several shorter regions of self-complementarity (designated A, A', B, B', C, C' and D regions), allowing intrastrand base-pairing to occur within this portion of the ITR.

A "terminal resolution sequence" or "trs" is a sequence in the D region of the AAV ITR that is cleaved by AAV rep proteins during viral DNA replication. A mutant terminal resolution sequence is refractory to cleavage by AAV rep proteins.

"AAV helper functions" refer to functions that allow AAV to be replicated and packaged by a host cell. AAV helper functions can be provided in any of a number of forms, including, but not limited to, helper virus or helper virus genes which aid in AAV replication and packaging. Other AAV helper functions are known in the art such as genotoxic agents.

A "helper virus" for AAV refers to a virus that allows AAV (which is a defective parvovirus) to be replicated and packaged by a host cell. A helper virus provides "helper functions" which allow for the replication of AAV. A number of such helper viruses have been identified, including adenoviruses, herpesviruses and, poxviruses such as vaccinia and baculovirus. The adenoviruses encompass a number of different subgroups, although Adenovirus type 5 of subgroup C (Ad5) is most commonly used. Numerous adenoviruses of human, non-human mammalian and avian origin are known and are available from depositories such as the ATCC. Viruses of the herpes family, which are also available from depositories such as ATCC, include, for example, herpes simplex viruses (HSV), Epstein-Barr viruses (EBV), cytomegaloviruses (CMV) and pseudorabies viruses (PRV). Examples of adenovirus helper functions for the replication of AAV include E1A functions, E1B functions, E2A functions, VA functions and E4orf6 functions. Baculoviruses available from depositories include *Autographa californica* nuclear polyhedrosis virus.

A preparation of rAAV is said to be "substantially free" of helper virus if the ratio of infectious AAV particles to infectious helper virus particles is at least about $10^2$:1; at least about $10^4$:1, at least about $10^6$:1; or at least about $10^8$:1 or more. In some embodiments, preparations are also free of equivalent amounts of helper virus proteins (i.e., proteins as would be present as a result of such a level of helper virus if the helper virus particle impurities noted above were present in disrupted form). Viral and/or cellular protein contamination can generally be observed as the presence of Coomassie staining bands on SDS gels (e.g., the appearance of bands other than those corresponding to the AAV capsid proteins VP1, VP2 and VP3).

"AAV helper functions" refer to functions that allow AAV to be replicated and packaged by a host cell. AAV helper functions can be provided in any of a number of forms, including, but not limited to, helper virus or helper virus genes which aid in AAV replication and packaging. Other AAV helper functions are known in the art such as genotoxic agents. A "helper virus" for AAV refers to a virus that allows AAV (which is a defective parvovirus) to be replicated and packaged by a host cell. A number of such helper viruses have been identified, including adenoviruses, herpesviruses and poxviruses such as vaccinia. The adenoviruses encompass a number of different subgroups, although Adenovirus type 5 of subgroup C (Ad5) is most commonly used. Numerous adenoviruses of human, non-human mammalian and avian origin are known and are available from depositories such as the ATCC. Viruses of the herpes family, which are also available from depositories such as ATCC, include, for example, herpes simplex viruses (HSV), Epstein-Barr viruses (EBV), cytomegaloviruses (CMV) and pseudorabies viruses (PRV).

"Percent (%) sequence identity" with respect to a reference polypeptide or nucleic acid sequence is defined as the percentage of amino acid residues or nucleotides in a candidate sequence that are identical with the amino acid residues or nucleotides in the reference polypeptide or nucleic acid sequence, after aligning the sequences and introducing gaps, if necessary, to achieve the maximum percent sequence identity, and not considering any conservative substitutions as part of the sequence identity. Alignment for purposes of determining percent amino acid or nucleic acid sequence identity can be achieved in various ways that are within the skill in the art, for instance, using publicly available computer software programs, for example, those described in Current Protocols in Molecular Biology (Ausubel et al., eds., 1987), Supp. 30, section 7.7.18, Table 7.7.1, and including BLAST, BLAST-2, ALIGN or Megalign (DNASTAR) software. An example of an alignment program is ALIGN Plus (Scientific and Educational Software, Pennsylvania). Those skilled in the art can determine appropriate parameters for measuring alignment, including any algorithms needed to achieve maximal alignment over the full length of the sequences being compared. For purposes herein, the % amino acid sequence identity of a given amino acid sequence A to, with, or against a given amino acid sequence B (which can alternatively be phrased as a given amino acid sequence A that has or comprises a certain % amino acid sequence identity to, with, or against a given amino acid sequence B) is calculated as follows: 100 times the fraction X/Y, where X is the number of amino acid residues scored as identical matches by the sequence alignment program in that program's alignment of A and B, and where Y is the total number of amino acid residues in B. It will be appreciated that where the length of amino acid sequence A is not equal to the length of amino acid sequence B, the % amino acid sequence identity of A to B will not equal the % amino acid sequence identity of B to A. For purposes herein, the % nucleic acid sequence identity of a given nucleic acid sequence C to, with, or against a given nucleic acid sequence D (which can alternatively be phrased as a given nucleic acid sequence C that has or comprises a certain % nucleic acid sequence identity to, with, or against a given nucleic acid sequence D) is calculated as follows: 100 times the fraction W/Z, where W is the number of nucleotides scored as identical matches by the sequence alignment program in that program's alignment of C and D, and where Z is the total number of nucleotides in D. It will be appreciated that where the length of nucleic acid sequence C is not equal to the length of nucleic acid sequence D, the % nucleic acid sequence identity of C to D will not equal the % nucleic acid sequence identity of D to C.

An "isolated" molecule (e.g., nucleic acid or protein) or cell means it has been identified and separated and/or recovered from a component of its natural environment.

An "effective amount" is an amount sufficient to effect beneficial or desired results, including clinical results (e.g., amelioration of symptoms, achievement of clinical endpoints, and the like). An effective amount can be administered in one or more administrations. In terms of a disease state, an effective amount is an amount sufficient to ameliorate, stabilize, or delay development of a disease.

As used herein, the term "convection enhanced delivery (CED)" may refer to delivery of a therapeutic agent to the CNS by infusion at a rate in which hydrostatic pressure leads to convective distribution. In some embodiments, the infusion is done at a rate greater than 0.5 µL/min. However, any suitable flow rate can be used such that the intracranial pressure is maintained at suitable levels so as not to injure the brain tissue. CED may be accomplished, for example, by using a suitable catheter or cannula (e.g., a step-design reflux-free cannula) through positioning the tip of the cannula at least in close proximity to the target CNS tissue (for example, the tip is inserted into the CNS tissue). After the cannula is positioned, it is connected to a pump which delivers the therapeutic agent through the cannula tip to the target CNS tissue. A pressure gradient from the tip of the cannula may be maintained during infusion. In some embodiments, infusion may be monitored by a tracing agent detectable by an imaging method such as intraoperative MRI (iMRI) or another real-time MRI technique and/or delivered by standard stereotaxic injection equipment and techniques (e.g., the ClearPoint® system from MRI Interventions, Memphis, TN).

As used herein, the term "poloxamer" may refer to a block copolymer made of a chain of polyoxypropylene flanked by two chains of polyoxyethylene. Trade names under which poloxamers may be sold include without limitation PLURONIC® (BASF), KOLLIPHOR® (BASF), LUTROL® (BASF), and SYNPERONIC® (Croda International).

An "individual" or "subject" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

As used herein, "treatment" is an approach for obtaining beneficial or desired clinical results. For purposes of this invention, beneficial or desired clinical results include, but are not limited to, alleviation of symptoms, diminishment of extent of disease, stabilized (e.g., not worsening) state of disease, preventing spread (e.g., metastasis) of disease, delay or slowing of disease progression, amelioration or palliation of the disease state, and remission (whether partial or total), whether detectable or undetectable. "Treatment" can also mean prolonging survival as compared to expected survival if not receiving treatment.

As used herein, the term "prophylactic treatment" refers to treatment, wherein an individual is known or suspected to have or be at risk for having a disorder but has displayed no symptoms or minimal symptoms of the disorder. An individual undergoing prophylactic treatment may be treated prior to onset of symptoms.

"Huntington's disease (HD)" refers to the progressive brain disorder typically caused by mutations in the HTT gene (aka huntingtin, HD or IT15). It may be characterized by symptoms including abnormal movements (termed chorea), gradual loss of motor function, emotional or psychiatric illnesses, and progressively impaired cognition. Although most symptoms appear in the 30s and 40s, juvenile forms of the disease have also been observed. For further description of HD, see OMIM Entry No. 143100, which is hereby incorporated by reference in its entirety.

"Huntingtin (HTT)" may refer either to the gene or to a polypeptide product thereof associated with most cases of Huntington's disease. The normal function of huntingtin is not fully understood. However, mutations in the huntingtin gene are known to cause HD. These mutations are typically inherited in an autosomal dominant fashion and involve expansion of trinucleotide CAG repeats in the HTT gene, leading to a polyglutamine (polyQ) tract in the Htt protein.

As used herein, a "therapeutic" agent (e.g., a therapeutic polypeptide, nucleic acid, transgene, or the like) is one that provides a beneficial or desired clinical result, such as the exemplary clinical results described above. As such, a therapeutic agent may be used in a treatment as described above.

Reference to "about" a value or parameter herein includes (and describes) embodiments that are directed to that value or parameter per se. For example, description referring to "about X" includes description of "X."

As used herein, the singular form of the articles "a," "an," and "the" includes plural references unless indicated otherwise.

It is understood that aspects and embodiments of the invention described herein include "comprising," "consisting," and/or "consisting essentially of" aspects and embodiments.

III. Methods for Delivering rAAV Particles

In some aspects, the invention provides methods for delivering a recombinant adeno-associated viral (rAAV) particle to the central nervous system of a mammal comprising administering the rAAV particle to the striatum, wherein the rAAV particle comprises a rAAV vector encoding a heterologous nucleic acid that is expressed in at least the cerebral cortex and striatum of the mammal. In further aspects, the invention provides methods for delivering a rAAV particle to the central nervous system of a mammal comprising administering the rAAV particle to the striatum, wherein the rAAV particle comprises an rAAV vector encoding a heterologous nucleic acid that is expressed in at least the cerebral cortex and striatum of the mammal and wherein the rAAV particle comprises an AAV serotype 1 (AAV1) capsid. In yet further aspects, the invention provides methods for delivering a rAAV particle to the central nervous system of a mammal comprising administering the rAAV particle to the striatum, wherein the rAAV particle comprises an rAAV vector encoding a heterologous nucleic acid that is expressed in at least the cerebral cortex and striatum of the mammal and wherein the rAAV particle comprises an AAV serotype 2 (AAV2) capsid. In still further aspects, the invention provides methods for treating Huntington's disease in a mammal comprising administering a rAAV particle to the striatum, wherein the rAAV particle comprises a rAAV vector encoding a heterologous nucleic acid that is expressed in at least the cerebral cortex and striatum of the mammal. In some embodiments, the mammal is a human.

Certain aspects of the present disclosure relate to administration of a rAAV particle to one or more regions of the central nervous system (CNS). In some embodiments, the rAAV particle is administered to the striatum. The striatum is known as a region of the brain that receives inputs from the cerebral cortex (the term "cortex" may be used interchangeably herein) and sends outputs to the basal ganglia (the striatum is also referred to as the striate nucleus and the neostriatum). As described above, the striatum controls both motor movements and emotional control/motivation and has been implicated in many neurological diseases, such as Huntington's disease. Several cell types of interest are located in the striatum, including without limitation spiny projection neurons (also known as medium spiny neurons), GABAergic interneurons, and cholinergic interneurons. Medium spiny neurons make up most of the striatal neurons. These neurons are GABAergic and express dopamine receptors. Each hemisphere of the brain contains a striatum.

Important substructures of the striatum include the caudate nucleus and the putamen. In some embodiments, the rAAV particle is administered to the caudate nucleus (the term "caudate" may be used interchangeably herein). The caudate nucleus is known as a structure of the dorsal striatum. The caudate nucleus has been implicated in control of functions such as directed movements, spatial working memory, memory, goal-directed actions, emotion, sleep, language, and learning. Each hemisphere of the brain contains a caudate nucleus.

In some embodiments, the rAAV particle is administered to the putamen. Along with the caudate nucleus, the putamen is known as a structure of the dorsal striatum. The putamen comprises part of the lenticular nucleus and connects the cerebral cortex with the substantia nigra and the globus pallidus. Highly integrated with many other structures of the brain, the putamen has been implicated in control of functions such as learning, motor learning, motor performance, motor tasks, and limb movements. Each hemisphere of the brain contains a putamen.

rAAV particles may be administered to one or more sites of the striatum. In some embodiments, the rAAV particle is administered to the putamen and the caudate nucleus of the striatum. In some embodiments, the rAAV particle is administered to the putamen and the caudate nucleus of each hemisphere of the striatum. In some embodiments, the rAAV particle is administered to at least one site in the caudate nucleus and two sites in the putamen.

In some embodiments, the rAAV particle is administered to one hemisphere of the brain. In some embodiments, the rAAV particle is administered to both hemispheres of the brain. For example, in some embodiments, the rAAV particle is administered to the putamen and the caudate nucleus of each hemisphere of the striatum. In some embodiments, the composition containing rAAV particles is administered to the striatum of each hemisphere. In other embodiments, the composition containing rAAV particles is administered to striatum of the left hemisphere or the striatum of the right hemisphere and/or the putamen of the left hemisphere or the putamen of the right hemisphere. In some embodiments, the composition containing rAAV particles is administered to any combination of the caudate nucleus of the left hemisphere, the caudate nucleus of the right hemisphere, the putamen of the left hemisphere and the putamen of the right hemisphere.

In some embodiments, the composition containing rAAV particles is administered to more than one location simultaneously or sequentially. In some embodiments, multiple injections of the composition containing rAAV particles are no more than about any of one hour, two hours, three hours, four hours, five hours, six hours, nine hours, twelve hours or 24 hours apart. In some embodiments, multiple injections of the composition containing rAAV particles are more than about 24 hours apart.

Generally, from about 1 µL to about 1 mL of a composition of the invention can be delivered (e.g., from about 100 µL to about 500 µL of a composition). In some embodiments, the amount of the composition delivered to the putamen is greater than the volume delivered to the caudate nucleus. In some embodiments, the amount of the composition delivered to the putamen is about twice the volume delivered to the caudate nucleus. In other embodiments, the amount of the composition delivered to the putamen is about any of 1×, 1.25×, 1.5×. 1.75×, 2×, 2.25×, 2.5×. 2.75×, 3×, 3.5×, 4×, 4.5×, 5× or 10× (or any ratio therebetween) the volume delivered to the caudate nucleus. For example, in some embodiments, the ratio of rAAV particles administered to the putamen to rAAV particles administered to the caudate nucleus is at least about 2:1 (e.g., about 30 µL of the composition is administered to the caudate nucleus of each hemisphere and about 60 µL of the composition is administered to the putamen of each hemisphere). In some embodiments, about 20 µL to about 50 µL of the composition (or any amount therebetween) is administered to the caudate nucleus of each hemisphere, and about 40 µL to about 100 µL of the composition (or any amount therebetween) is administered to the putamen of each hemisphere. In some embodiments, the volume of the composition administered to the caudate nucleus of each hemisphere is less than about any of the following volumes (in µL): 50, 45, 40, 35, 30, or 25. In some embodiments, the volume of the composition administered to the caudate nucleus of each hemisphere is greater than about any of the following volumes (in µL): 20, 25, 30, 35, 40, or 45. That is, the volume of the composition administered to the caudate nucleus of each hemisphere can be any of a range of volumes having an upper limit of 50, 45, 40, 35, 30, or 25 and an independently selected lower limit of 20, 25, 30, 35, 40, or 45, wherein the lower limit is less than the upper limit. In some embodiments, the volume of the composition administered to the putamen of each hemisphere is less than about any of the following volumes (in µL): 100, 95, 90, 85, 80, 75, 70, 65, 60, 55, 50, or 45. In some embodiments, the volume of the composition administered to the putamen of each hemisphere is greater than about any of the following volumes (in µL): 40, 45, 50, 55, 60, 65, 70, 75, 80, 85, 90, or 95. That is, the volume of the composition administered to the putamen of each hemisphere can be any of a range of volumes having an upper limit of 100, 95, 90, 85, 80, 75, 70, 65, 60, 55, 50, or 45 and an independently selected lower limit of 40, 45, 50, 55, 60, 65, 70, 75, 80, 85, 90, or 95, wherein the lower limit is less than the upper limit.

In some embodiments, the composition is administered to the striatum at a rate of greater than 1 µL/min to about 5 µL/min. In some embodiments, the composition is administered to the caudate nucleus and the putamen at a rate of greater than 1 µL/min to about 5 µL/min. In some embodiments, the composition is administered to the striatum (the caudate nucleus and/or the putamen) at a rate of greater than about any of 1 µL/min, 2 µL/min, 3 µL/min, 4 µL/min, 5 µL/min, 6 µL/min, 7 µL/min, 8 µL/min, 9 µL/min, or 10 µL/min. In some embodiments, the composition is administered to the striatum (the caudate nucleus and/or the putamen) at a rate of any of about 1 µL/min to about 10 µL/min, about 1 µL/min to about 9 µL/min, about 1 µL/min to about 8 µL/min, about 1 µL/min to about 7 µL/min, about 1 µL/min to about 6 µL/min, about 1 µL/min to about 5 µL/min, about 1 µL/min to about 4 µL/min, about 1 µL/min to about 3 µL/min, about 1 µL/min to about 2 µL/min, about 2 µL/min to about 10 µL/min, about 2 µL/min to about 9 µL/min, about 2 µL/min to about 8 µL/min, about 2 µL/min to about 7 µL/min, about 2 µL/min to about 6 µL/min, about 2 µL/min to about 5 µL/min, about 2 µL/min to about 4 µL/min, about 2 µL/min to about 3 µL/min, about 3 µL/min to about 10 µL/min, about 3 µL/min to about 9 µL/min, about 3 µL/min to about 8 µL/min, about 3 µL/min to about 7 µL/min, about 3 µL/min to about 6 µL/min, about 3 µL/min to about 5 µL/min, about 3 µL/min to about 4 µL/min, about 4 µL/min to about 10 µL/min, about 4 µL/min to about 9 µL/min, about 4 µL/min to about 8 µL/min, about 4 µL/min to about 7 µL/min, about 4 µL/min to about 6 µL/min, about 4 µL/min to about 5 µL/min, about 5 µL/min to about 10 µL/min, about 5 µL/min to about 9 µL/min, about 5 µL/min to about 8 µL/min, about 5 µL/min to about 7 µL/min, about 5 µL/min to about 6 µL/min, about 6 µL/min to about 10 µL/min, about 6 µL/min to about 9 µL/min, about 6 µL/min to about 8 µL/min, about 6 µL/min to about 7 µL/min, about 7 µL/min to about 10 µL/min, about 7 µL/min to about 9 µL/min, about 7 µL/min to about 8 µL/min, about 8 µL/min to about 10 µL/min, about 8 µL/min to about 9 µL/min, or about 9 µL/min to about 10 µL/min. In some embodiments, the composition is administered in incremental increases in flow rate during delivery (i.e., "stepping").

In some embodiments, administration of the rAAV particle is performed once. In other embodiments, administration of the rAAV particle is performed more than once. One of skill in the art may determine how many times to perform administration of the rAAV particle based in part on, e.g., the disorder being treated and/or the patient response to treatment.

In some embodiments, the methods comprise administration to CNS an effective amount of recombinant viral particles to the striatum, wherein the rAAV particle comprises a rAAV vector encoding a heterologous nucleic acid that is expressed in at least the cerebral cortex and striatum. In some embodiments, the viral titer of the rAAV particles is at least about any of $5 \times 10^{12}$, $6 \times 10^{12}$, $7 \times 10^{12}$, $8 \times 10^{12}$, $9 \times 10^{12}$, $10 \times 10^{12}$, $11 \times 10^{12}$, $15 \times 10^{12}$, $20 \times 10^{12}$, $25 \times 10^{12}$, $30 \times 10^{12}$, or $50 \times 10^{12}$ genome copies/mL. In some embodiments, the viral titer of the rAAV particles is about any of $5 \times 10^{12}$ to $6 \times 10^{12}$, $6 \times 10^{12}$ to $7 \times 10^{12}$, $7 \times 10^{12}$ to $8 \times 10^{12}$, $8 \times 10^{12}$ to $9 \times 10^{12}$, $9 \times 10^{12}$ to $10 \times 10^{12}$, $10 \times 10^{12}$ to $11 \times 10^{12}$, $11 \times 10^{12}$ to $15 \times 10^{12}$, $15 \times 10^{12}$ to $20 \times 10^{12}$, $20 \times 10^{12}$ to $25 \times 10^{12}$, $25 \times 10^{12}$ to $30 \times 10^{12}$, $30 \times 10^{12}$ to $50 \times 10^{12}$, or $50 \times 10^{12}$ to $100 \times 10^{12}$ genome copies/mL. In some embodiments, the viral titer of the rAAV particles is about any of $5 \times 10^{12}$ to $10 \times 10^{12}$, $10 \times 10^{12}$ to $25 \times 10^{12}$, or $25 \times 10^{12}$ to $50 \times 10^{12}$ genome copies/mL. In some embodiments, the viral titer of the rAAV particles is at least about any of $5 \times 10^9$, $6\times10^9$, $7\times10^9$, $8\times10^9$, $9\times10^9$, $10\times10^9$, $11\times10^9$, $15\times10^9$, $20\times10^9$, $25\times10^9$, $30\times10^9$, or $50\times10^9$ transducing units/mL. In some embodiments, the viral titer of the rAAV particles is about any of $5\times10^9$ to $6\times10^9$, $6\times10^9$ to $7\times10^9$, $7\times10^9$ to $8\times10^9$, $8\times10^9$ to $9\times10^9$, $9\times10^9$ to $10\times10^9$, $10\times10^9$ to $11\times10^9$, $11\times10^9$ to $15\times10^9$, $15\times10^9$ to $20\times10^9$, $20\times10^9$ to $25\times10^9$, $25\times10^9$ to $30\times10^9$, $30\times10^9$ to $50\times10^9$ or $50\times10^9$ to $100\times10^9$ transducing units/mL. In some embodiments, the viral titer of the rAAV particles is about any of $5\times10^9$ to $10\times10^9$, $10\times10^9$ to $15\times10^9$, $15\times10^9$ to $25\times10^9$, or $25\times10^9$ to $50\times10^9$ transducing units/mL. In some embodiments, the viral titer of the rAAV particles is at least any of about $5\times10^{10}$, $6\times10^{10}$, $7\times10^{10}$, $8\times10^{10}$, $9\times10^{10}$, $10\times10^{10}$, $11\times10^{10}$, $15\times10^{10}$, $20\times10^{10}$, $25\times10^{10}$, $30\times10^{10}$, $40\times10^{10}$, or $50\times10^{10}$ infectious units/mL. In some embodiments, the viral titer of the rAAV particles is at least any of about $5\times10^{10}$ to $6\times10^{10}$, $6\times10^{10}$ to $7\times10^{10}$, $7\times10^{10}$ to $8\times10^{10}$, $8\times10^{10}$ to $9\times10^{10}$, $9\times10^{10}$ to $10\times10^{10}$, $10\times10^{10}$ to $11\times10^{10}$, $11\times10^{10}$ to $15\times10^{10}$, $15\times10^{10}$ to $20\times10^{10}$, $20\times10^{10}$ to $25\times10^{10}$, $25\times10^{10}$ to $30\times10^{10}$, $30\times10^{10}$ to $40\times10^{10}$, $40\times10^{10}$ to $50\times10^{10}$, or $50\times10^{10}$ to $100\times10^{10}$ infectious units/mL. In some embodiments, the viral titer of the rAAV particles is at least any of about $5\times10^{10}$ to $10\times10^{10}$, $10\times10^{10}$ to $15\times10^{10}$, $15\times10^{10}$ to $25\times10^{10}$, or $25\times10^{10}$ to $50\times10^{10}$ infectious units/mL.

In some embodiments, the methods comprise administration to CNS an effective amount of recombinant viral particles to the striatum, wherein the rAAV particle comprises a rAAV vector encoding a heterologous nucleic acid that is expressed in at least the cerebral cortex and striatum. In some embodiments, the dose of viral particles administered to the individual is at least about any of $1\times10^8$ to about $1\times10^{13}$ genome copies/kg of body weight. In some embodiments, the dose of viral particles administered to the individual is about $1\times10^8$ to $1\times10^{13}$ genome copies/kg of body weight.

In some embodiments, the methods comprise administration to CNS an effective amount of recombinant viral particles to the striatum, wherein the rAAV particle comprises a rAAV vector encoding a heterologous nucleic acid that is expressed in at least the cerebral cortex and striatum. In some embodiments, the total amount of viral particles administered to the individual is at least about $1\times10^9$ to about $1\times10^{14}$ genome copies. In some embodiments, the total amount of viral particles administered to the individual is about $1\times10^9$ to about $1\times10^{14}$ genome copies.

Compositions of the invention (e.g., rAAV particles) can be used either alone or in combination with one or more additional therapeutic agents for treating any or all of the disorders described herein. The interval between sequential administration can be in terms of at least (or, alternatively, less than) minutes, hours, or days.

IV. Expression Constructs

In some aspects, the invention provides methods for delivering rAAV particles to the CNS of a mammal by administering the rAAV particles to the striatum. In some embodiments, the rAAV particles comprise a rAAV vector. The rAAV vector may encode a heterologous nucleic acid, (e.g., a heterologous nucleic acid expressed in at least the cerebral cortex and striatum). rAAV vectors are described in greater detail infra.

In some embodiments, the rAAV vector encodes a heterologous nucleic acid. In some embodiments, a heterologous nucleic acid may encode a therapeutic polypeptide or therapeutic nucleic acid. A therapeutic polypeptide or therapeutic nucleic acid may be used, for example, to ameliorate a symptom, prevent or delay progression, and/or provide a treatment of a disorder (e.g., a disorder described herein). In some embodiments, the therapeutic polypeptide or the therapeutic nucleic acid is used to treat a disorder of the CNS, as described in more detail below.

The heterologous nucleic acid may be expressed in one or more regions of interest within the CNS. For example, in some embodiments, the heterologous nucleic acid is expressed in at least the cerebral cortex and striatum. The heterologous nucleic acid may be capable of expression ubiquitously throughout the CNS, or it may be expressed in a subset of CNS cells.

In some embodiments, the heterologous nucleic acid is expressed in the frontal cortex, occipital cortex, and/or layer IV of the mammal. The cerebral cortex is known as the outer layer of the mammalian brain important for language, consciousness, memory, attention, and awareness. The cerebral cortex is subdivided into a number of different components and regions due to its extensive anatomy and complex functions. It may be divided into left and right hemispheres. In addition, it contains four gross lobes: frontal, parietal, temporal, and occipital. Frontal cortex may refer to the frontal lobe of the cortex and is known to provide a wide range of neurological functions related to non-task-based memory, social interactions, decision making, and other complex cognitive functions. Occipital cortex may refer to the occipital lobe of the cortex and is known to be involved in visual processing. Parietal cortex may refer to the parietal lobe of the cortex and is known to be involved in language processing, proprioception, and sensory inputs related to touch. Temporal cortex may refer to the temporal lobe of the cortex and is known to be involved in language, memory, and emotional association.

In addition, three general types of areas of the cortex are described: sensory, motor, and association. These may be divided into 5 functional subdivisions: primary motor cortex (involved in muscle control), premotor cortex (higher order motor areas that command primary motor areas), association areas (e.g., parietal-temporal-occipital or prefrontal; these areas are involved in planning, memory, attention, and other higher cognitive tasks and assume the majority of the human cortex), higher order areas (sensory processing), and primary sensory areas (e.g., auditory, visual, and somatosensory). In some embodiments, the heterologous nucleic acid is expressed in the prefrontal association cortical areas, the premotor cortex, the primary somatosensory cortical areas, sensory motor cortex, parietal cortex, occipital cortex, and/or primary motor cortex.

In addition, the cerebral cortex may be divided into different cortical layers (moving from superficial to deep), each containing a characteristic pattern of neuronal connectivities and cell types. These layers may be divided into supragranular layers (layers internal granular (IV), and infragranular (V and VI). Supragranular layers typically project to other cortical layers, whereas infragranular layers receive input from supragranular layers and send output to structures outside the cortex (e.g., motor, sensory, and thalamic regions). Layer V contains pyramidal neurons with axons that connect to subcortical structures like the basal ganglia. Layer V neurons in the primary motor cortex also form the corticospinal tract that is critical for voluntary motor control. Layer IV receives inputs from the thalamus and connects to the rest of the column, thereby providing critical functions related to integration of the thalamus and cortex. Characteristic cells of layer IV include stellate cells (e.g., spiny stellate cells) and pyramidal neurons.

In some embodiments, the rAAV particle undergoes retrograde or anterograde transport in the cerebral cortex. Retrograde transport refers to the phenomenon by which cargo (e.g., rAAV particles) is moved from a neuronal process (e.g., an axon) to the cell body. Anterograde transport refers to movement from the cell body to the cell membrane (e.g., a synapse). Retrograde transport of AAV particles is thought to occur via receptor-mediated internalization at the axon terminal, followed by microtubule-mediated transport to the nucleus (see, e.g., Kaspar et al., (2002) *Mol. Ther.* 5:50-56; Boulis et al., (2003) *Neurobiol. Dis.* 14:535-541; Kaspar et al., (2003) *Science* 301:839-842). It is known that the striatum contains projections from other brain regions, such as regions of the cortex. Both anterograde and retrograde transport may allow rAAV particles to be distributed throughout the brain, such as between the cortex and thalamus (see, e.g., Kells, A. P. et al. (2009) *Proc. Natl. Acad. Sci.* 106:2407-2411). Therefore, without wishing to be bound to theory, it is thought that injection of AAV particles into one brain region (e.g., the striatum, caudate nucleus, and/or putamen) may allow the AAV particles to be delivered to other areas of the brain (e.g., the cortex) through retrograde transport.

In some embodiments, the heterologous nucleic acid is further expressed in the thalamus, substantia nigra and/or hippocampus. As described above, mechanisms such as anterograde and/or retrograde transport may allow rAAV particles injected into the cerebral cortex and/or striatum to be distributed to other regions of the brain, particularly those that connect to the cortex. The thalamus is between the cortex and midbrain, sends signals (e.g., sensory and motor) to the cortex from subcortical areas, and plays a role in alertness and sleep. The thalamus also connects to the hippocampus, part of the limbic system and a critical mediator of long-term memory consolidation. Part of the basal ganglia, the substantia nigra contains many dopaminergic neurons and is important for movement and reward. CNS disorders like Parkinson's disease are associated with loss of dopaminergic neurons in the substantia nigra. It further provides dopamine to the striatum that is critical for proper striatal function.

In some aspects, the invention provides rAAV vectors for use in methods of preventing or treating one or more gene defects (e.g., heritable gene defects, somatic gene alterations, and the like) in a mammal, such as for example, a gene defect that results in a polypeptide deficiency or polypeptide excess in a subject, or for treating or reducing the severity or extent of deficiency in a subject manifesting a CNS-associated disorder linked to a deficiency in such polypeptides in cells and tissues. In some embodiments, methods involve administration of a rAAV vector that encodes one or more therapeutic peptides, polypeptides, functional RNAs, inhibitory nucleic acids, shRNAs, microRNAs, antisense nucleotides, etc. in a pharmaceutically-acceptable carrier to the subject in an amount and for a period of time sufficient to treat the CNS-associated disorder in the subject having or suspected of having such a disorder.

A rAAV vector may comprise as a transgene, a nucleic acid encoding a protein or functional RNA that modulates or treats a CNS-associated disorder. The following is a non-limiting list of genes associated with CNS-associated disorders: neuronal apoptosis inhibitory protein (NAIP), nerve growth factor (NGF), glial-derived growth factor (GDNF), brain-derived growth factor (BDNF), ciliary neurotrophic factor (CNTF), tyrosine hydroxlase (TM, GTP-cyclohydrolase (GTPCH), aspartoacylase (ASPA), superoxide dismutase (SOD1) and amino acid decarboxylase (AADC). For example, a useful transgene in the treatment of Parkinson's disease encodes TH, which is a rate limiting enzyme in the synthesis of dopamine. A transgene encoding GTPCII, which generates the TII cofactor tetrahydrobiopterin, may also be used in the treatment of Parkinson's disease. A transgene encoding GDNF or BDNF, or AADC, which facilitates conversion of L-Dopa to DA, may also be used for the treatment of Parkinson's disease. For the treatment of ALS, a useful transgene may encode: GDNF, BDNF or CNTF. Also for the treatment of ALS, a useful transgene may encode a functional RNA, e.g., shRNA, miRNA, that inhibits the expression of SOD1. For the treatment of ischemia a useful transgene may encode NAIP or NGF. A transgene encoding Beta-glucuronidase (GUS) may be useful for the treatment of certain lysosomal storage diseases (e.g., Mucopolysacharidosis type VII (MPS VII)). A transgene encoding a prodrug activation gene, e.g., HSV-Thymidine kinase which converts ganciclovir to a toxic nucleotide which disrupts DNA synthesis and leads to cell death, may be useful for treating certain cancers, e.g., when administered in combination with the prodrug. A transgene encoding an endogenous opioid, such a β-endorphin may be useful for treating pain. Other examples of transgenes that may be used in the rAAV vectors of the invention will be apparent to the skilled artisan (See, e.g., Costantini L C, et al., *Gene Therapy* (2000) 7, 93-109).

In some embodiments, the heterologous nucleic acid may encode a therapeutic nucleic acid. In some embodiments, a therapeutic nucleic acid may include without limitation an siRNA, an shRNA, an RNAi, an miRNA, an antisense RNA, a ribozyme or a DNAzyme. As such, a therapeutic nucleic acid may encode an RNA that when transcribed from the nucleic acids of the vector can treat a disorder of the invention (e.g., a disorder of the CNS) by interfering with translation or transcription of an abnormal or excess protein associated with a disorder of the invention. For example, the nucleic acids of the invention may encode for an RNA which treats a disorder by highly specific elimination or reduction of mRNA encoding the abnormal and/or excess proteins. Therapeutic RNA sequences include RNAi, small inhibitory RNA (siRNA), micro RNA (miRNA), and/or ribozymes (such as hammerhead and hairpin ribozymes) that can treat disorders by highly specific elimination or reduction of mRNA encoding the abnormal and/or excess proteins.

In some embodiments, the heterologous nucleic acid may encode a therapeutic polypeptide. A therapeutic polypeptide may, e.g., supply a polypeptide and/or enzymatic activity that is absent or present at a reduced level in a cell or organism. Alternatively, a therapeutic polypeptide may supply a polypeptide and/or enzymatic activity that indirectly counteracts an imbalance in a cell or organism. For example, a therapeutic polypeptide for a disorder related to buildup of a metabolite caused by a deficiency in a metabolic enzyme or activity may supply a missing metabolic enzyme or activity, or it may supply an alternate metabolic enzyme or activity that leads to reduction of the metabolite. A therapeutic polypeptide may also be used to reduce the activity of a polypeptide (e.g., one that is overexpressed, activated by a gain-of-function mutation, or whose activity is otherwise misregulated) by acting, e.g., as a dominant-negative polypeptide.

In some embodiments, the therapeutic polypeptide or therapeutic nucleic acid is used to treat a disorder of the CNS. Without wishing to be bound to theory, it is thought that a therapeutic polypeptide or therapeutic nucleic acid may be used to reduce or eliminate the expression and/or activity of a polypeptide whose gain-of-function has been associated with a disorder, or to enhance the expression and/or activity of a polypeptide to complement a deficiency that has been associated with a disorder (e.g., a mutation in a gene whose expression shows similar or related activity). Non-limiting examples of CNS disorders of the invention that may be treated by a therapeutic polypeptide or therapeutic nucleic acid of the invention (exemplary genes that may be targeted or supplied are provided in parenthesis for each disorder) include stroke (e.g., caspase-3, Beclin1, Ask1, PAR1, HIF1α, PUMA, and/or any of the genes described in Fukuda, A. M. and Badaut, J. (2013) *Genes* (*Basel*) 4:435-456), Huntington's disease (mutant HTT), epilepsy (e.g., SCN1A, NMDAR, ADK, and/or any of the genes described in Boison, D. (2010) *Epilepsia* 51:1659-1668), Parkinson's disease (alpha-synuclein), Lou Gehrig's disease (also known as amyotrophic lateral sclerosis; SOD1), Alzheimer's disease (tau, amyloid precursor protein), corticobasal degeneration or CBD (tau), corticogasal ganglionic degeneration or CBGD (tau), frontotemporal dementia or FTD (tau), progressive supranuclear palsy or PSP (tau), multiple system atrophy or MSA (alpha-synuclein), cancer of the brain (e.g., a mutant or overexpressed oncogene implicated in brain cancer), and lysosomal storage diseases (LSD). Disorders of the invention may include those that involve large areas of the cortex, e.g., more than one functional area of the cortex, more than one lobe of the cortex, and/or the entire cortex. Other non-limiting examples of disorders of the invention that may be treated by a therapeutic polypeptide or therapeutic nucleic acid of the invention include traumatic brain injury, enzymatic dysfunction disorders, psychiatric disorders (including post-traumatic stress syndrome), neurodegenerative diseases, and cognitive disorders (including dementias, autism, and depression). Enzymatic dysfunction disorders include without limitation leukodystrophies (including Canavan's disease) and any of the lysosomal storage diseases described below.

In some embodiments, the therapeutic polypeptide or therapeutic nucleic acid is used to treat a lysosomal storage disease. As is commonly known in the art, lysosomal storage disease are rare, inherited metabolic disorders characterized by defects in lysosomal function. Such disorders are often caused by a deficiency in an enzyme required for proper mucopolysaccharide, glycoprotein, and/or lipid metabolism, leading to a pathological accumulation of lysosomally stored cellular materials. Non-limiting examples of lysosomal storage diseases of the invention that may be treated by a therapeutic polypeptide or therapeutic nucleic acid of the invention (exemplary genes that may be targeted or supplied are provided in parenthesis for each disorder) include Gaucher disease type 2 or type 3 (acid beta-glucosidase, GBA), GM1 gangliosidosis (beta-galactosidase-1, GLB1), Hunter disease (iduronate 2-sulfatase, IDS), Krabbe disease (galactosylceramidase, GALC), α mannosidosis disease (a mannosidase, such as alpha-D-mannosidase, MAN 2B1), β mannosidosis disease (beta-mannosidase, MANBA), metachromatic leukodystrophy disease (pseudoarylsulfatase A, ARSA), mucolipidosis II/III disease (N-acetylglucosamine-1-phosphotransferase, GNP TAB), Niemann-Pick A disease (acid sphingomyelinase, ASM), Niemann-Pick C disease (Niemann-Pick C protein, NPC1), Pompe disease (acid alpha-1,4-glucosidase, GAA), Sandhoff disease (hexosaminidase beta subunit, HERB), Sanfillipo A disease (N-sulfoglucosamine sulfohydrolase, MP S3A), Sanfillipo B disease (N-alpha-acetylglucosaminidase, NAGLU), Sanfillipo C disease (heparin acetyl-CoA:alpha-glucosaminidase N-acetyltransferase, MPS3C), Sanfillipo D disease (N-acetylglucosamine-6-sulfatase, GNS), Schindler disease (alpha-N-acetylgalactosaminidase, NAGA), Sly disease (beta-glucuronidase, GUSB), Tay-Sachs disease (hexosaminidase alpha subunit, HEXA), and Wolman disease (lysosomal acid lipase, LIPA).

Additional lysosomal storage diseases, as well as the defective enzyme associated with each disease, are listed in Table 1 below. In some embodiments, a disease listed in the table below is treated by a therapeutic polypeptide or therapeutic nucleic acid of the invention that complements or otherwise compensates for the corresponding enzymatic defect.

TABLE 1

Lysosomal storage disorders and associated defective enzymes.

| Lysosomal storage disease | Defective enzyme |
|---|---|
| Aspartylglusoaminuria | Aspartylglucosaminidase |
| Fabry | Alpha-galactosidase A |
| Infantile Batten Disease (CNL1) | Palmitoyl protein thioesterase |
| Classic Late Infantile Batten Disease (CNL2) | Tripeptidyl peptidase |
| Juvenile Batten Disease (CNL3) | Lysosomal transmembrane protein |
| Batten, other forms (CNL4-CNL8) | multiple gene products |
| Cystinosis | Cysteine transporter |
| Farber | Acid ceramidase |
| Fucosidosis | Acid alpha-L-fucosidase |
| Galactosidosialidosis | Protective protein/cathepsin A |
| Gaucher types 1, 2, and 3 | Acid beta-glucosidase |
| GM1 gangliosidosis | Acid beta-galactosidase |
| Hunter | Iduronate-2-sulfatase |
| Hurler-Scheie | Alpha-L-iduronidase |
| Krabbe | Galactocerebrosidase |
| alpha-mannosidosis | Acid alpha-mannosidase |
| beta-mannosidosis | Acid beta-mannosidase |
| Maroteaux-Lamy | Arylsulfatase B |
| Metachromatic leukodystrophy | Arylsulfatase A |
| Morquio A | N-acetylgalactosamine-6-sulfate |
| Morquio B | Acid beta-galactosidase |
| Mucolipidosis II/III | N-acetylglucosamine-1-phosphotransferase |
| Niemann-Pick A, B | Acid sphingomyelinase |
| Niemann-Pick C | NPC-1 |
| Pompe acid | alpha-glucosidase |
| Sandhoff | beta-hexosaminidase B |
| Sanfilippo A | Heparan N-sulfatase |
| Sanfilippo B | alpha-N-acetylglucosaminidase |
| Sanfilippo C | Acetyl-CoA:alpha-glucoasaminide N-acetyltransferase |
| Sanfilippo D | N-acetylglucosamine-6-sulfate |
| Schindler disease | alpha-N-acetylgalactosaminidase |
| Schindler-Kanzaki | alpha-N-acetylgalactosaminidase |
| Sialidosis | alpha-neuramidase |
| Sly | beta-glucuronidase |
| Tay-Sachs | beta-hexosaminidase A |
| Wolman | Acid lipase |

As such, in some embodiments, the therapeutic polypeptide is caspase-3, Beclin1, Ask1, PAR1, HIF1α, PUMA, SCN1A, NMDAR, ADK, alpha-synuclein, SOD1, acid beta-glucosidase (GBA), beta-galactosidase-1 (GLB1), iduronate 2-sulfatase (IDS), galactosylceramidase (GALC), a mannosidase, alpha-D-mannosidase (MAN2B1), beta-mannosidase (MANBA), pseudoarylsulfatase A (ARSA), N-acetylglucosamine-1-phosphotransferase (GNPTAB), acid sphingomyelinase (ASM), Niemann-Pick C protein (NPC1), acid alpha-1,4-glucosidase (GAA), hexosaminidase beta subunit, HEXB, N-sulfoglucosamine sulfohydrolase (MPS3A), N-alpha-acetylglucosaminidase (NAGLU), heparin acetyl-CoA, alpha-glucosaminidase N-acetyltransferase (MPS3C), N-acetylglucosamine-6-sulfatase (GNS), alpha-N-acetylgalactosaminidase (NAGA), beta-glucuronidase (GUSB), hexosaminidase alpha subunit (HEXA), huntingtin (HTT), or lysosomal acid lipase (LIPA). The therapeutic polypeptide may increase or decrease the function of the target polypeptide in the subject (e.g., it may supply the missing function in a lysosomal storage disease, or reduce the level of alpha-synuclein in MSA, such as by blocking its function or dysfunction). In some embodiments, the therapeutic nucleic acid is caspase-3, Beclin1, Ask1, PAR1, HIF1α, PUMA, SCN1A, NMDAR, ADK, alpha-synuclein, SOD1, acid beta-glucosidase (GBA), beta-galactosidase-1 (GLB1), iduronate 2-sulfatase (IDS), galactosylceramidase (GALC), a mannosidase, alpha-D-mannosidase (MAN2B1), beta-mannosidase (MANBA), pseudoarylsulfatase A (ARSA), N-acetylglucosamine-1-phosphotransferase (GNPTAB), acid sphingomyelinase (ASM), Niemann-Pick C protein (NPC1), acid alpha-1,4-glucosidase (GAA), hexosaminidase beta subunit, HEXB, N-sulfoglucosamine sulfohydrolase (MPS3A), N-alpha-acetylglucosaminidase (NAGLU), heparin acetyl-CoA, alpha-glucosaminidase N-acetyltransferase (MPS3C), N-acetylglucosamine-6-sulfatase (GNS), alpha-N-acetylgalactosaminidase (NAGA), beta-glucuronidase (GUSB), hexosaminidase alpha subunit (HEXA), or lysosomal acid lipase (LIPA). The therapeutic nucleic acid may increase or decrease the function of the target polypeptide in the subject (e.g., it may supply the missing function in a lysosomal storage disease, or reduce the level of alpha-synuclein in MSA, such as by RNAi).

An exemplary disease for which AAV expression in the cortex and striatum may be useful is Huntington's disease (HD). Huntington's disease is caused by a CAG repeat expansion mutation that encodes an elongated polyglutamine (polyQ) repeat in the mutant huntingtin protein (mHTT). HD is a particularly attractive target for DNA- and RNA-based therapies as it is an autosomal dominant disease resulting from mutation on a single allele. AAV vectors provide an ideal delivery system for nucleic acid therapeutics and allow for long lasting and continuous expression of these huntingtin lowering molecules in the brain. To achieve maximal clinical efficacy in HD, delivery to both the striatum and cortex will likely be required. Postmortem analysis of HD patient brains revealed extensive medium spiny neuronal loss in the striatum, in addition to loss of pyramidal neurons in the cerebral cortex and hippocampus. It was recently shown using conditional transgenic mouse models of HD that genetically reducing mHTT expression in neuronal populations in the striatum and cortex provides significantly more efficacy than reducing mHTT in either site alone (Wang et al., (2014) Nature medicine 20:536-541). Together, this evidence suggests that delivery of gene therapy agents to both striatal and cortical regions may be ideal for maximal therapeutic efficacy.

The use of gene therapy vectors to deliver biologics to critical brain regions implicated in Huntington's disease pathogenesis has been a challenge, due in large part to the physical constraints of effectively delivering a vector specifically to the striatum and the cerebral cortex. Although multiple direct infusions can be effective in small animal brains, as the architecture and volume of brain tissue increases in primates, it becomes more difficult to achieve widespread striatal and cortical delivery through single site infusion. Therefore, the inventors' discovery that striatal administration can achieve widespread rAAV distribution, including the cortex and striatum, has utility in treating Huntington's disease.

Accordingly, certain aspects of the invention relate to methods for treating Huntington's disease in a mammal comprising administering a rAAV particle to the striatum, wherein the rAAV particle comprises a rAAV vector encoding a heterologous nucleic acid that is expressed in at least the cerebral cortex and striatum of the mammal. HD is characterized by progressive symptoms related to overall movement and motor control, cognition, and mental health. While the precise nature and extent of symptoms vary between individuals, symptoms generally progress over time. In most cases, symptoms begin to appear between 30 and 40 years of age with subtle disruptions in motor skills, cognition, and personality. Over time, these progress into jerky, uncontrollable movements and loss of muscle control, dementia, and psychiatric illnesses such as depression, aggression, anxiety, and obsessive-compulsive behaviors. Death typically occurs 10-15 years after the onset of symptoms. Less than 10% of HD cases involve a juvenile-onset form of the disease, characterized by a faster disease progression. It is thought that approximately 1 in 10,000 Americans has HD.

Most cases of HD are associated with a trinucleotide CAG repeat expansion in the HTT gene. The number of CAG repeats in the HTT gene is strongly correlated with the manifestation of HD. For example, individuals with 35 or fewer repeats typically do not develop HD, but individuals with between 27 and 35 repeats have a greater risk of having offspring with HD. Individuals with between 36 and 40-42 repeats have an incomplete penetrance of HD, whereas individuals with more than 40-42 repeats show complete penetrance. Cases of juvenile-onset HD may be associated with CAG repeat sizes of 60 or more.

The polyQ-expanded Htt protein resulting from this CAG repeat expansion is associated with cellular aggregates or inclusion bodies, perturbations to protein homeostasis, and transcriptional dysregulation. While these toxic phenotypes may be associated with several parts of the body, they are most typically associated with neuronal cell death. HD patients often display cortical thinning and a striking, progressive loss of striatal neurons. The striatum appears to be the most vulnerable region of the brain to HD (particularly the striatal medium spiny neurons), with early effects seen in the putamen and caudate nucleus. Cell death in the striatal spiny neurons, increased numbers of astrocytes, and activation of microglia are observed in the brains of HD patients. HD may also affect certain regions of the hippocampus, cerebral cortex, thalamus, hypothalamus, and cerebellum.

Animal models of HD may be used to test potential therapeutic strategies, such as the compositions and methods of the present disclosure. Mouse models for HD are known in the art. These include mouse models with fragments of mutant HTT such as the R6/1 and N171-82Q HD mice (Harper et al., (2005) Proc. Natl. Acad. Sci. USA 102:5820-5825, Rodriguez-Lebron et al., (2005) Mol. Ther. 12:618-633, Machida et al., (2006) Biochem. Biophys. Res. Commun. 343:190-197). Another example of a mouse HD model described herein is the YAC128 mouse model. This model bears a yeast artificial chromosome (YAC) expressing a mutant human HTT gene with 128 CAG repeats, and YAC128 mice exhibit significant and widespread accumulation of Htt aggregates in the striatum by 12 months of age (Slow et al., (2003) Hum. Mol. Genet. 12:1555-1567, Pouladi et al., (2012) Hum. Mol. Genet. 21:2219-2232).

Other animal models for HD may also be used. For example, transgenic rat (von Horsten, S. et al. (2003) Hum. Mol. Genet. 12:617-24) and rhesus monkey (Yang, S. H. et al. (2008) Nature 453:921-4) models have been described. Non-genetic models are also known. These most often involve the use of excitotoxic compounds (such as quinolinic acid or kainic acid) or mitochondrial toxins (such as 3-nitropropionic acid and malonic acid) to induce striatal neuron cell death in rodents or non-human primates (for more description and references, see Ramaswamy, S. et al. (2007) *ILAR J.* 48:356-73).

In some aspects, the invention provides methods for ameliorating a symptom of HD, comprising administration of a rAAV particle comprising a rAAV vector encoding a heterologous nucleic acid that is expressed in at least the cerebral cortex and striatum to the striatum. In some embodiments, the symptoms of HD include, but are not limited to, chorea, rigidity, uncontrollable body movements, loss of muscle control, lack of coordination, restlessness, slowed eye movements, abnormal posturing, instability, ataxic gait, abnormal facial expression, speech problems, difficulties chewing and/or swallowing, disturbance of sleep, seizures, dementia, cognitive deficits (e.g., diminished abilities related to planning, abstract thought, flexibility, rule acquisition, interpersonal sensitivity, self-control, attention, learning, and memory), depression, anxiety, changes in personality, aggression, compulsive behavior, obsessive-compulsive behavior, hypersexuality, psychosis, apathy, irritability, suicidal thoughts, weight loss, muscle atrophy, heart failure, reduced glucose tolerance, testicular atrophy, and osteoporosis.

In some aspects, the invention provides methods to prevent or delay progression of HD. Autosomal dominant HD is a genetic disease that can be genotyped. For example, the number of CAG repeats in HTT may be determined by PCR-based repeat sizing. This type of diagnosis may be performed at any stage of life through directly testing juveniles or adults (e.g., along with presentation of clinical symptoms), prenatal screening or prenatal exclusion testing (e.g., by chorionic villus sampling or amniocentesis), or preimplantation screening of embryos. Additionally, HD may be diagnosed by brain imaging, looking for shrinkage of the caudate nuclei and/or putamen and/or enlarged ventricles. These symptoms, combined with a family history of HD and/or clinical symptoms, may indicate HD.

Means for determining amelioration of the symptoms of HD are known in the art. For example, the Unified Huntington's Disease Rating Scale (UHDRS) may be used to assess motor function, cognitive function, behavioral abnormalities, and functional capacity (see, e.g., Huntington Study Group (1996) *Movement Disorders* 11:136-42). This rating scale was developed to provide a uniform, comprehensive test for multiple facets of the disease pathology, incorporating elements from tests such as the HD Activities and Daily Living Scale, Marsden and Quinn's chorea severity scale, the Physical Disability and Independence scales, the HD motor rating scale (HDMRS), the HD functional capacity scale (HDFCS), and the quantitated neurological exam (QNE). Other test useful for determining amelioration of HD symptoms may include without limitation the Montreal Cognitive Assessment, brain imaging (e.g., MRI), Category Fluency Test, Trail Making Test, Map Search, Stroop Word Reading Test, Speeded Tapping Task, and the Symbol Digit Modalities Test.

In some aspects of the invention, the methods are used for the treatment of humans with HD. As described above, HD is inherited in an autosomal dominant manner and caused by CAG repeat expansion in the HTT gene. rAAV particles may include, e.g., a heterologous nucleic acid encoding a therapeutic polypeptide or nucleic acid that targets HTT. Juvenile-onset HD is most often inherited from the paternal side. Huntington disease-like phenotypes have also been correlated with other genetic loci, such as HDL1, PRNP, HDL2, HDL3, and HDL4. It is thought that other genetic loci may modify the manifestation of HD symptoms, including mutations in the GRIN2A, GRIN2B, MSX1, GRIK2, and APOE genes.

In some embodiments, delivery of recombinant viral particles is by injection of viral particles to the striatum. Intrastriatal administration delivers recombinant viral particles to an area of the brain, the striatum (including the putamen and caudate nucleus), that is highly affected by HD. In addition, and without wishing to be bound to theory, it is thought that recombinant viral particles (e.g., rAAV particles) injected into the striatum may be also dispersed (e.g., through retrograde transport) to other areas of the brain, including without limitation projection areas (e.g., the cerebral cortex). In some embodiments, the recombinant viral particles are delivered by convection enhanced delivery (e.g., convection enhanced delivery to the striatum).

In some embodiments, the transgene (e.g., a heterologous nucleic acid described herein) is operably linked to a promoter. Exemplary promoters include, but are not limited to, the cytomegalovirus (CMV) immediate early promoter, the GUSB promoter, the RSV LTR, the MoMLV LTR, the phosphoglycerate kinase-1 (PGK) promoter, a simian virus 40 (SV40) promoter and a CK6 promoter, a transthyretin promoter (TTR), a TK promoter, a tetracycline responsive promoter (TRE), an HBV promoter, an hAAT promoter, a LSP promoter, chimeric liver-specific promoters (LSPs), the E2F promoter, the telomerase (hTERT) promoter; the cytomegalovirus enhancer/chicken beta-actin/Rabbit β-globin promoter (CAG promoter; Niwa et al., *Gene,* 1991, 108(2): 193-9) and the elongation factor 1-alpha promoter (EF1-alpha) promoter (Kim et al., *Gene,* 1990, 91(2):217-23 and Guo et al., *Gene Ther.,* 1996, 3(9):802-10). In some embodiments, the promoter comprises a human β-glucuronidase promoter or a cytomegalovirus enhancer linked to a chicken β-actin (CBA) promoter. The promoter can be a constitutive, inducible or repressible promoter. In some embodiments, the invention provides a recombinant vector comprising nucleic acid encoding a heterologous nucleic acid of the present disclosure operably linked to a CBA promoter. In some embodiments, the promoter is a CBA promoter, a minimum CBA promoter, a CMV promoter or a GUSB promoter.

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., *Cell,* 41:521-530 (1985)], the SV40 promoter, the dihydrofolate reductase promoter, the 13-actin promoter, the phosphoglycerol kinase (PGK) promoter, and the EF1a promoter [Invitrogen].

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., *Proc. Natl. Acad. Sci. USA,* 93:3346-3351 (1996)), the tetracycline-repressible system (Gossen et al., *Proc. Natl. Acad. Sci. USA,* 89:5547-5551 (1992)), the tetracycline-inducible system (Gossen et al., *Science,* 268:1766-1769 (1995), see also Harvey et al., *Curr. Opin. Chem. Biol.,* 2:512-518 (1998)), the RU486-inducible system (Wang et al., *Nat. Biotech.,* 15:239-243 (1997) and Wang et al., *Gene Ther.,* 4:432-441 (1997)) and the rapamycin-inducible system (Magari et al., *J. Clin. Invest.,* 100:2865-2872 (1997)). Still other types of inducible promoters which may be useful in this context are those which are regulated by a specific physiological state, e.g., temperature, acute phase, a particular differentiation state of the cell, or in replicating cells only.

In another embodiment, the native promoter, or fragment thereof, for the transgene will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.) are well known in the art. Exemplary tissue-specific regulatory sequences include, but are not limited to the following tissue specific promoters: neuronal such as neuron-specific enolase (NSE) promoter (Andersen et al., *Cell. Mol. Neurobiol.,* 13:503-15 (1993)), neurofilament light-chain gene promoter (Piccioli et al., *Proc. Natl. Acad. Sci. USA,* 88:5611-5 (1991)), and the neuron-specific vgf gene promoter (Piccioli et al., *Neuron,* 15:373-84 (1995)). In some embodiments, the tissue-specific promoter is a promoter of a gene selected from: neuronal nuclei (NeuN), glial fibrillary acidic protein (GFAP), adenomatous polyposis coli (APC), and ionized calcium-binding adapter molecule 1 (Iba-1). Other appropriate tissue specific promoters will be apparent to the skilled artisan. In some embodiments, the promoter is a chicken Beta-actin promoter.

In some embodiments, the promoter expresses the heterologous nucleic acid in a cell of the CNS. As such, in some embodiments, a therapeutic polypeptide or a therapeutic nucleic acid of the invention may be used to treat a disorder of the CNS. In some embodiments, the promoter expresses the heterologous nucleic acid in a brain cell. A brain cell may refer to any brain cell known in the art, including without limitation a neuron (such as a sensory neuron, motor neuron, interneuron, dopaminergic neuron, medium spiny neuron, cholinergic neuron, GABAergic neuron, pyramidal neuron, etc.), a glial cell (such as microglia, macroglia, astrocytes, oligodendrocytes, ependymal cells, radial glia, etc.), a brain parenchyma cell, microglial cell, ependymal cell, and/or a Purkinje cell. In some embodiments, the promoter expresses the heterologous nucleic acid in a neuron and/or glial cell. In some embodiments, the neuron is a medium spiny neuron of the caudate nucleus, a medium spiny neuron of the putamen, a neuron of the cortex layer IV and/or a neuron of the cortex layer V.

Various promoters that express transcripts (e.g., a heterologous transgene) in CNS cells, brain cells, neurons, and glial cells are known in the art and described herein. Such promoters can comprise control sequences normally associated with the selected gene or heterologous control sequences. Often, useful heterologous control sequences include those derived from sequences encoding mammalian or viral genes. Examples include, without limitation, the SV40 early promoter, mouse mammary tumor virus LTR promoter, adenovirus major late promoter (Ad MLP), a herpes simplex virus (HSV) promoter, a cytomegalovirus (CMV) promoter such as the CMV immediate early promoter region (CMVIE), a rous sarcoma virus (RSV) promoter, synthetic promoters, hybrid promoters, and the like. In addition, sequences derived from nonviral genes, such as the murine metallothionein gene, may also be used. Such promoter sequences are commercially available from, e.g., Stratagene (San Diego, Calif.). CNS-specific promoters and inducible promoters may be used. Examples of CNS-specific promoters include without limitation those isolated from CNS-specific genes such as myelin basic protein (MBP), glial fibrillary/acid protein (GFAP), and neuron specific enolase (NSE). Examples of inducible promoters include DNA responsive elements for ecdysone, tetracycline, metallothionein, and hypoxia, inter glia.

The present invention contemplates the use of a recombinant viral genome for introduction of one or more nucleic acid sequences encoding for a heterologous nucleic acid or packaging into an AAV viral particle. The recombinant viral genome may include any element to establish the expression of a heterologous transgene, for example, a promoter, a heterologous nucleic acid, an ITR, a ribosome binding element, terminator, enhancer, selection marker, intron, polyA signal, and/or origin of replication. In some embodiments, the rAAV vector comprises one or more of an enhancer, a splice donor/splice acceptor pair, a matrix attachment site, or a polyadenylation signal.

In some embodiments, the administration of an effective amount of rAAV particles comprising a vector encoding a therapeutic nucleic acid or polypeptide transduces cells (e.g., CNS cells, brain cells, neurons, and/or glial cells) at or near the site of administration (e.g., the striatum and/or cortex) or more distal to the site of administration. In some embodiments, more than about any of 5%, 10%, 15%, 20%, 25%, 30%, 35%, 40%, 45%, 50%, 55%, 60%, 65%, 70%, 75% or 100% of neurons are transduced. In some embodiments, about 5% to about 100%, about 10% to about 50%, about 10% to about 30%, about 25% to about 75%, about 25% to about 50%, or about 30% to about 50% of the neurons are transduced. Methods to identify neurons transduced by recombinant viral particles expressing miRNA are known in the art; for example, immunohistochemistry, RNA detection (e.g., qPCR, Northern blotting, RNA-seq, in situ hybridization, and the like) or the use of a co-expressed marker such as enhanced green fluorescent protein can be used to detect expression.

In some aspects, the invention provides viral particles comprising a recombinant self-complementing genome (e.g., a self-complementary rAAV vector). AAV viral particles with self-complementing vector genomes and methods of use of self-complementing AAV genomes are described in U.S. Pat. Nos. 6,596,535; 7,125,717; 7,465,583; 7,785,888; 7,790,154; 7,846,729; 8,093,054; and 8,361,457; and Wang Z., et al., (2003) *Gene Ther* 10:2105-2111, each of which are incorporated herein by reference in its entirety. A rAAV comprising a self-complementing genome will quickly form a double stranded DNA molecule by virtue of its partially complementing sequences (e.g., complementing coding and non-coding strands of a heterologous nucleic acid). In some embodiments, the vector comprises first nucleic acid sequence encoding the heterologous nucleic acid and a second nucleic acid sequence encoding a complement of the nucleic acid, where the first nucleic acid sequence can form intrastrand base pairs with the second nucleic acid sequence along most or all of its length.

In some embodiments, the first heterologous nucleic acid sequence and a second heterologous nucleic acid sequence are linked by a mutated ITR (e.g., the right ITR). In some embodiments, the ITR comprises the polynucleotide sequence 5'-CACTCCCTCTCTGCGCGCTCGCTCGCT-CACTGAGGCC GGGCGACCAAAGGTCGCC-CACGCCCGGGCTTTGCCCGGGCG-3' (SEQ ID NO:1). The mutated ITR comprises a deletion of the D region comprising the terminal resolution sequence. As a result, on replicating an AAV viral genome, the rep proteins will not cleave the viral genome at the mutated ITR and as such, a recombinant viral genome comprising the following in 5' to 3' order will be packaged in a viral capsid: an AAV ITR, the first heterologous polynucleotide sequence including regulatory sequences, the mutated AAV ITR, the second heterologous polynucleotide in reverse orientation to the first heterologous polynucleotide and a third AAV ITR.

V. Viral Particles and Methods of Producing Viral Particles rAAV Viral Particles The invention provides methods and systems for administering rAAV particles. In some embodiments, the rAAV particle comprises a rAAV vector. In some embodiments, the viral particle is a recombinant AAV particle comprising a nucleic acid comprising a heterologous nucleic acid flanked by one or two AAV inverted terminal repeats (ITRs). The nucleic acid is encapsidated in the AAV particle. The AAV particle also comprises capsid proteins. In some embodiments, the nucleic acid comprises the coding sequence(s) of interest (e.g., a heterologous nucleic acid) operatively linked components in the direction of transcription, control sequences including transcription initiation and termination sequences, thereby forming an expression cassette. The expression cassette is flanked on the 5' and 3' end by at least one functional AAV ITR sequence. By "functional AAV ITR sequence" it is meant that the ITR sequence functions as intended for the rescue, replication and packaging of the AAV virion. See Davidson et al., *PNAS*, 2000, 97(7)3428-32; Passini et al., *J. Virol.*, 2003, 77(12):7034-40; and Pechan et al., *Gene Ther.*, 2009, 16:10-16, all of which are incorporated herein in their entirety by reference. For practicing some aspects of the invention, the recombinant vectors comprise at least all of the sequences of AAV essential for encapsidation and the physical structures for infection by the rAAV. AAV ITRs for use in the vectors of the invention need not have a wild-type nucleotide sequence (e.g., as described in Kotin, *Hum. Gene Ther.*, 1994, 5:793-801), and may be altered by the insertion, deletion or substitution of nucleotides or the AAV ITRs may be derived from any of several AAV serotypes. More than 40 serotypes of AAV are currently known, and new serotypes and variants of existing serotypes continue to be identified. See Gao et al., *PNAS*, 2002, 99(18): 11854-6; Gao et al., *PNAS*, 2003, 100(10): 6081-6; and Bossis et al., *J. Virol.*, 2003, 77(12):6799-810. Use of any AAV serotype is considered within the scope of the present invention. In some embodiments, a rAAV vector is a vector derived from an AAV serotype, including without limitation, AAV ITRs are AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV DJ, a goat AAV, bovine AAV, or mouse AAV or the like. In some embodiments, the nucleic acid in the AAV ITRs are AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV DJ, a goat AAV, bovine AAV, or mouse AAV serotype ITRs or the like. In certain embodiments, the nucleic acid in the AAV comprises an AAV2 ITR.

In some embodiments, a vector may include a stuffer nucleic acid. In some embodiments, the stuffer nucleic acid may encode a green fluorescent protein. In some embodiments, the stuffer nucleic acid may be located between the promoter and the nucleic acid encoding the RNAi.

In further embodiments, the rAAV particles comprise an AAV1 capsid, an AAV2 capsid, an AAV3 capsid, an AAV4 capsid, an AAV5 capsid, an AAV6 capsid (e.g., a wild-type AAV6 capsid, or a variant AAV6 capsid such as ShH10, as described in U.S. PG Pub. 2012/0164106), an AAV7 capsid, an AAV8 capsid, an AAVrh8 capsid, an AAVrh8R capsid, an AAV9 capsid (e.g., a wild-type AAV9 capsid, or a modified AAV9 capsid as described in U.S. PG Pub. 2013/0323226), an AAV10 capsid, an AAVrh10 capsid, an AAV11 capsid, an AAV12 capsid, a tyrosine capsid mutant, a heparin binding capsid mutant, an AAV2R471A capsid, an AAVAAV2/2-7m8 capsid, an AAV DJ capsid (e.g., an AAV-DJ/8 capsid, an AAV-DJ/9 capsid, or any other of the capsids described in U.S. PG Pub. 2012/0066783), an AAV2 N587A capsid, an AAV2 E548A capsid, an AAV2 N708A capsid, an AAV V708K capsid, a goat AAV capsid, an AAV1/AAV2 chimeric capsid, a bovine AAV capsid, a mouse AAV capsid, a rAAV2/HBoV1 capsid, or an AAV capsid described in U.S. Pat. No. 8,283,151 or International Publication No. WO/2003/042397. In some embodiments, a mutant capsid protein maintains the ability to form an AAV capsid. In some embodiments, the rAAV particle comprises AAV5 tyrosine mutant capsid (Zhong L. et al., (2008) *Proc Natl Acad Sci USA* 105(22):7827-7832. In further embodiments, the rAAV particle comprises capsid proteins of an AAV serotype from Clades A-F (Gao, et al., *J. Virol.* 2004, 78(12):6381). In some embodiments, the rAAV particle comprises an AAV1 capsid protein or mutant thereof. In other embodiments, the rAAV particle comprises an AAV2 capsid protein or mutant thereof. In some embodiments, the AAV serotype is AAV1, AAV2, AAV5, AAV6, AAV7, AAV8, AAVrh8, AAVrh8R, AAV9, AAV10, or AAVrh10. In some embodiments, the rAAV particle comprises an AAV serotype 1 (AAV1) capsid. In some embodiments, the rAAV particle comprises an AAV serotype 2 (AAV2) capsid.

Different AAV serotypes are used to optimize transduction of particular target cells or to target specific cell types within a particular target tissue (e.g., a CNS tissue). A rAAV particle can comprise viral proteins and viral nucleic acids derived from the same serotype or different serotypes (e.g., a mixed serotype). For example, in some embodiments a rAAV particle can comprise AAV1 capsid proteins and at least one AAV2 ITR or it can comprise AAV2 capsid proteins and at least one AAV1 ITR. Any combination of AAV serotypes for production of a rAAV particle is provided herein as if each combination had been expressly stated herein. In some embodiments, the invention provides rAAV particles comprising an AAV1 capsid and a rAAV vector of the present disclosure (e.g., an expression cassette comprising a heterologous nucleic acid), flanked by at least one AAV2 ITR. In some embodiments, the invention provides rAAV particles comprising an AAV2 capsid. In some embodiments, the ITR and the capsid are derived from AAV2. In some embodiments, the ITR is derived from AAV2 and the capsid is derived from AAV1.

Production of AAV Particles

Numerous methods are known in the art for production of rAAV vectors, including transfection, stable cell line production, and infectious hybrid virus production systems which include adenovirus-AAV hybrids, herpesvirus-AAV hybrids (Conway, J E et al., (1997) *J. Virology* 71(11):8780-8789) and baculovirus-AAV hybrids. rAAV production cultures for the production of rAAV virus particles all require; 1) suitable host cells, including, for example, human-derived cell lines such as HeLa, A549, or 293 cells, or insect-derived cell lines such as SF-9, in the case of baculovirus production systems; 2) suitable helper virus function, provided by wild-type or mutant adenovirus (such as temperature sensitive adenovirus), herpes virus, baculovirus, or a plasmid construct providing helper functions; 3) AAV rep and cap genes and gene products; 4) a nucleic acid (such as a therapeutic nucleic acid) flanked by at least one AAV ITR sequences; and 5) suitable media and media components to support rAAV production. In some embodiments, the AAV rep and cap gene products may be from any AAV serotype. In general, but not obligatory, the AAV rep gene product is of the same serotype as the ITRs of the rAAV vector genome as long as the rep gene products may function to replicated and package the rAAV genome. Suitable media known in the art may be used for the production of rAAV vectors. These media include, without limitation, media produced by Hyclone Laboratories and JRH including Modified Eagle Medium (MEM), Dulbecco's Modified Eagle Medium (DMEM), custom formulations such as those described in U.S. Pat. No. 6,566,118, and Sf-900 II SFM media as described in U.S. Pat. No. 6,723,551, each of which is incorporated herein by reference in its entirety, particularly with respect to custom media formulations for use in production of recombinant AAV vectors. In some embodiments, the AAV helper functions are provided by adenovirus or HSV. In some embodiments, the AAV helper functions are provided by baculovirus and the host cell is an insect cell (e.g., *Spodoptera frugiperda* (Sf9) cells).

In some embodiments, rAAV particles may be produced by a triple transfection method, such as the exemplary triple transfection method provided infra. Briefly, a plasmid containing a rep gene and a capsid gene, along with a helper adenoviral plasmid, may be transfected (e.g., using the calcium phosphate method) into a cell line (e.g., HEK-293 cells), and virus may be collected and optionally purified. As such, in some embodiments, the rAAV particle was produced by triple transfection of a nucleic acid encoding the rAAV vector, a nucleic acid encoding AAV rep and cap, and a nucleic acid encoding AAV helper virus functions into a host cell, wherein the transfection of the nucleic acids to the host cells generates a host cell capable of producing rAAV particles.

In some embodiments, rAAV particles may be produced by a producer cell line method, such as the exemplary producer cell line method provided infra (see also (referenced in Martin et al., (2013) *Human Gene Therapy Methods* 24:253-269). Briefly, a cell line (e.g., a HeLa cell line) may be stably transfected with a plasmid containing a rep gene, a capsid gene, and a promoter-heterologous nucleic acid sequence. Cell lines may be screened to select a lead clone for rAAV production, which may then be expanded to a production bioreactor and infected with an adenovirus (e.g., a wild-type adenovirus) as helper to initiate rAAV production. Virus may subsequently be harvested, adenovirus may be inactivated (e.g., by heat) and/or removed, and the rAAV particles may be purified. As such, in some embodiments, the rAAV particle was produced by a producer cell line comprising one or more of nucleic acid encoding the rAAV vector, a nucleic acid encoding AAV rep and cap, and a nucleic acid encoding AAV helper virus functions.

In some aspects, a method is provided for producing any rAAV particle as disclosed herein comprising (a) culturing a host cell under a condition that rAAV particles are produced, wherein the host cell comprises (i) one or more AAV package genes, wherein each said AAV packaging gene encodes an AAV replication and/or encapsidation protein; (ii) a rAAV pro-vector comprising a nucleic acid encoding a heterologous nucleic acid as described herein flanked by at least one AAV ITR, and (iii) an AAV helper function; and (b) recovering the rAAV particles produced by the host cell. In some embodiments, said at least one AAV ITR is selected from the group consisting of AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV DJ, a goat AAV, bovine AAV, or mouse AAV serotype ITRs or the like. In some embodiments, said encapsidation protein is selected from the group consisting of AAV1, AAV2, AAV3, AAV4, AAV5, AAV6, AAV7, AAV8, AAVrh8, AAVrh8R, AAV9, AAV10, AAVrh10, AAV11, AAV12, AAV2R471A, AAV2/2-7m8, AAV DJ, AAV2 N587A, AAV2 E548A, AAV2 N708A, AAV V708K, goat AAV, AAV1/AAV2 chimeric, bovine AAV, or mouse AAV capsid rAAV2/HBoV1 serotype capsid proteins or mutants thereof. In some embodiments, the encapsidation protein is an AAV5 capsid protein including AAV5 capsid proteins having tyrosine capsid mutations. In some embodiments, the encapsidation protein is an AAV5 capsid protein including AAV5 capsid proteins having tyrosine capsid mutations and the ITR is an AAV2 ITR. In further embodiments, the rAAV particle comprises capsid proteins of an AAV serotype from Clades A-F. In some embodiments, the rAAV particles comprise an AAV1 capsid and a recombinant genome comprising AAV2 ITRs, a mutant AAV2 ITR and nucleic acid encoding a therapeutic transgene/nucleic acid. In some embodiments, the AAV ITRs are AAV ITRs are AAV1, AAV2, AAV3, AAV4, AAV5, AAV6, AAV7, AAV5, AAVrh8, AAVrh8R, AAV5, AAV10, AAVrh10, AAV11, AAV12, AAV2R471A, AAV DJ, a goat AAV, bovine AAV, or mouse AAV serotype ITRs. In certain embodiments, the AAV ITRs are AAV2 ITRs.

Suitable rAAV production culture media of the present invention may be supplemented with serum or serum-derived recombinant proteins at a level of 0.5%-20% (v/v or w/v). Alternatively, as is known in the art, rAAV vectors may be produced in serum-free conditions which may also be referred to as media with no animal-derived products. One of ordinary skill in the art may appreciate that commercial or custom media designed to support production of rAAV vectors may also be supplemented with one or more cell culture components know in the art, including without limitation glucose, vitamins, amino acids, and or growth factors, in order to increase the titer of rAAV in production cultures.

rAAV production cultures can be grown under a variety of conditions (over a wide temperature range, for varying lengths of time, and the like) suitable to the particular host cell being utilized. As is known in the art, rAAV production cultures include attachment-dependent cultures which can be cultured in suitable attachment-dependent vessels such as, for example, roller bottles, hollow fiber filters, micro-carriers, and packed-bed or fluidized-bed bioreactors. rAAV vector production cultures may also include suspension-adapted host cells such as HeLa, 293, and SF-9 cells which can be cultured in a variety of ways including, for example, spinner flasks, stirred tank bioreactors, and disposable systems such as the Wave bag system.

rAAV vector particles of the invention may be harvested from rAAV production cultures by lysis of the host cells of the production culture or by harvest of the spent media from the production culture, provided the cells are cultured under conditions known in the art to cause release of rAAV particles into the media from intact cells, as described more fully in U.S. Pat. No. 6,566,118). Suitable methods of lysing cells are also known in the art and include for example multiple freeze/thaw cycles, sonication, microfluidization, and treatment with chemicals, such as detergents and/or proteases.

In a further embodiment, the rAAV particles are purified. The term "purified" as used herein includes a preparation of rAAV particles devoid of at least some of the other components that may also be present where the rAAV particles naturally occur or are initially prepared from. Thus, for example, isolated rAAV particles may be prepared using a purification technique to enrich it from a source mixture, such as a culture lysate or production culture supernatant. Enrichment can be measured in a variety of ways, such as, for example, by the proportion of DNase-resistant particles (DRPs) or genome copies (gc) present in a solution, or by infectivity, or it can be measured in relation to a second, potentially interfering substance present in the source mixture, such as contaminants, including production culture contaminants or in-process contaminants, including helper virus, media components, and the like.

In some embodiments, the rAAV production culture harvest is clarified to remove host cell debris. In some embodiments, the production culture harvest is clarified by filtration through a series of depth filters including, for example, a grade DOHC Millipore Millistak+HC Pod Filter, a grade A1HC Millipore Millistak+HC Pod Filter, and a 0.2 µm Filter Opticap XL1O Millipore Express SHC Hydrophilic Membrane filter. Clarification can also be achieved by a variety of other standard techniques known in the art, such as, centrifugation or filtration through any cellulose acetate filter of 0.2 µm or greater pore size known in the art.

In some embodiments, the rAAV production culture harvest is further treated with Benzonase® to digest any high molecular weight DNA present in the production culture. In some embodiments, the Benzonase® digestion is performed under standard conditions known in the art including, for example, a final concentration of 1-2.5 units/ml of Benzonase® at a temperature ranging from ambient to 37° C. for a period of 30 minutes to several hours.

rAAV particles may be isolated or purified using one or more of the following purification steps: equilibrium centrifugation; flow-through anionic exchange filtration; tangential flow filtration (TFF) for concentrating the rAAV particles; rAAV capture by apatite chromatography; heat inactivation of helper virus; rAAV capture by hydrophobic interaction chromatography; buffer exchange by size exclusion chromatography (SEC); nanofiltration; and rAAV capture by anionic exchange chromatography, cationic exchange chromatography, or affinity chromatography. These steps may be used alone, in various combinations, or in different orders. In some embodiments, the method comprises all the steps in the order as described below. Methods to purify rAAV particles are found, for example, in Xiao et al., (1998) *Journal of Virology* 72:2224-2232; U.S. Pat. Nos. 6,989,264 and 8,137,948; and WO 2010/148143.

In some embodiments, the rAAV particle is in a pharmaceutical composition. The pharmaceutical compositions may be suitable for any mode of administration described herein. A pharmaceutical composition of a recombinant viral particle comprising a nucleic acid encoding a therapeutic transgene/nucleic acid can be introduced to the CNS (e.g., the striatum and/or cerebral cortex).

In some embodiments, the rAAV particle is in a pharmaceutical composition comprising a pharmaceutically acceptable excipient. As is well known in the art, pharmaceutically acceptable excipients are relatively inert substances that facilitate administration of a pharmacologically effective substance and can be supplied as liquid solutions or suspensions, as emulsions, or as solid forms suitable for dissolution or suspension in liquid prior to use. For example, an excipient can give form or consistency, or act as a diluent. Suitable excipients include but are not limited to stabilizing agents, wetting and emulsifying agents, salts for varying osmolarity, encapsulating agents, pH buffering substances, and buffers. Such excipients include any pharmaceutical agent suitable for direct delivery to the eye which may be administered without undue toxicity. Pharmaceutically acceptable excipients include, but are not limited to, sorbitol, any of the various TWEEN compounds, and liquids such as water, saline, glycerol and ethanol. Pharmaceutically acceptable salts can be included therein, for example, mineral acid salts such as hydrochlorides, hydrobromides, phosphates, sulfates, and the like; and the salts of organic acids such as acetates, propionates, malonates, benzoates, and the like. A thorough discussion of pharmaceutically acceptable excipients is available in REMINGTON'S PHARMACEUTICAL SCIENCES (Mack Pub. Co., N.J. 1991).

In some embodiments, the administered composition includes rAAV particles and poloxamer. The term "poloxamer" may encompass many compounds because different lengths for the polyoxypropylene and polyoxyethylene chains may be used in combination. For example, a poloxamer may have the chemical formula of $HO(C_2H_4O)_n(C_3H_6O)_m(C_2H_4O)_nH$, where n (i.e., the polyoxyethylene chain length) has a value from about 60 to about 150, and m (i.e., the polyoxypropylene chain length) has a value from about 25 to about 60.

In some embodiments, the poloxamer is poloxamer 188 (e.g., CAS No. 9003-11-6). Poloxamers may be described by a numbering system that designates their approximate molecular weight and percentage of polyoxyethylene content. These values often refer to an average value in a poloxamer composition, rather than an absolute value of each poloxamer molecule in the composition. Under this methodology, the first two digits are multiplied by 100 to give the approximate molecular weight of the polyoxypropylene block, and the third digit is multiplied by 10 to give the percentage by weight of the polyoxyethylene block. For example, poloxamer 188 may refer to a poloxamer with n having a value of about 80 and with m having a value of about 27 as in the formula depicted above. Poloxamer 188 may have an average molecular weight of from about 7680 to about 9510 g/mol.

Poloxamers sold under a trade name such as PLURONIC® may be named under a different methodology. A letter may be used to indicate the physical state (e.g., F for solid, P for paste, or L for liquid). A 2 or 3 digit number may be used to indicate the chemical properties. The first one or two digits are multiplied by 300 to give the approximate molecular weight of the polyoxypropylene block, and the third digit is multiplied by 10 to give the percentage by weight of the polyoxyethylene block. For example, PLURONIC® or LUTROL® F68 may refer to a solid poloxamer with n having a value of about 80 and with m having a value of about 27 as in the formula depicted above. Therefore, in some embodiments, the poloxamer 188 may be PLURONIC® F68 or LUTROL® F68.

In some embodiments, the concentration of poloxamer in the composition ranges from about 0.0001% to about 0.01%. In some embodiments, the concentration of poloxamer in the composition is less than about any of the following percentages: 0.01, 0.005, 0.001, or 0.0005. In some embodiments, the concentration of poloxamer in the composition is greater than about any of the following percentages: 0.0001, 0.0005, 0.001, or 0.005. That is, the concentration of poloxamer in the composition can be any of a range of percentages having an upper limit of 0.01, 0.005, 0.001, or 0.0005 and an independently selected lower limit of 0.0001, 0.0005, 0.001, or 0.005, wherein the lower limit is less than the upper limit. In certain embodiments, the concentration of poloxamer in the composition is about 0.001%.

In some embodiments, the composition further comprises sodium chloride. In some embodiments, the concentration of sodium chloride in the composition ranges from about 100 mM to about 250 mM. In some embodiments, the concentration of sodium chloride in the composition is less than about any of the following concentrations (in mM): 250, 225, 200, 175, 150, or 125. In some embodiments, the concentration of sodium chloride in the composition is greater than about any of the following concentrations (in mM): 100, 125, 150, 175, 200, or 225. That is, the concentration of sodium chloride in the composition can be any of a range of concentrations (in mM) having an upper limit of 250, 225, 200, 175, 150, or 125 and an independently selected lower limit of 100, 125, 150, 175, 200, or 225, wherein the lower limit is less than the upper limit. In certain embodiments, the concentration of sodium chloride in the composition is about 180 mM.

In some embodiments, the composition further comprises sodium phosphate. Sodium phosphate may refer to any single species of sodium phosphate (e.g., monobasic sodium phosphate, dibasic sodium phosphate, tribasic sodium phosphate, and so forth), or it may refer to sodium phosphate buffer, a mixture of monobasic and dibasic sodium phosphate solutions. Recipes for sodium phosphate buffers across a range of pH may be found in a variety of standard molecular biology protocols, such as the Promega Protocols & Applications Guide, "Buffers for Biochemical Reactions," Appendix B part C.

In some embodiments, the concentration of sodium phosphate in the composition ranges from about 5 mM to about 20 mM. In some embodiments, the concentration of sodium phosphate in the composition is less than about any of the following concentrations (in mM): 20, 15, or 10. In some embodiments, the concentration of sodium phosphate in the composition is greater than about any of the following concentrations (in mM): 5, 10, or 15. That is, the concentration of sodium phosphate in the composition can be any of a range of concentrations (in mM) having an upper limit of 20, 15, or 10 and an independently selected lower limit of 5, 10, or 15, wherein the lower limit is less than the upper limit. In certain embodiments, the concentration of sodium phosphate in the composition is about 10 mM.

In some embodiments, the pH of sodium phosphate in the composition is about 7.0 to about 8.0. For example, in some embodiments, the pH of sodium phosphate in the composition is about 7.0, about 7.2, about 7.4, about 7.5, about 7.6, about 7.8, or about 8.0. In certain embodiments, the pH of sodium phosphate in the composition is about 7.5. Any of the pH values for sodium phosphate described herein may be combined with any of the concentration values for sodium phosphate described above. For example, in some embodiments, the concentration of sodium phosphate in the composition is about 10 mM, and the pH is about 7.5.

In some embodiments, the pharmaceutical composition comprising a rAAV particle described herein and a pharmaceutically acceptable carrier is suitable for administration to human. Such carriers are well known in the art (see, e.g., Remington's Pharmaceutical Sciences, 15th Edition, pp. 1035-1038 and 1570-1580). In some embodiments, the pharmaceutical composition further comprises a poloxamer (e.g., poloxamer 188, such as PLURONIC® or LUTROL® F68). In some embodiments, the pharmaceutical composition comprising a rAAV described herein and a pharmaceutically acceptable carrier is suitable for injection into the CNS of a mammal.

Such pharmaceutically acceptable carriers can be sterile liquids, such as water and oil, including those of petroleum, animal, vegetable or synthetic origin, such as peanut oil, soybean oil, mineral oil, and the like. Saline solutions and aqueous dextrose, polyethylene glycol (PEG) and glycerol solutions can also be employed as liquid carriers, particularly for injectable solutions. The pharmaceutical composition may further comprise additional ingredients, for example preservatives, buffers, tonicity agents, antioxidants and stabilizers, nonionic wetting or clarifying agents, viscosity-increasing agents, and the like. The pharmaceutical compositions described herein can be packaged in single unit dosages or in multidosage forms. The compositions are generally formulated as sterile and substantially isotonic solution.

VI. Systems for Delivery of rAAV Particles

Also provided are systems for expression of a heterologous nucleic acid in the cerebral cortex and striatum of a mammal, comprising (a) a composition comprising rAAV particles, wherein the rAAV particles comprise a rAAV vector encoding the heterologous nucleic acid; and (b) a device for delivery of the rAAV particles to the striatum. The systems and devices of the invention may be used to deliver any of the rAAV particles described herein to the CNS (e.g., the striatum) of a mammal. As described above, a rAAV particle delivered to the striatum may be used to introduce a rAAV vector encoding a heterologous nucleic acid for expression in the cerebral cortex and striatum.

In some embodiments, the rAAV particle is delivered by convection enhanced delivery (CED). CED is based on pumping an infusate (e.g., a composition containing a rAAV particle) into the CNS under pressure in which the hydrostatic pressure of the interstitial fluid is overcome. This brings the infusate into contact with the CNS perivasculature, which is utilized like a pump to distribute the infusate through convection and enhance the extent of its delivery (see, e.g., Hadaczek et al., (2006) *Hum. Gene Ther.* 17:291-302; Bankiewicz et al., (2000) *Exp. Neurol.* 164:2-14; Sanftner, L M et al., (2005) *Exp. Neurol.* 194(2):476-483; Forsayeth, J R et al., (2006)*Mol. Ther.* 14(4):571-577; U.S. Pat. No. 6,953,575; U.S. Pat. App. Pub. No. 2002/0141980; U.S. Pat. App. Pub. No. 2007/0259031; WO 99/61066; and WO 2010/088560).

As described herein, an advantage of using CED is the enhanced distribution of the infusate throughout the brain. CED may result in improved delivery at the site of injection within the brain (e.g., the striatum, caudate nucleus, and/or putamen). In addition, delivery to other regions of the brain (e.g., the cerebral cortex, frontal cortex, prefrontal association cortical areas, premotor cortex, primary somatosensory cortical areas, and/or primary motor cortex) may be achieved through CED. Without wishing to be bound to theory, it is also thought that recombinant viral particles (e.g., rAAV particles) injected into the striatum may be also dispersed (e.g., through retrograde transport) to other areas of the brain, including without limitation projection areas (e.g., the cortex).

In some embodiments, the rAAV particle is delivered using a CED delivery system. AAV particles may be delivered by CED (see, e.g., WO 99/61066). As described herein, CED may be accomplished using any of the systems described herein. Devices for CED (e.g., for delivery of a composition including rAAV particles) are known in the art and generally employ a pump (e.g., an osmotic and/or infusion pump, as described below) and an injection device (e.g., a catheter, cannula, etc.). Optionally, an imaging technique may be used to guide the injection device and/or monitor delivery of the infusate (e.g., a composition including rAAV particles). The injection device may be inserted into the CNS tissue in the subject. One of skill in the art is able to determined suitable coordinates for positioning the injection device in the target CNS tissue. In some embodiments, positioning is accomplished through an anatomical map obtained for example by CT and/or MRI imaging of the subject's brain to guide the injection device to the target CNS tissue. In some embodiments, iMRI and/or real-time imaging of the delivery may be performed. In some embodiments, the device is used to administer rAAV particles to a mammal by the methods of the invention.

In some embodiments, intraoperative magnetic resonance imaging (iMRI) and/or real-time imaging of the delivery may be performed. In some embodiments, the device is used to administer rAAV particles to a mammal by the methods of the invention. iMRI is known in the art as a technique for MRI-based imaging of a patient during surgery, which helps confirm a successful surgical procedure (e.g., to deliver rAAV particles to the CNS) and reduces the risk of damaging other parts of the tissue (for further descriptions, see, e.g., Fiandaca et al., (2009) *Neuroimage* 47 Suppl. 2:T27-35). In some embodiments, a tracing agent (e.g., an MRI contrast enhancing agent) may be co-delivered with the infusate (e.g., a composition including rAAV particles) to provide for real-time monitoring of tissue distribution of infusate. See for example Fiandaca et al., (2009) *Neuroimage* 47 Suppl. 2:T27-35; U.S. PG Pub 2007/0259031; and U.S. Pat. No. 7,922,999. Use of a tracing agent may inform the cessation of delivery. Other tracing and imaging means known in the art may also be used to follow infusate distribution.

In some embodiments, rAAV particles may be administered by standard stereotaxic injection using devices and methods known in the art for delivery of rAAV particles. Generally, these methods may use an injection device, a planning system for translating a region of the tissue targeted for delivery into a series of coordinates (e.g., parameters along the latero-lateral, dorso-ventral, and rostro-caudal axes), and a device for stereotaxic localization according to the planned coordinates (a stereotactic device, optionally including the probe and a structure for fixing the head in place in alignment with the coordinate system). A non-limiting example of a system that may be useful for MRI-guided surgery and/or stereotaxic injection is the ClearPoint® system (MRI Interventions, Memphis, Tenn.).

In some embodiments, the device for convection enhanced delivery comprises a pump (e.g., an osmotic pump and/or an infusion pump). Osmotic and/or infusion pumps are commercially available (e.g., from ALZET® Corp., Hamilton Corp., ALZA Inc. in Palo Alto, Calif.). Pump systems may be implantable. Exemplary pump systems may be found, e.g., in U.S. Pat. Nos. 7,351,239; 7,341,577; 6,042,579; 5,735,815; and 4,692,147. In some embodiments, the pump is a manual pump. Exemplary devices for CED, including reflux-resistant and stepped cannulae, may be found in WO 99/61066 and WO 2006/042090, which are hereby incorporated by reference in its entirety.

In some embodiments, the device for convection enhanced delivery comprises a reflux-resistant cannula (e.g., a reflux-free step design cannula). Further descriptions and exemplary reflux-resistant cannulae may be found, for example, in Krauze et al., (2009) *Methods Enzymol.* 465: 349-362; U.S. PG Pub 2006/0135945; U.S. PG Pub 2007/0088295; and PCT/US08/64011. In some embodiments, only one cannula is used. In other embodiments, more than one cannula is used. In some embodiments, the device for convection enhanced delivery comprises a reflux-resistant cannula joined with a pump that produces enough pressure to cause the infusate to flow through the cannula to the target tissue at controlled rates. Any suitable flow rate can be used such that the intracranial pressure is maintained at suitable levels so as not to injure the brain tissue.

In some embodiments, the cannula is a stepped cannula. As described, e.g., in WO 2006/042090, a stepped cannula has a number of steps (e.g., four in FIG. 1 of WO 2006/042090). The steps nearest the distal end of the cannula are those that enter the target tissue first, and, accordingly, the number of steps entering the target tissue (e.g., the striatum) will depend on the depth of penetration needed to reach that target in the subject. With respect to delivery to the brain, the operator can readily determine the appropriate depth of penetration, taking into account both the size of the subject being treated and the location within the brain that is being targeted.

The cannula may be connected to a pump through a system of tubing. Tubing extends through the lumen of cannula and the infusate may be delivered through this tubing. In embodiments containing the tubing, the tubing may be flush with the distal end of the cannula. Alternatively, the tubing extends from the distal end of the cannula, hi such embodiments, the amount which the tubing extends may vary depending on the application. Generally, the tubing will extend from about 1 mm to about 1 cm from the cannula (or any length therebetween), e.g., from about 1 to about 50 mm (or any length therebetween), or from about 1 mm to about 25 mm (or any length therebetween, including, but not limited to, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 nm, 18 mm, 19 mm, 20 mm, 21 mm, 22 mm, 23 mm, 24 mm or 25 mm), such as 10 mm beyond the distal end thereof.

The tubing extending through the cannula may have a coating or surrounding material in one or more regions, for example to protect the tubing in contact with the infusate. Thus, in certain embodiments, tubing (e.g., FEP (Teflon) tubing) protects the portion of the fused silica tubing extending beyond the proximal end of the stainless steel cannula. The fused silica tubing maybe connected to the syringe by any suitable means, including, but not limited to, a Luer compression fitting, and the syringe is driven by a syringe pump (manual, electronic and/or computerized). It will apparent that the syringe size can be selected by the operator to deliver the appropriate amount of product(s). Thus, 1 mL, 2.5 mL, 5 mL, or even larger syringes maybe used.

Stepped cannulae may be made out of the variety of materials that are physiologically acceptable, including without limitation stainless steel (e.g., 316SS or 304SS), metal, metal alloys, polymers, organic fibers, inorganic fibers and/or combinations thereof.

Optionally, an infusate-contact surface (e.g., tubing or coating) may extend through the lumen of the cannula. A variety of materials may also be used for the o infusate-contact surface, including but not limited to metals, metal alloys, polymers, organic fibers, inorganic fibers and/or combinations thereof. In some embodiments, the product-contact surface is not stainless steel. In such embodiments, the outer cannula may still be made of a material physiologically compatible with the target tissue, but there since there is no product contact it need not be compatible with the biologically active agent or product formulation.

In some embodiments, penetration of the infusate is further augmented by the use of a facilitating agent. A facilitating agent is capable of further facilitating the delivery of infusate to target tissue (e.g., CNS target tissue). A non-limiting example of a facilitating agent is low molecular weight heparin (see, e.g., U.S. Pat. No. 7,922,999).

Suitable packaging for pharmaceutical compositions described herein are known in the art, and include, for example, vials (such as sealed vials), vessels, ampules, bottles, jars, flexible packaging (e.g., sealed Mylar or plastic bags), and the like. These articles of manufacture may further be sterilized and/or sealed.

Further provided herein are methods for treating a disorder of the CNS in a mammal comprising administering a rAAV particle to the mammal according to the methods described herein. Yet further provided are methods for treating Huntington's disease in a mammal comprising administering a rAAV particle to the mammal according to the methods described herein using a system as described herein.

The present invention also provides kits for administering a rAAV particle described herein to a mammal according to the methods of the invention. The kits may comprise any of the rAAV particles or rAAV particle compositions of the invention. For example, the kits may include rAAV particles with a rAAV vector encoding a heterologous nucleic acid that is expressed in at least the cerebral cortex and striatum of a mammal. In some embodiments, the kits further comprise any of the devices or systems described above.

In some embodiments, the kits further include instructions for CNS delivery (e.g., delivery to the striatum of a mammal) of the composition of rAAV particles. The kits described herein may further include other materials desirable from a commercial and user standpoint, including other buffers, diluents, filters, needles, syringes, and package inserts with instructions for performing any methods described herein. Suitable packaging materials may also be included and may be any packaging materials known in the art, including, for example, vials (such as sealed vials), vessels, ampules, bottles, jars, flexible packaging (e.g., sealed Mylar or plastic bags), and the like. These articles of manufacture may further be sterilized and/or sealed. In some embodiments, the kits comprise instructions for treating a disorder of the CNS described herein using any of the methods and/or rAAV particles described herein. The kits may include a pharmaceutically acceptable carrier suitable for injection into the CNS of an individual, and one or more of: a buffer, a diluent, a filter, a needle, a syringe, and a package insert with instructions for performing injections into the striatum of a mammal.

In some embodiments, the kits further contain one or more of the buffers and/or pharmaceutically acceptable excipients described herein (e.g., as described in REMING-TON'S PHARMACEUTICAL SCIENCES (Mack Pub. Co., N.J. 1991). In some embodiments, the kits include one or more pharmaceutically acceptable excipients, carriers, solutions, and/or additional ingredients described herein. The kits described herein can be packaged in single unit dosages or in multidosage forms. The contents of the kits are generally formulated as sterile and can be lyophilized or provided as a substantially isotonic solution.

EXAMPLES

The invention will be more fully understood by reference to the following examples. They should not, however, be construed as limiting the scope of the invention. It is understood that the examples and embodiments described herein are for illustrative purposes only and that various modifications or changes in light thereof will be suggested to persons skilled in the art and are to be included within the spirit and purview of this application and scope of the appended claims.

Example 1: Widespread GFP Expression after Intrastriatal AAV1 Vector Delivery

The ability of AAV1 to efficiently target both striatal and cortical structures in the Rhesus monkey brain when delivered via convection-enhanced delivery (CED) was evaluated. AAV vectors containing GFP cDNA under the control of cytomegalovirus enhancer/chicken beta-actin (CBA) promoter were infused into the caudate and putamen of 9 adult male Rhesus monkeys using CED (see, e.g., Bankiewicz et al., (2000) *Exp. Neurol.* 164:2-14 and WO 2010/088560).

Methods

Surgical Delivery

Nine adult male Rhesus macaques (*Macaca mulatta;* 8.9-11.9 kg) were included in this study. All animals received an infusion of AAV vector bilaterally into caudate nucleus and putamen by means of MRI-guided CED (Richardson, R. M. et al. (2011) *Neurosurgery* 69:154-163; Richardson, R. M. et al. (2011) *Stereotact. Funct. Neurosurg.* 89:141-151; Richardson, R. M. et al. (2011) *Mol. Ther.* 19:1048-1057). Immediately prior to surgery, animals were anesthetized with Ketamine HCL (10 mg/kg), weighed, intubated, and maintained on 1-5% isoflurane. The head was mounted onto a stereotaxic frame, and the animal transported to the MRI (Siemens 3.0 T Trio MR unit) for a T1-weighted planning scan. After scanning, animals were transferred to the operating room and the head prepared for an implantation procedure, and a ceramic custom-designed fused silica reflux-resistant cannula with a 3-mm stepped tip was used for the infusion. Temporary guide cannula were implanted bilaterally (one per hemisphere) using standard methods.

Animals received bilateral infusions into caudate nucleus and putamen of either AAV1-eGFP or AAV2-eGFP vectors obtained with 2 different production methods: Triple Transfection (TT) or Producer Cell Line (PCL). Vector concentrations and doses are described in Table 5. Animals were tested for the presence of anti-AAV1 and anti-AAV2 neutralizing antibodies as previously described and were considered seronegative as they presented antibody titers of <1:32 (Bevan, A. K. et al. (2011) *Mol. Ther.* 19:1971-1980). Survival time was 1 month after AAV delivery for all the animals.

Each animal received up to three microinjections per hemisphere to target the caudate and the putamen (pre-commissural and post-commissural) regions, as shown in Table 2. To visualize infusate distribution during MRI, Prohance (2 mM gadoteridol) was added to the virus. Approximately 30 µl of AAV was administered into the caudate and 60 µl into the putamen using the convection enhanced delivery (CED) method (i.e., 90 µL per hemisphere). The infusion rate was ramped up to a maximum of 5 µL/min.

TABLE 2

Parenchymal dose volumes per site.

| Vector Production Method | Dose per Hemisphere (vg) | Subject Number | Target Structure | Hemisphere | Number of Dosing Sites | Dose Volume (µL) |
|---|---|---|---|---|---|---|
| AAV1-eGFP (TT) | $1.71 \times 10^{11}$ | 1 | Putamen | Right | 2 | 30 + 30 |
| | | | | Left | 2 | 30 + 30 |
| | | | Caudate | Right | 1 | 30 |
| | | | | Left | 1 | 30 |
| | | 2 | Putamen | Right | 2 | 30 + 30 |
| | | | | Left | 2 | 30 + 30 |
| | | | Caudate | Right | 1 | 30 |
| | | | | Left | 1 | 30 |
| | | 3 | Putamen | Right | 2 | 30 + 30 |
| | | | | Left | 2 | 30 + 30 |
| | | | Caudate | Right | 1 | 30 |
| | | | | Left | 1 | 30 |
| AAV2-eGFP (TT) | $1.71 \times 10^{11}$ | 6 | Putamen | Right | 2 | 30 + 30 |
| | | | | Left | 1 | 60 |
| | | | Caudate | Right | 1 | 30 |
| | | | | Left | 2 | 15 + 15 |
| | | 7 | Putamen | Right | 1 | 60 |
| | | | | Left | 2 | 30 + 30 |
| | | | Caudate | Right | 1 | 30 |
| | | | | Left | 1 | 30 |
| AAV1-eGFP (PCL) | $1.71 \times 10^{11}$ | 5 | Putamen | Right | 1 | 60 |
| | | | | Left | 1 | 60 |
| | | | Caudate | Right | 1 | 30 |
| | | | | Left | 2 | 18 + 20 |
| | Left: $2.4 \times 10^{11}$ Right: $2.8 \times 10^{11}$ | 4 | Putamen | Right | 1 | 60 |
| | | | | Left | 1 | 60 |
| | | | Caudate | Right | 2 | 56.4 + 31 |
| | | | | Left | 2 | 33.6 + 31 |
| AAV2-eGFP (PCL) | $1.71 \times 10^{11}$ | 8 | Putamen | Right | 1 | 62 |
| | | | | Left | 1 | 60 |
| | | | Caudate | Right | 2 | 30 + 20 |
| | | | | Left | 1 | 30 |
| | | 9 | Putamen | Right | 2 | 20 + 35 |
| | | | | Left | 2 | 42 + 19.6 |
| | | | Caudate | Right | 1 | 30 |
| | | | | Left | 1 | 30 |

The first cohort of animals received $1.7 \times 10^{11}$ vg of AAV1-eGFP (TT) (n=3), or AAV2-eGFP (TT) (n=2) per hemisphere. The second cohort of animals received $1.7 \times 10^{11}$ vg of AAV1-eGFP (PCL) (n=2), or $1.3 \times 10^{11}$ vg of AAV2-eGFP (PCL) (n=2). Serial MRI was acquired to monitor infusate distribution within each target site and provide real-time feedback to the team. Immediately after the intraparenchymal dosing procedure, animals were transferred to the operating room, the guide cannula removed, and wound site closed in anatomical layers. All experiments were performed in accordance with National Institutes of Health guidelines and with protocols approved by the institutional Animal Care and Use Committee. Immediately after surgery, the animals were transferred to the MRI suite for AAV dosing procedures. Comments regarding the dosing procedure for each of the subjects depicted in Table 2 are provided below.

Dosing Procedure—Treatment Group 2
(AAV1-eGFP TT)

Subject Number 1. Approximately 60 µL of infusate was administered per hemisphere via two trajectories (30 µL/deposit) into each putamen. Coronal images from infusions into the anterior putamen showed a majority of gadolinium signal within each of the targeted structures. In the right hemisphere, slight perivascular transport was seen in the ventral putamen and distribution into the anterior commissure.

Subject Number 2. T1 MRI was acquired after 0.127 mL infusion into the putamen and 0.207 mL into the thalamus. Post infusion T1 MRI showed extensive infusate distribution within the right thalamus measuring approximately 1 cm in the anterior-posterior direction and 1 cm in the dorso-ventral direction. Coronal T1 showed gadolinium distribution within the target site that extended medially towards the internal capsule and superiorly toward the dorsal putamen. A majority of the infusate was contained within the putaminal margins; however, transport via the perivascular space was also present in white matter tracts of the internal capsule and anterior commissure. Analysis revealed that the ratio of gadolinium infusion volume (Vi) to distribution volume (Vd) in the thalamus and putamen was 1:2.

In-Life Observations

Detailed observations of animal health and neurological symptoms were performed on a daily basis for a period of 5 days after dosing; subsequently, detailed observations were performed once per week until study termination. Observations and daily mortality checks were performed. Body weights assessments were performed before intracranial dosing, at time of blood collection procedures, and at necropsy. No significant difference in body weight was observed between the treatment groups prior to surgery or at the time of necropsy (FIG. 1). Whole blood, blood serum and cerebrospinal fluid (CSF) were collected for hematology, serum chemistry, AAV1 and AAV2 capsid antibody assay and eGFP mRNA level analysis.

In-Life Blood Collection and Processing

Blood (approximately 5 mL) was collected prior to injection, approximately 72 hours post-injection, and at necropsy according to the Blood Sample Collection Schedule (see Table 3 below). Approximately 0.5-1.0 mL of whole blood was collected into EDTA tubes for hematology analysis. Approximately 2.0 mL of whole blood was collected into serum separator tubes (with gel, BD Microtainer) and processed to serum to obtain approximately serum for chemistry analysis and AAV1 and AAV2 Capsid antibody analysis.

TABLE 3

Blood sample collection schedule

| Time Point | Hematology | Serum Chemistry | AAV1 and AAV2 Antibody Analysis |
|---|---|---|---|
| Prior to Injection | X | X | X |
| 72 Hours Post-Injection | X | X | N/A |
| Necropsy | X | X | X |
| Volume of Whole Blood | 1 mL | 2 mL | 2 mL |
| Anticoagulant | EDTA | N/A | N/A |

X = samples were collected
N/A—not applicable
EDTA—Ethylenediaminetetraacetic acid

CSF Collection and Processing

CSF was collected at two separate time points: prior to intracranial dosing and at necropsy. CSF collection was performed under anesthesia by cervical spinal tap with the animal placed in a prone position. Prior to test article administration, 1-2 mL of CSF was collected, frozen on dry ice, and stored at ≤−60° C. At necropsy (prior to PBS perfusion) 2-4 mL of CSF were collected, filtered through a 0.8 micron syringe filter into a labeled collection tube, and transferred in duplicate (1 mL aliquot for Capsid Antibody analysis and 2-4 mL aliquot for GFP analysis) into eppendorf tubes, immediately frozen on dry ice and stored at ≤−60° C.

Necropsy and Tissue Collection

All animals were euthanized at approximately 30 days after the intracranial dosing procedure. Each animal was euthanized using intravenous administration of sodium pentobarbital. Following euthanasia and blood and CSF collection, the body was transcardially perfused with PBS (under RNAse free conditions), followed by perfusion with PFA. The descending aorta was clamped to reduce fixation of peripheral tissues. This procedure was used to collect fixed brain tissue in addition to fresh peripheral tissue samples for GFP analysis by QPCR. The Tissue Collection Table lists the tissues that were collected (Table 4). During PBS perfusion (prior to initiation of 4% PFA perfusion) biopsy samples (0.5-1.0 cm$^3$) of select tissues (also listed in the Tissue Collection Table) were collected under RNAse free conditions with disposable sterile scalpels (a new scalpel for each individual biopsy) into RNAse free tubes, and stored frozen at ≤−60° C.

TABLE 4

Tissue Collection

| Tissues Collected into PFA | Tissues Collected Frozen (biopsy punch) |
|---|---|
| Brain | Heart |
| Spinal Cord | Kidney |
|  | Liver |
|  | Lung |
|  | Spleen |
|  | Testes |
|  | Cervical lymph nodes |
|  | Quadricep |
|  | Sciatic Nerve |
|  | Optic Nerve |
|  | Eye |

Brain and Spinal Cord Processing

The entire brain was carefully removed from the animal and photographed along-side a ruler for scale. Once removed from the skull the brain was placed into a brain matrix and coronally sliced into 6 mm blocks. Coronal blocks were stored in PFA and processed for histology. Relevant blocks containing the frontal cortex and midbrain regions were sectioned into free floating 40 micron sections. The entire spinal cord was carefully removed from the animal. Spinal cord segments were stored in PFA and processed for histology. A representative segment from the cervical, thoracic, and lumbar region were sectioned into free floating 40 micron sections.

After perfusion with PBS-heparin followed by 4% buffered paraformaldehyde (PFA), the brain from each animal was cut into 6-mm blocks (coronal plane) using disposable blades and monkey brain matrix. The sequential blocks (11-12 brain slabs per animal) were placed horizontally on a white board and photographed with sequentially assigned letters. All brain blocks were then post-fixed in 4% buffered PFA for 24 hours. The quality of fixation for each block was inspected visually (no pink color was observed within blocks). After PFA-postfixation, each brain block was processed for free-floating sections by rinsing 3× in PBS and immersion in 30% sucrose (cryopreservation) before cutting into 40-µm free-floating sections.

Production of AAV Vectors

Prior to clinical evaluation, AAV vectors are typically produced via the standard triple transfection method (TT) in which HEK293 cells are co-transfected with two or three plasmids encoding the cis (vector genome) and trans (AAV rep and cap genes; adenoviral helper genes E2A, E4, and VA) elements required for vector packaging (Hauck et al., (2009) *Mol. Ther.* 17:144-152). Since input of plasmid DNA may be easily and rapidly modified, this method allows evaluation of vectors based on diverse serotypes and harboring a variety of expression cassettes. Despite its flexibility and relatively fast turn-around time, the transfection method presents a challenge with regard to scalability, which limits the suitability of this method for large-scale rAAV vector production for clinical use.

At the present time, clinical-grade rAAV is generated at large scale via the helper virus-free transient transfection method, the recombinant baculovirus or herpes simplex virus-based production systems, or packaging/producer cell lines (Ayuso et al., (2010) *Curr. Gene Ther.* 10:423-436). Adeno-associated virus producer cell lines (PCL) are an effective method for large-scale production of clinical grade AAV vectors. In this system, a single plasmid containing three components, the vector sequence, the AAV rep, and cap genes, and a selectable marker gene is stably transfected into HeLaS3 cells. However, it is desirable to determine whether AAV vector derived from producer cell lines is equivalent in potency to vector generated via other methods, for example, the standard transient transfection method.

AAV viral vectors were generated for this study using two different production methods: triple transfection (TT) and producer cell line (PCL). Recombinant AAV vectors AAV1-GFP (TT) and AAV2-GFP (TT) were produced by triple transfection (using calcium phosphate) of human embryonic kidney carcinoma 293 cells (HEK-293) (referenced in Xiao et al., (1998) *Journal of Virology* 72:2224-2232). Briefly, for the production of AAV vectors by transient transfection, HEK293 cells were transfected using polyethyleneimine (PEI) and a 1:1:1 ratio of the three plasmids (ITR vector, AAV2rep/cap2 or AAV2rep/cap1, and pAd helper plasmid). The ITR vector plasmid encoded the cDNA for EGFP downstream of the cytomegalovirus enhancer/chicken beta actin-hybrid promoter (CBA). The pAd helper used was pHelper (Stratagene/Agilent Technologies, Santa Clara, CA).

Recombinant AAV vectors AAV1-GFP (PCL) and AAV2-GFP (PCL) were produced using an AAV producer cell process (referenced in Thorne et al., (2009) *Human Gene Therapy* 20:707-714 and Martin et al., (2013) *Human Gene Therapy Methods* 24:253-269). Briefly, product-specific producer cell lines were generated by stable transfection of Hela-S3 cells (ATCC CCL-2.2) with a plasmid containing the rep gene from serotype 2 and a capsid gene from either serotype 1, or 2, the promoter-heterologous nucleic acid sequence, the vector genome flanked by AAV2 inverted terminal repeats (ITRs), and a Puromycin resistance gene. The vector genome harbored the cDNA for EGFP downstream of the cytomegalovirus enhancer/chicken beta actin-hybrid promoter, CBA. Transfected cells were grown in the presence of puromycin to isolate stable integrants. The cell lines generated were screened to select a lead clone. The product-specific cell clone was subsequently expanded to a production bioreactor, and infected with a wild type Adenovirus as helper to initiate AAV production. Virus was harvested 72 hours post-infection, the adenovirus was inactivated by heat and removed by anion exchange methods.

Purification of AAV from both production platforms was performed as previously described (Qu, G. et al. (2007) *J. Virol. Methods* 140:183-192). The resulting titers of all AAV1 and AAV2-GFP vectors are shown on Table 5. All vectors were prepared in water containing 180 mM sodium chloride; 10 mM sodium phosphate (5 mM $NaH_2PO_4.2H_2O$ + 5 mM $Na_2HPO_4.H_2O$); and 0.001% Poloxamer 188 (Lutrol F68), pH 7.5.

TABLE 5

Study design table and test articles

| Group | No. of Animals | Test Article | Drug concentration | Vector Dose per hemisphere (vg) |
|---|---|---|---|---|
| 1 | 3 | ssAAV2/1-CBA-GFP (TT) | $1.90 \times 10^{12}$ vg/mL | $1.7 \times 10^{11}$ |
| 2 | 2 | ssAAV2/2-CBA-GFP (TT) | $1.90 \times 10^{12}$ vg/mL | $1.7 \times 10^{11}$ |
| 3 | 2 | ssAAV2/1-CBA-GFP (PCL) | $2.30 \times 10^{12}$ vg/mL | $1.7 \times 10^{11}$ |
| 4 | 2 | ssAAV2/2-CBA-GFP (PCL) | $1.43 \times 10^{12}$ vg/mL | $1.3 \times 10^{11}$ |

Immunohistochemistry

Immunostaining with antibodies against GFP (1:500, AB3080; Chemicon) was performed on Zamboni fixed 40-μm coronal sections covering the entire frontal cortex and extending in a posterior direction to the level of the striatum. The localization of GFP immunopositive neurons was analyzed with reference to The Rhesus Monkey Brain in Stereotactic Coordinates (Paxinos, G. H. X. and Toga, A. W. (2000) San Diego, Calif.: Academic Press) to identify specific areas of immunostaining in the cortex and striatum.

GFP staining by 3,3'-diaminobenzidine (DAB): Sections (3 per each 6-mm block: separation of 2 mm) were washed 3 times in PBST for 5 min each followed by treatment with 1% $H_2O_2$ for 20 min. Sections were incubated in Sniper blocking solution (available online at biocare.net/product/background-sniper/) for 30 min at room temperature followed by overnight incubation with the primary anti-GFP antibody (available online at www.lifetechnologies.com/) diluted 1:1000 in Da Vinci Green Diluent (available online at biocare.net/). After 3 rinses in PBS containing 0.1% Tween-20 (PBST) for 5 min each, sections were incubated in Mach 2 HRP polymer (http://biocare.net/) for 1 h, followed by 3 washes and colorimetric development (DAB). Immunostained sections were counterstained with cresyl violet and mounted on slides and sealed with Cytoseal® (available online at www.thermoscientific.com/).

Calculation of coverage of GFP expression in the non-human primate (NHP) brain: GFP staining from matching IHC-stained serial sections was projected onto individual corresponding MRI scans of each monkey brain (T1-weighted MR images in the coronal plane). Distribution/coverage of GFP expression was performed with OsiriX Imaging Software version 3.1 (The OsiriX Foundation, Geneva, Switzerland).

Double-immunofluorescence for vector tropism and efficiency of neuronal transduction: For double fluorescence immunostaining of different cellular markers (NeuN, S-100, Iba1) with GFP, a combination of primary antibodies was applied to sections as a cocktail of primary antibodies by overnight incubation at room temperature in PBST with 20% horse serum. Primary antibodies used were as follows: anti-GFP antibody (1:500, as above); anti-NeuN (1:500, available online at www.emdmillipore.com/); anti-S-100 (1:300, available online at biocare.net/), anti-Iba1 (1:500, available online at biocare.net/); anti-Olig2 (1:50, available online at www.emdmillipore.com/). After 3 washes in PBST, primary antibodies were visualized by incubation in the dark for 2 hours with appropriate secondary fluorochrome-conjugated antibodies: goat anti-mouse DyLight 549 and goat anti-rabbit DyLight 488 (available online at www.biocare.net/). All secondary antibodies were diluted 1:1,000 in Fluorescence Antibody Diluent (available online at biocare-.net/). In addition, to quench autofluorescence, sections were incubated in 0.1% Sudan Black solution (70% ethanol). After final washes in PBS, sections were cover-slipped with Vectashield Hard Set Mounting Medium for Fluorescence (available online at www.vectorlabs.com/). Control sections were processed without primary antibodies, and no significant immunostaining was observed under these conditions.

Figures 10A, 10B, 10C:
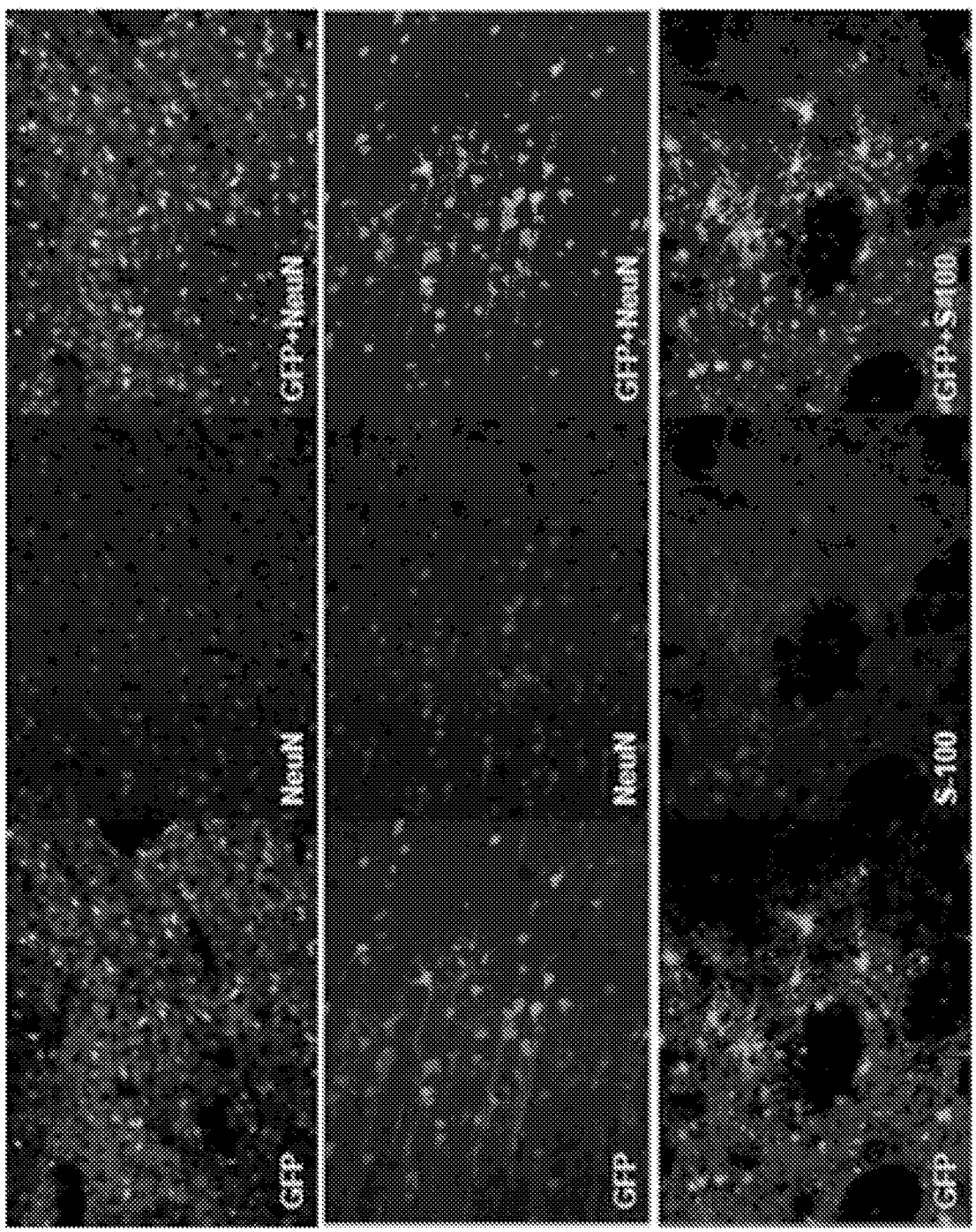
FIGS. 10A-10E show the cellular tropism of AAV1-eGFP and AAV2-eGFP injected into the monkey brain. Monkey brain sections were processed for double immunofluorescence staining against GFP and various cellular markers to determine cellular tropism of the injected vectors.

Zeiss Axioskop fluorescence microscope (available online at www.zeiss.com/) equipped with CCD color video camera and image analysis system (Axiovision Software, available online at www.zeiss.com/) was used to determine the presence of double-labeled cells (positive in both red and green channels). Photomicrographs for double-labeled sections were obtained by merging images from two separate channels (red and green; co-localization appears yellow) without altering the position of the sections or focus (objective×20). For GFP/NeuN double-staining, 3 sections from each monkey at ~4-mm intervals were selected from the sites of vector infusion. For evaluation of efficiency of neuronal transduction by AAV1-eGFP or AAV2-eGFP vectors within the targeted brain areas (caudate and putamen), 5 counting frames (700 µm×550 µm) were placed randomly in the GFP+ area. The primary area of transduction (PAT) was defined as GFP-positive area ("cloud") that covered more than 40% of the targeted structure. Similarly, to evaluate the efficiency of neuronal transduction, outside PAT (OPAT), 5 counting frames (700 µm×550 µm) from each section were chosen beyond the clear margins of GFP-positive "cloud" in the targeted structures (caudate and putamen) or in the cortex (FIG. 10C). To determine the proportion of GFP/NeuN-positive cells, each counting frame was counted twice, first with the red channel for the number of NeuN+ cells and second with a combined red and green channel for the number of co-stained cells (GFP+ and NeuN+). At least 1,500 NeuN+ cells were counted for each of the 3 chosen sections (5 counting frames per section). Finally, the percentage of GFP+/NeuN+ to total NeuN+ was determined. All of the calculations for the striatum were made by adding results from both hemispheres of each animal and combining values from putamen and caudate nucleus since the mean transduction efficiencies were identical in both structures of each animal.

Quantitative Real-Time PCR (TaqMan)

GFP mRNA levels were measured by quantitative real-time PCR. Liver, heart, lung, kidney, and spleen samples were used for all RT-PCR analysis. Total RNA was extracted using the QIAGEN miRNeasy mini kit and then reverse transcribed and amplified using the High Capacity cDNA Reverse Transcription Kit (Applied Biosystems) according to the manufacturer's instructions. Quantitative RT-PCR reactions were conducted and analyzed on a QuantStudio12K Flex Real-Time PCR System (Applied Biosystems). Each sample was run in duplicate and the relative gene expression was determined using a standard curve.

MR Imaging Data Analysis

Semi-quantitative Analyses (Digital MRIs Vd/Vi): Distribution volume (Vd) analysis was performed with OsiriX Imaging Software version 3.1 (The OsiriX Foundation, Geneva, Switzerland). Infusion sites, cannula tracks and cannula tip were identified on T1-weighted MR images in the coronal plane. Regions-of-interest (ROIs) were delineated to outline T1 gadolinium signals and target sites (i.e. putamen and caudate nucleus). Three-dimensional volumetric reconstructions of the image series and ROI were analyzed to estimate volume of distribution (Vd) of infusions and ratio to volume of infusate (Vi).

Histological analysis of transgene expression: To assess transgene expression, brain sections were processed for immunohistochemical analysis (IHC). Animals were deeply anesthetized with sodium pentobarbital (25 mg/kg i.v.) and euthanized 4 weeks after administration of the vectors. The brains were removed and sectioned coronally into 6-mm blocks. The blocks were post-fixed in buffered paraformaldehyde (4%) for 24 h, washed briefly in PBS and adjusted in a 30% sucrose/PBS solution for cryopreservation. The formalin-fixed brain blocks were cut into 40-µm coronal sections in a cryostat. Free-floating sections spanning the entire brain were collected in series and were kept in antifreeze solution for further IHC analysis.

Results

Figures 2A, 2B, 2C, 2D:
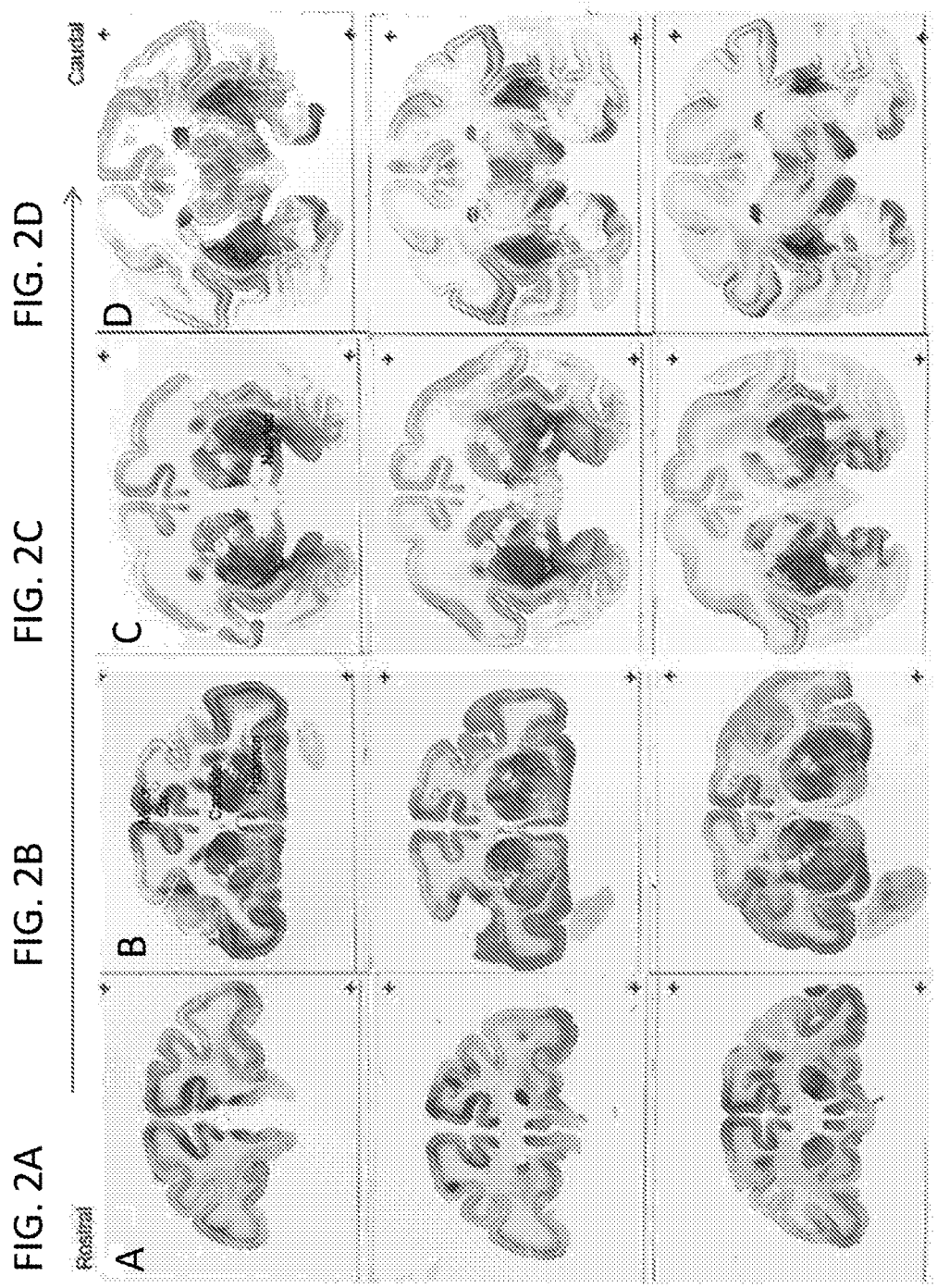
FIGS. 2A-2D show representative brain sections stained for GFP 30 days after infusion of AAV1-GFP (TT) into Rhesus monkey caudate and putamen. Sections in FIGS. 2A-2D extend through the brain in the rostral to caudal direction. Sections from three representative animals are displayed in each panel.

Both AAV1-GFP and AAV2-GFP vectors drove abundant expression of GFP from transduced neurons as visualized by immunohistochemistry. After infusion of AAV1 into the caudate and putamen by CED, extensive GFP immunostaining was detected in the caudate and putamen (FIGS. 2C&D), as well as the substantia nigra (FIG. 2D). In addition to the striatum a large number of cortical regions of the Rhesus monkey brain were also transduced (FIGS. 2A-D). Cortical GFP expression was most evident in prefrontal association cortical areas, the premotor cortex, primary somatosensory cortical areas, and the primary motor cortex, as well as extensive regions of the occipital cortex (FIGS. 2A-D).

A large majority of GFP-positive neurons within the cortex were identified morphologically as pyramidal neurons located in cortical lamina IV, with axonal projections into the overlying layers. The density of GFP-positive neurons was particularly high in the frontal (FIGS. 3A&B) and occipital cortex (FIGS. 3C&D), where large numbers of neurons (FIGS. 3B&D) in addition to astrocytes (FIGS. 3A&C) were transduced.

Example 2: Widespread GFP Expression after Intrastriatal AAV2 Vector Delivery

The ability of AAV2 to efficiently target both striatal and cortical structures in the Rhesus monkey brain when delivered via convection-enhanced delivery (CED) was evaluated. AAV vectors containing GFP cDNA under the control of cytomegalovirus enhancer/chicken beta-actin (CBA) promoter were infused into the caudate and putamen of 8 adult Rhesus monkeys using CED according to the methods described in Example 1 above.

Infusion of AAV2 into the striatum by CED resulted in GFP expression in the injected regions (caudate and putamen) (FIG. 4C), substantia nigra (FIG. 4D), and a large number of cortical regions of the Rhesus monkey brain (FIGS. 4A-D). Expression of GFP in the striatum of AAV2 injected animals appeared slightly more restricted and localized when compared to striatal coverage with AAV1 vectors. The expression of GFP within the NHP striatum was comprehensive but relatively contained within the gray matter bounds of the targeted region, with no evidence of significant infusion related leakage or reflux of the AAV2-GFP vector into adjacent non-targeted areas. Cortical GFP expression was evident in the same regions seen for AAV1. Prefrontal association cortical areas, the premotor cortex, primary somatosensory cortical areas, and the primary motor cortex, as well as extensive regions of the occipital cortex were well transduced (FIGS. 4A-D).

Example 3: Comparability of GFP Expression after Intrastriatal AAV1 and AAV2 Vectors Made by Triple Transfection or Producer Cell Line Process To date the majority of preclinical studies utilize AAV vectors made by Triple Transfection followed by purification using cesium chloride gradients or column chromatography. Thus, to evaluate the impact of vector production on biodistribution in vivo, two methods of vector production Triple Transfection (TT) or Producer Cell line (PCL), were compared. AAV1 and AAV2 vectors generated by these two different manufacturing platforms were administered via CED, and their distribution within the Rhesus monkey brain was compared.

Figure 5B:
FIGS. 5A-5D show representative brain sections stained for GFP 30 days after infusion of AAV1-GFP made by producer cell lines (PCL) (FIGS. 5A & 5B) or triple transfection (TT) (FIGS. 5C & 5D) processes into Rhesus monkey caudate and putamen.
Figure 5D:
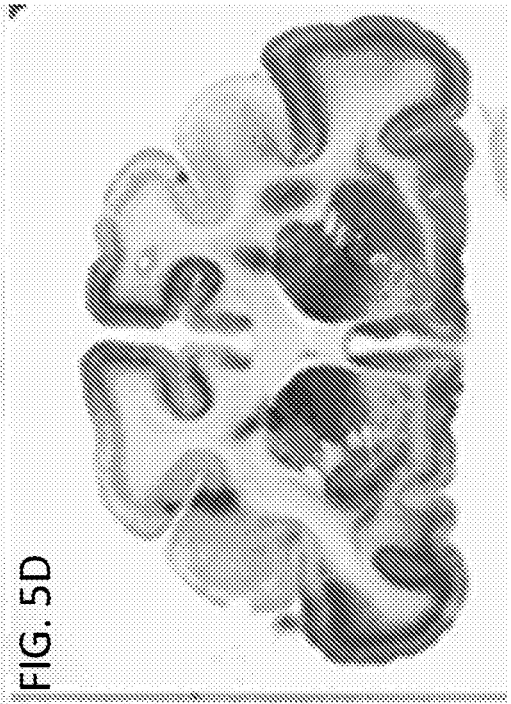
Figure 5A:
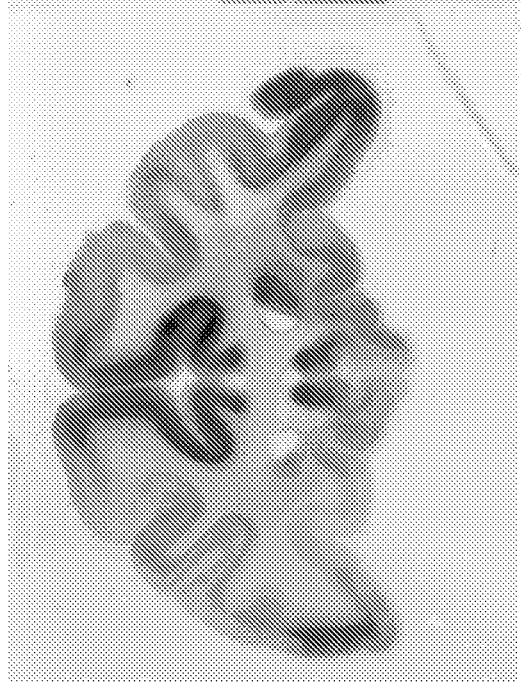
Figure 5C:
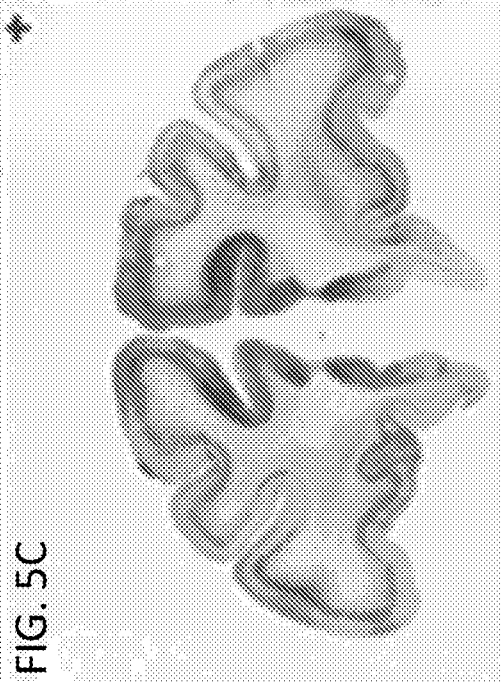

Infusion of AAV1-GFP vectors made by triple transfection yielded equivalent GFP distribution and coverage when compared to AAV1-GFP vectors made by the producer cell line process. GFP distribution was comparable between AAV1-GFP (TT) (FIGS. 5C&D) and AAV1-GFP (PCL) (FIGS. 5A&B) vectors 30 days following injection into the striatum of Rhesus monkeys.

Figures 6A, 6B, 6C, 6D:
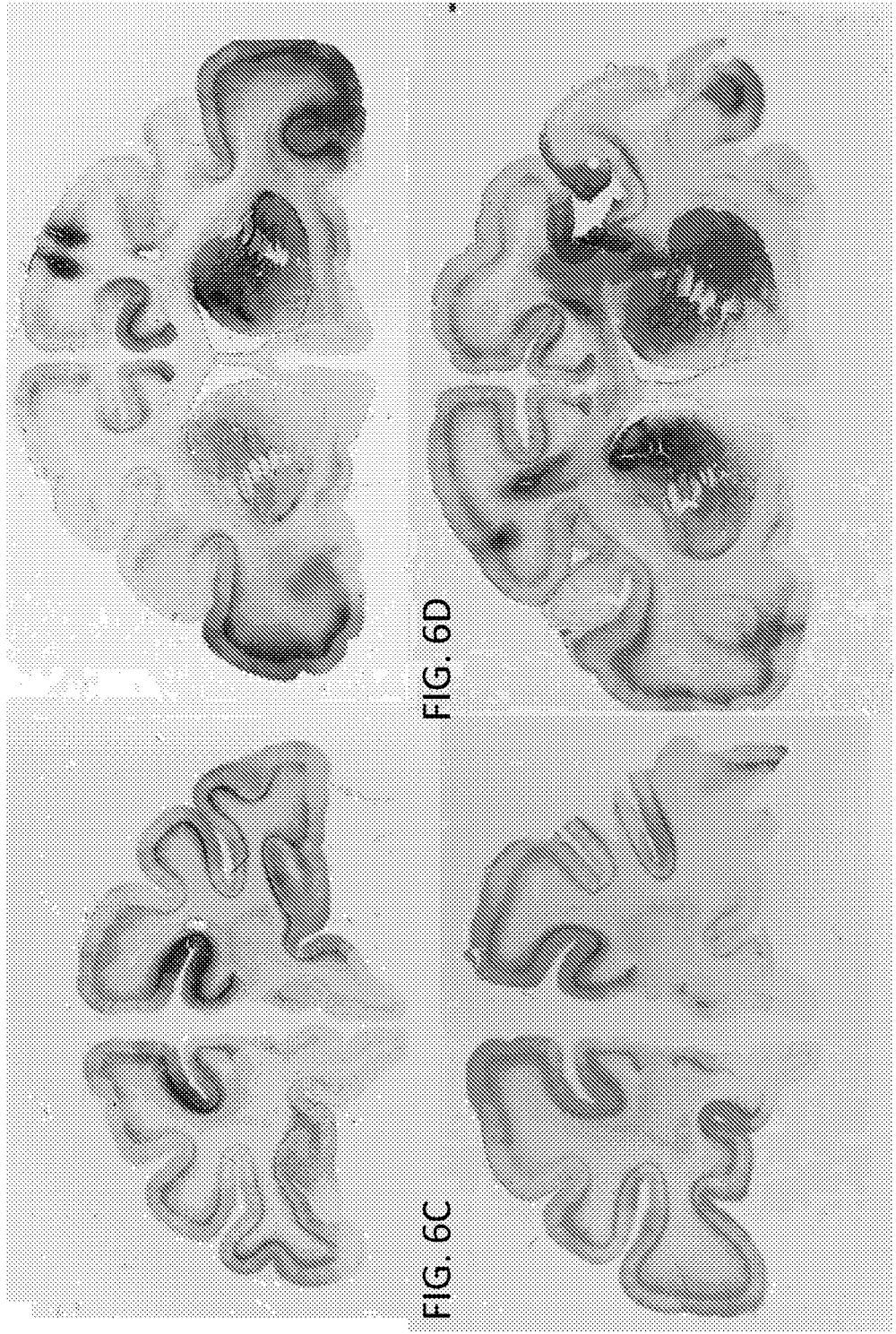
FIGS. 6A-6D show representative brain sections stained for GFP 30 days after infusion of AAV2-GFP made by producer cell line (PCL) (FIGS. 6A & 6B) or triple transfection (TT) (FIGS. 6C & 6D) processes into Rhesus monkey caudate and putamen.

Similar results were seen with the AAV2-GFP vectors. GFP distribution was similar and comparable between AAV2-GFP (TT) (FIGS. 6C&D) and AAV2-GFP (PCL) (FIGS. 6A&B) injected brains.

To measure infusion performance, AAV1-eGFP (TT); AAV2-eGFP (TT); AAV1-eGFP (PCL); and AAV2-eGFP (PCL) was infused into each striatum (60 μl into putamen and 30 μl into caudate nucleus), using 90 μl of each vector mixed with gadolinium contrast agent (2 mM Prohance; Bracco Diagnostics, Inc.). Magnetic resonance images (MRI) from each infusion confirmed that positioning of each cannula was accurate and infusate covered the target area. All infusions were well contained in the target structure. Three-dimensional reconstructions of the infusate distribution generated from gadolinium signal on MR images showed that both placement and distribution of infusate were very consistent throughout all the animals. In addition, the ratio (Vd/Vi) between volume of distribution (Vd) and volume of infusion (Vi) was calculated for each delivery and data were consistent across all infusions. Vd was approximately 3-fold larger (range of 2.1-4.6) than the Vi (Tables 6 and 7).

TABLE 6

Vector infusion and extent of distribution within the brain 4 weeks after transduction (mean ± st. dev.).

| $V_d/V_i$ [a] | Gadolinium coverage [b] | Cortical coverage of GFP expression [c] |
|---|---|---|
| AAV2-eGFP | | |
| 2.79 ± 0.44 | Putamen: 29.5 ± 10.9%<br>Caudate: 18.3 ± 5.2% | 62.2 ± 19.1% |
| AAV2-eGFP | | |
| 3.29 ± 0.75 | Putamen: 23.5 ± 9.3%<br>Caudate: 24.6 ± 8.0% | 61.3 ± 14.8% |

[a] Ratio of volume of distribution (Vd) to volume of infusion (Vi) was calculated (OsiriX Imaging software, v. 3.1) by dividing the volume of vector distribution within the injected brain parenchyma (based on the Gadolinium signal from MRI scans) by the volume of the injected vector. Values from left and right hemispheres were added to determine the average Vd/Vi for each animal.

[b] Gadolinium coverage within targeted structures was calculated (OsiriX Imaging software, v. 3.1) by dividing Vd by the volume of Putamen (600 mm³) or Caudate (500 mm³).

[c] Cortical GFP coverage was calculated by projecting GFP signal from matching IHC-stained sections onto corresponding MRI scans of each monkey (BrainLab software).

TABLE 7

Vector infusion and extent of distribution within the brain 4 weeks after transduction (individual values).

| NHP subject | $V_d/V_i$ [a] | Gadolinium coverage [b] | | | | Cortical GFP coverage [c] |
|---|---|---|---|---|---|---|
| AAV1-eGFP | | | | | | |
| 1<br>AAV1-eGFP<br>(TT) | Putamen: 3.2<br>Caudate: 2.1 | Putamen $_L$<br>Caudate $_L$ | 34.8%<br>14.8% | Putamen $_R$<br>Caudate $_R$ | 30.2%<br>16.2% | 91% |
| 2<br>AAV1-eGFP<br>(TT) | Putamen: 3.1<br>Caudate: 3.2 | Putamen $_L$<br>Caudate $_L$ | 35.7%<br>18.2% | Putamen $_R$<br>Caudate $_R$ | 18.3%<br>13.8% | 50% |
| 3<br>AAV1-eGFP<br>(TT) | Putamen: 3.3<br>Caudate: 2.2 | Putamen $_L$<br>Caudate $_L$ | 52.7%<br>19.4% | Putamen $_R$<br>Caudate $_R$ | 37.8%<br>21.2% | 41% |
| 4<br>AAV1-eGFP<br>(PCL) | Putamen: 3.0<br>Caudate: 2.3 | Putamen $_L$<br>Caudate $_L$ | 23.3%<br>23.8% | Putamen $_R$<br>Caudate $_R$ | 17.7%<br>20.6% | 61% |
| 5<br>AAV1-eGFP<br>(PCL) | Putamen: 2.7<br>Caudate: 2.8 | Putamen $_L$<br>Caudate $_L$ | 22.3%<br>26.8% | Putamen $_R$<br>Caudate $_R$ | 22.2%<br>8.6% | 68% |
| AAV2-eGFP | | | | | | |
| 6<br>AAV2-eGFP<br>(TT) | Putamen: 2.7<br>Caudate: 3.7 | Putamen $_L$<br>Caudate $_L$ | 22.7%<br>20.0% | Putamen $_R$<br>Caudate $_R$ | 16.2%<br>23.0% | 75% |

TABLE 7-continued

Vector infusion and extent of distribution within the brain 4 weeks after transduction (individual values).

| NHP subject | $V_d/V_i$ [a] | Gadolinium coverage [b] | | | | Cortical GFP coverage [c] |
|---|---|---|---|---|---|---|
| 7 AAV2-eGFP (TT) | Putamen: 2.9 Caudate: 3.9 | Putamen $_L$ 11.3% Caudate $_L$ 20.6% | | Putamen $_R$ 16.3% Caudate $_R$ 15.2% | | 47% |
| 8 AAV2-eGFP (PCL) | Putamen: 2.4 Caudate: 3.4 | Putamen $_L$ 36.0% Caudate $_L$ 34.0% | | Putamen $_R$ 19.8% Caudate $_R$ 39.4% | | 50% |
| 9 AAV2-eGFP (PCL) | Putamen: 4.6 Caudate: 2.7 | Putamen $_L$ 35.2% Caudate $_L$ 21.2% | | Putamen $_R$ 30.5% Caudate $_R$ 23.4% | | 73% |

[a] Ratio of volume of distribution (Vd) to volume of infusion (Vd) was calculated (OsiriX Imaging software, v. 3.1) by dividing the volume of vector distribution within the injected brain parenchyma (based on the Gadolinium signal from MRI scans) by the volume of the injected vector. Values from left and right hemispheres were added to determine the average Vd/Vi for each animal.
[b] Gadolinium coverage within targeted structures was calculated (OsiriX Imaging software, v. 3.1) by dividing Vd by the volume of Putamen (600 mm$^3$) or Caudate (500 mm$^3$).
[c] Cortical GFP coverage was calculated by projecting GFP signal from matching IHC-stained sections onto corresponding MRI scans of each monkey.

Figure 7:
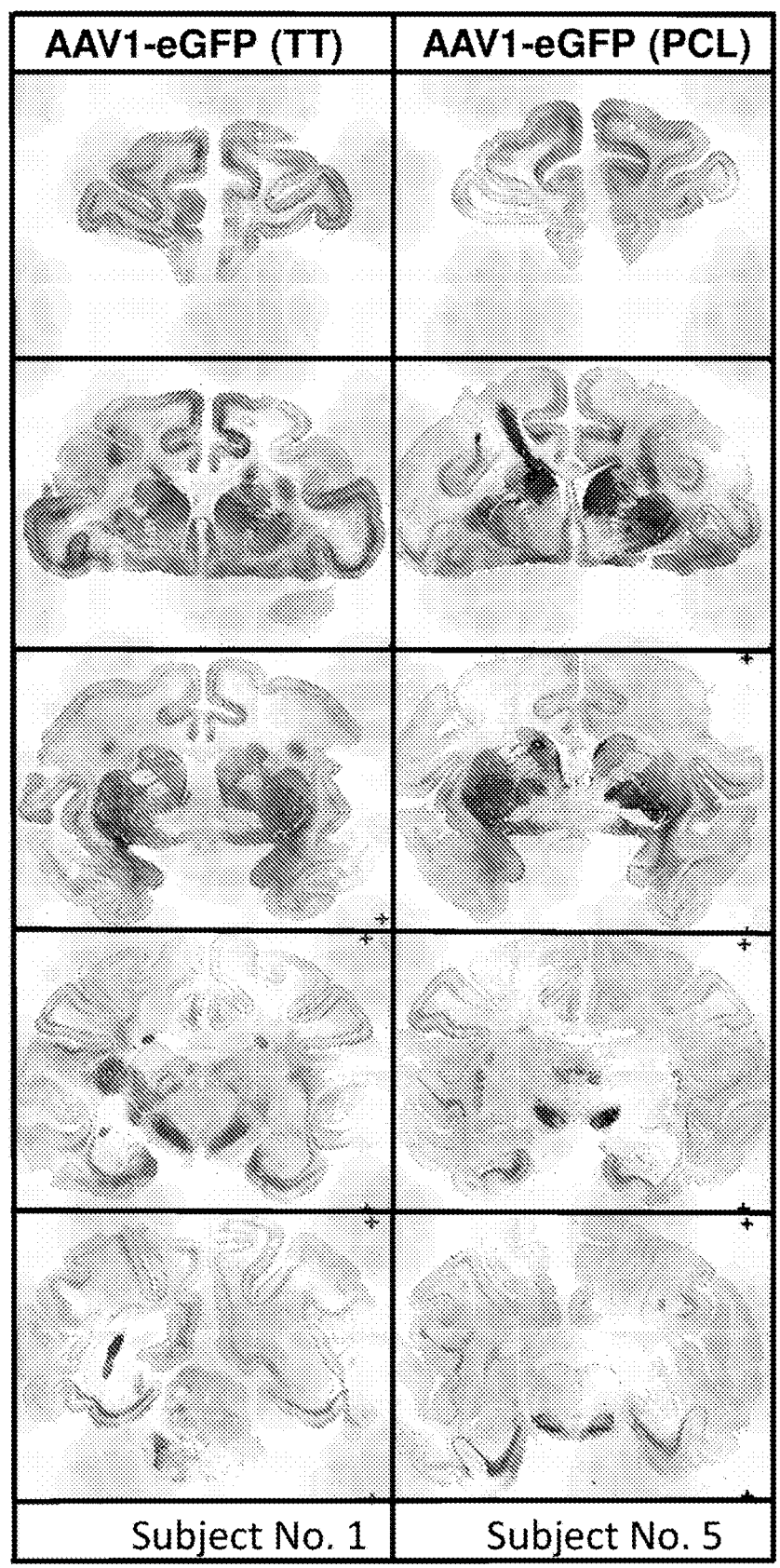
FIG. 7 shows the distribution of GFP in non-human primate (NHP) brains infused with AAV1-eGFP and AAV2-eGFP. AAV1-eGFP and AAV2-eGFP vectors were infused bilaterally into the striatum of 9 Rhesus macaques. Four weeks after the surgery, brains were processed for immunohistochemistry (IHC) against GFP. Columns show representative GFP-stained brain sections from 4 study groups infused with AAV1-eGFP (Triple Transfection; TT); AAV1-eGFP (Producer Cell Line; PCL); AAV2-eGFP (TT); AAV2-eGFP (PCL). Representative sections show various coronal planes of the brain to demonstrate distribution of GFP expression throughout the entire brain from frontal cortex, striatum (infusion sites), midbrain, to occipital parts of the cortex. All groups showed robust GFP signal in the sites of injection (putamen and caudate nucleus) as well as extensive transport to cortical regions and substantia nigra. Based on the IHC staining, the coverage of GFP expression in both target structure (striatum) and cortical regions were calculated for each monkey and are summarized in Table 7.

After bilateral injection of both AAV1-eGFP and AAV2-eGFP (prepared by both methods of productions, TT and PCL) into the striatum of NHP, robust expression of eGFP was evident throughout both the target structures (putamen and caudate nucleus) as well as projection regions (external and internal globus pallidus—GPe and GPi, substantia nigra—SN, subthalamic nucleus—STN, cortical regions—neuronal layers IV and V) regions (FIG. 7).

Figure 8:
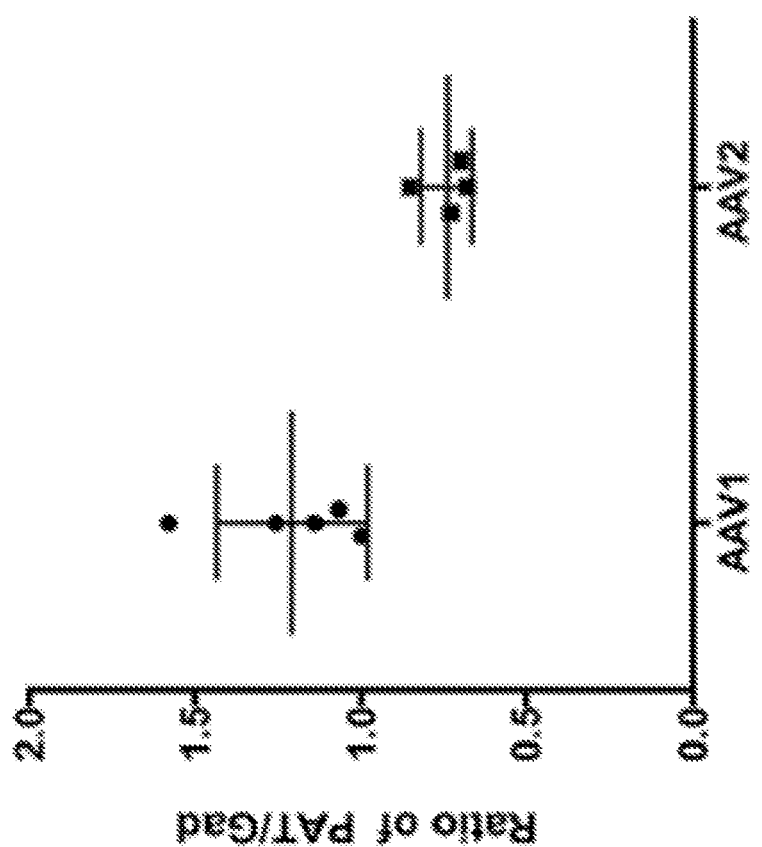
FIG. 8 shows the ratios of primary areas of transduction (PAT) to vector distribution (Vd). Primary areas of GFP expression in the striatum were delineated on scans from the GFP-stained sections and their values divided by values obtained from matching MRI scans with Gadolinium signal. Ratios >1.0 indicate that the extent of GFP expression exceeds the boundaries of Gadolinium signal after infusion. The results from monkeys infused with AAV vectors showed that AAV1 spreads better in the brain parenchyma than AAV2 (1.21±0.1 vs. 0.74±0.04; $p<0.007$ with 2-tailed unpaired t-test).

To evaluate role of Gadolinium (Gd) as a marker of vector distribution, the ratio of the area of GFP expression (from histological sections) to the area of Gadolinium signal on corresponding MR scans was calculated. For monkeys infused with serotype AAV1, this ratio was 1.21±0.10 whereas for AAV2 it was 0.74±0.04 (FIG. 8). The ratio of 1.0 indicates a perfect match between GFP expression and vector distribution as determined by MRI. This difference indicated that AAV1 vector distributed beyond the Gd signal and achieved better spread in the primary area of transduction than AAV2.

To evaluate the distribution of the infused AAV vectors within the brain, representative free-floating brain sections (3 per each block; 40-μm thick) from each animal were stained with a rabbit anti-GFP antibody (Millipore; Cat. No. 3850, dilution 1:500). Immunohistochemical assessment revealed dark brown DAB signal within the injected targets (right and left putamens and caudates) as well as multiple areas projected from the injected areas (cortical regions).

By projecting the extent of GFP expression onto MRI scans of each monkey brain, the percentage of coverage for cortical regions (brain areas relevant in HD) was calculated (see Table 6 for summary and Table 7 for further details). In all monkeys, 24% of striatum was transduced on average, which resulted in substantial expression of GFP in the cortex (FIG. 7). The extent of GFP expression in the cortex did not correlate with the AAV serotype used (AAV1 vs. AAV2) or the method of vector production (TT vs. PCL). It seems that broader distribution of infusate within the infusion site (striatum) was a key driver of the extent of transduction in the cortex. One NHP (Subject No. 1; AAV1-eGFP [TT]) showed a particularly robust spread of GFP expression into cortical regions (layer IV and V) of the entire brain (both frontal and occipital—see FIG. 7). Other animals showed variability in cortical expression associated with variations both in the extent and in localized anatomical regions within caudate and putamen. Since pre- and commissural regions of the striatum were targeted, GFP was detected more in frontal and parietal cortical regions and less in the occipital cortex. Histological analysis for each animal is summarized below (grouped by treatment group).

Treatment Group 2 (ssAAV2/1-CBA-eGFP TT)

Immunohistochemical evaluation of eGFP expression in the whole brain revealed robust signal in the targeted sites (both putamens and caudate nuclei) and projected structures (globus pallidus, substantia nigra, thalamus, subthalamic nucleus, and cortical regions).

Subject number 1. Subject showed a particularly robust spread of GFP expression to cortical regions (layer 4 and 5) of the entire brain (both frontal and occipital). The morphology of the GFP-positive cells implied both neuronal and astrocytic transduction, which was later confirmed by double immunofluorescence staining (see below). The calculation of GFP expression coverage showed that 91% of the entire cortex (see Table 7) was transduced (this calculation was done by projecting the extent of GFP signal onto MRI scans of the analyzed monkey brain).

Subject number 2. Subject showed robust transduction in putamens and caudate nuclei as well as globus pallidus and substantia nigra of both hemispheres. The projection of GFP expression to cortex was less pronounced than in subject number 1 and was observed mainly in the frontal regions of the cortex. Although GFP signal was also detected in occipital cortex, the density of GFP-positive cells was significantly lower. The cortical GFP expression coverage was accounted for 50% (Table 7). Similarly as in subject number 1, GFP-positive cells had both neuronal and astrocytic morphology, which was confirmed by double immunofluorescence.

Subject number 3. Subject showed strong GFP expression in putamens and caudate nuclei as well as all projected structures (globus pallidus, substantia nigra, subthalamic nucleus, thalamus, and cortex). Although GFP signal was clearly detected in some regions of cortex, GFP expression was accounted for only 41% of its overall cortical coverage (the lowest in all tested monkeys; see Table 7). Both neurons and astrocytes were transduced. A large part of the right anterior corona radiate also showed GFP-positive signal, most likely as a result of vector spillage from the cannula penetrating to the striatum.

Treatment Group 3 (ssAAV2/2-CBA-eGFP TT)

Subject number 6. Subject showed a strong GFP signal in both targeted structures (putamen and caudate nucleus). Densely scattered positive cells were detected in both of those regions. The GFP expression spread also to frontal cortical regions, globus pallidus, substantia nigra, subthalamic nucleus, and some parts of thalamus. The GFP expression coverage in the cortex accounted for 75% (Table 7). GFP-positive cells had mostly neuronal morphology, which was later confirmed by double immunofluorescence. GFP-positive cells of astrocyte shape were detected in the internal capsule as well as in a few cortical spots and closely neighboring white matter areas with clearly visible tracks of the infusion cannulas.

Subject number 7. Subject showed GFP-positive signal within the right and left striatum (both putamen and caudate nucleus). Its distribution was rather poor and pattern appeared "spotty" rather than uniform when compared to other infused monkeys. Consequently, the GFP signal in all projected brain structures appeared weaker as well. The GFP expression coverage in the cortex accounted for 47% (Table 7). GFP-positive cells had mostly neuronal morphology, which was later confirmed by double immunofluorescence. GFP-positive cells of astrocyte shape were detected in the internal capsule as well as in a few cortical spots and closely neighboring white matter areas with clearly visible tracks of the infusion cannulas.

Treatment Group 4 (ssAAV2/1-CBA-eGFP PCL)

Subject number 4. Subject showed very robust GFP expression in targeted structures, putamen and caudate nucleus. GFP-positive signal was also detected in globus pallidus, substantia nigra, subthalamic nucleus, thalamus and cortical regions. The GFP expression coverage in the cortex accounted for 61% (Table 7). Anterior part of the corona *radiata* also showed GFP-positive signal, mostly likely as a result of vector spillage from the cannulas penetrating to the striatum. Positive cells had both neuronal and astrocytic morphology, which was later confirmed by double immunofluorescence.

Subject number 5. Subject showed robust GFP expression in the striatum (both putamen and caudate nucleus). GFP-signal was also detected in projected structures (globus pallidus, substantia nigra, subthalamic nucleus, thalamus and cortical regions). The GFP expression coverage in the cortex accounted for 68% (Table 7). Anterior part of the corona radiata also showed GFP-positive signal, mostly likely as a result of vector spillage from the cannulas penetrating to the striatum. Positive cells had both neuronal and astrocytic morphology.

Treatment Group 5 (ssAAV2/2-CBA-eGFP PCL)

Subject number 9. Subject showed very robust GFP expression in the striatum (both putamen and caudate nucleus). GFP signal was also detected in projected structures (globus pallidus, substantia nigra, subthalamic nucleus, thalamus and cortical regions). The GFP expression coverage in the cortex accounted for 73% (Table 7). GFP-positive cells had mostly neuronal morphology although GFP-positive cells of astrocyte shape were also detected within white matter tracts (internal capsule) and immediate vicinity of cannula tracks.

Subject number 8. Subject showed robust GFP expression in the striatum and projected structures (globus pallidus, substantia nigra, subthalamic nucleus, thalamus and cortical regions). The GFP expression coverage in the cortex accounted for 50% (Table 7). GFP-positive cells had mostly neuronal morphology although GFP+ cells of astrocyte shape were also detected within white matter tracts (internal capsule, corona *radiata*) and in the immediate vicinity of cannula tracks.

Double Immunofluorescence

Figure 9B:
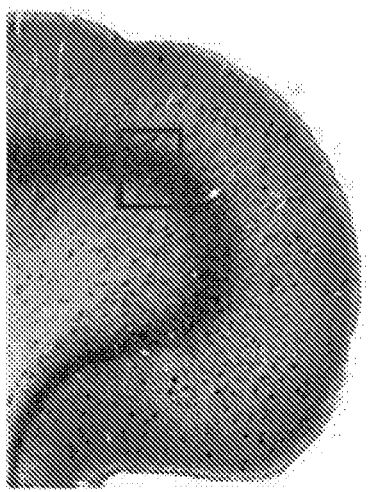
FIGS. 9A-9H show GFP expression in the NHP brain transduced with AAV1-eGFP and AAV2-eGFP.
Figure 9D:
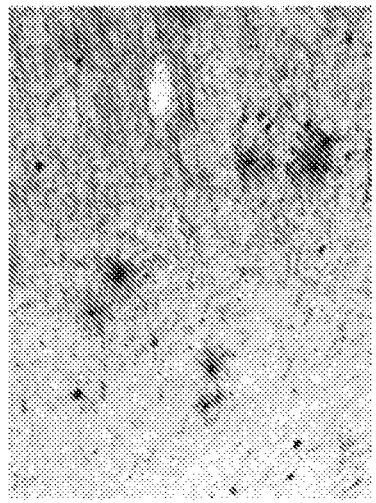
Figure 9A:
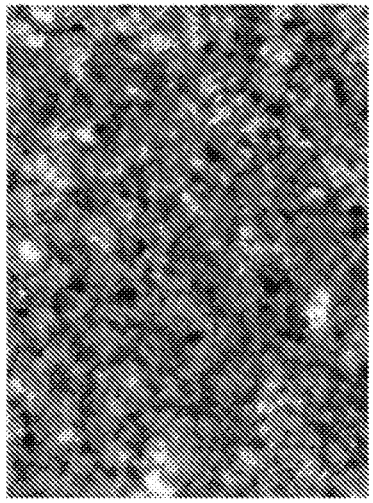
Figure 9C:
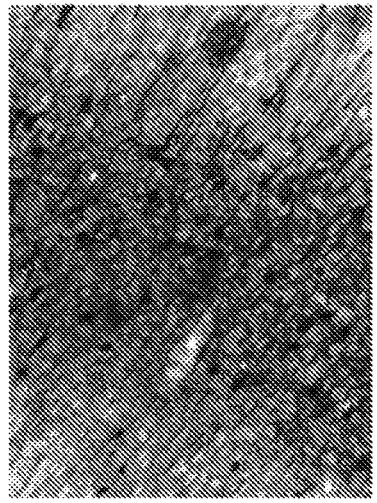
Figure 9F:
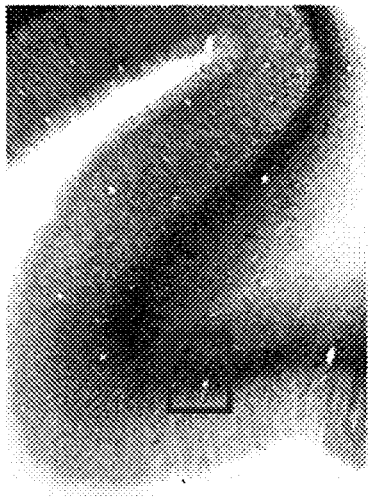
Figure 9H:
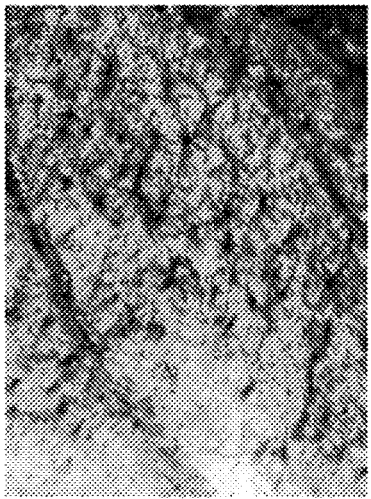
Figure 9E:
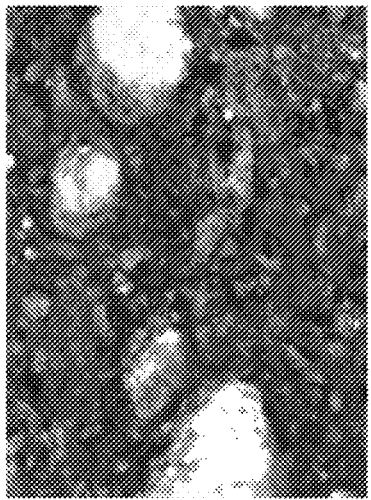
Figure 9G:
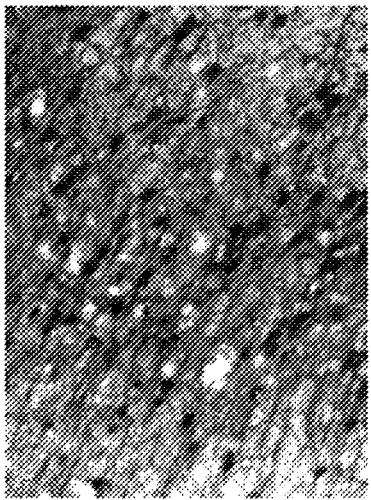

For both groups of NHPs transduced with AAV1-eGFP vectors (TT and PCL), the morphology of GFP-positive cells suggested both neuronal and astrocytic transduction (FIGS. 9A-9D). This was confirmed by double immunofluorescence staining with a combination of antibodies against GFP and NeuN (neuronal marker) or GFP and S-100 (astrocytic marker) (FIGS. 10A-10C). In contrast, AAV2-eGFP (both TT and PCL) directed predominantly neuronal transduction (FIGS. 9E-9G and 10D). GFP-positive cells of astrocytic lineage were also detected in the internal capsule (FIG. 9H) as well as in cortical regions of white matter where the infusion cannula tracks were visible.

Figure 11A:
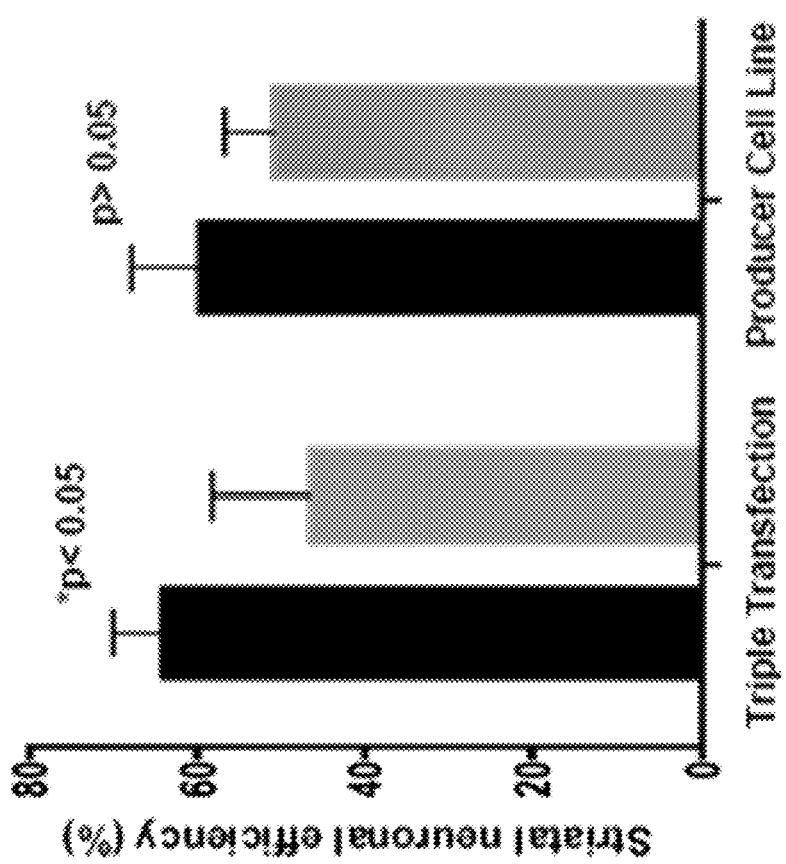
FIGS. 11A-11C show the efficiency of neuronal transduction in the striatum of NHP injected with AAV1-eGFP and AAV2-eGFP. Double immunofluorescence staining against GFP and neuronal marker NeuN of monkey brain sections was performed to calculate the efficiency of neuronal transduction within the striatum (target structure) and cortical regions. For the striatum, the efficiency of transduction was calculated in the primary area of GFP transduction (PAT) where signal was robust with densely distributed GFP+ neurons (FIG. 11A). Neurons were also detected in regions outside the primary areas of GFP transduction (OPAT.

Based on double immunofluorescence, the efficiency of neuronal transduction in the striatum and cortical regions was calculated (at the coronal plane of the infusion site) for all NHPs. FIG. 11A summarizes the findings in the striatum. Individual calculations for each animal are shown in Table 8 below.

TABLE 8

Efficiency of neuronal transduction by AAV1-eGFP and AAV2-eGFP vectors within the striatal primary areas of transduction (PAT) and the cortex of the non-human primate brain.

| Subject No. | 1 | 2 | 3 | 6 | 7 |
|---|---|---|---|---|---|
| Targeted region | AAV1-eGFP (TT) | AAV1-eGFP (TT) | AAV1-eGFP (TT) | AAV2-eGFP (TT) | AAV2-eGFP (TT) |
| Left putamen | 57.0 ± 7.75% | 64.4 ± 11.75% | 54.7 ± 11.4% | 36.5 ± 8.8% | 59.6 ± 12.8% |
| Right putamen | 68.0 ± 15.9% | 70.1 ± 14.4% | 66.2 ± 20.0% | 33.1 ± 11.7% | 56.3 ± 7.7% |
| Left caudate | 70.1 ± 7.4% | 72.6 ± 13.3% | 56.4 ± 6.02% | 33.7 ± 11.4% | 61.4 ± 13.1% |
| Right caudate | 65.6 ± 7.75% | 65.1 ± 13.9% | 60.1 ± 5.65% | 42.7 ± 10.5% | 49.4 ± 13.5% |
| Cortex* | 24.8 ± 3.04% | 4.04 ± 2.77% | 6.75 ± 3.38% | 8.56 ± 2.81% | 3.36 ± 1.83% |

TABLE 8-continued

Efficiency of neuronal transduction by AAV1-eGFP and AAV2-eGFP vectors within the striatal primary areas of transduction (PAT) and the cortex of the non-human primate brain.

| Subject No. | 5 | 4 | 9 | 8 |
|---|---|---|---|---|
| Targeted region | AAV1-eGFP (PCL) | AAV1-eGFP (PCL) | AAV2-eGFP (PCL) | AAV2-eGFP (PCL) |
| Left putamen | 58.6 ± 7.61% | 57.1 ± 10.5% | 53.1 ± 12.7% | 52.4 ± 11.8% |
| Right putamen | 50.5 ± 9.78% | 73.2 ± 9.88% | 52.1 ± 10.6% | 50.1 ± 4.5% |
| Left caudate | 57.0 ± 7.13% | 51.8 ± 9.42% | 43.0 ± 14.5% | 43.4 ± 8.5% |
| Right caudate | 59.1 ± 9.11% | 70.5 ± 8.38% | 52.1 ± 7.22% | 61.2 ± 12.9% |
| Cortex* | 16.3 ± 5.09% | 16.1 ± 6.59% | 23.0 ± 7.55% | 18.6 ± 5.36% |

*Neuronal transduction by AAV vectors was also detected in cortical regions projected from the striatum (target structure). The efficiency of cortical transduction was calculated in coronal sections of the striatal plane with injection sites.

Striatal neuronal transduction in the regions of primary transduction, indicated by MRI, ranged from 50% to 65%. The highest efficiency of transduction was observed in NHPs infused with AAV1-eGFP (TT) with the mean of 64.2±5.9% and the lowest in group AAV2-eGFP (TT) with the mean of 46.6±11.7% ($p<0.05$; 2-way ANOVA). This suggests that serotype AAV1 has ~18% higher efficiency in transducing neurons than AAV2. AAV1-eGFP produced by PCL evinced a weaker trend ($p>0.05$; 2-way ANOVA) toward transducing more neurons (59.7±8.1%) than AAV2-eGFP (50.1±5.8%).

Figure 11B:
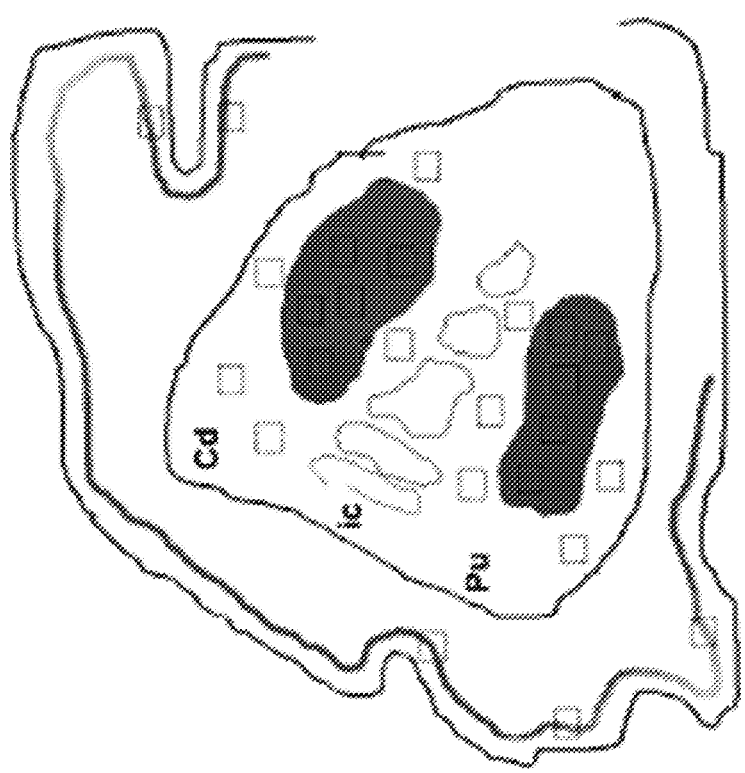
Figure 11C:
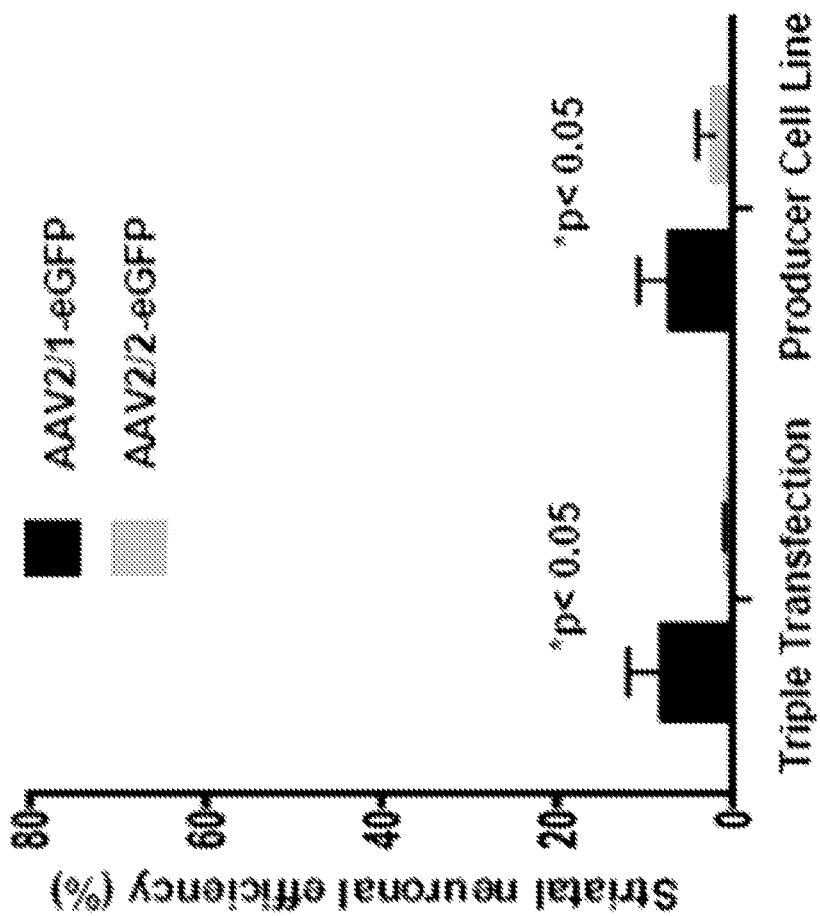

The above calculations were derived from areas of strong GFP transduction as defined by MRI, (primary area of transduction—PAT). In addition, the efficiency of neuronal striatal transduction in regions outside the PAT was calculated to see if GFP-positive cells could also be detected outside the clear boundary of strong GFP signal ("outside the primary area of transduction"—OPAT), suggesting perhaps that all tested vectors spread in the same manner. The scheme of how these areas were chosen (random selection of 5 counting frames) is illustrated in FIG. 11B. A dramatic difference in the estimation of transduction efficiency in OPAT between serotypes AAV1 and AAV2 was observed (FIG. 11C), with AAV1 transducing many more neurons than AAV2 (8.1±3.8% vs. 0.74±0.25% for TT groups and 7.2±3.5% vs. 2.16±1.8% for PCL groups; $p<0.05$ in both comparisons 2-way ANOVA;). Individual calculations for each animal are shown in Table 9 below.

In addition, the efficiency of transduction in cortical regions projecting to the striatum was calculated. Since the degree of cortical coverage varied among animals, random cortical areas were counted in sections with adjacent GFP-positive striatum. There was an evident discrepancy observed among the animals (Table 8) with no clear correlation with the serotype used. The mean neuronal transduction efficiency for AAV1 was 13.6±8.3% vs. 13.4±9.0% for AAV2 ($p>0.97$).

Figures 10D, 10E:
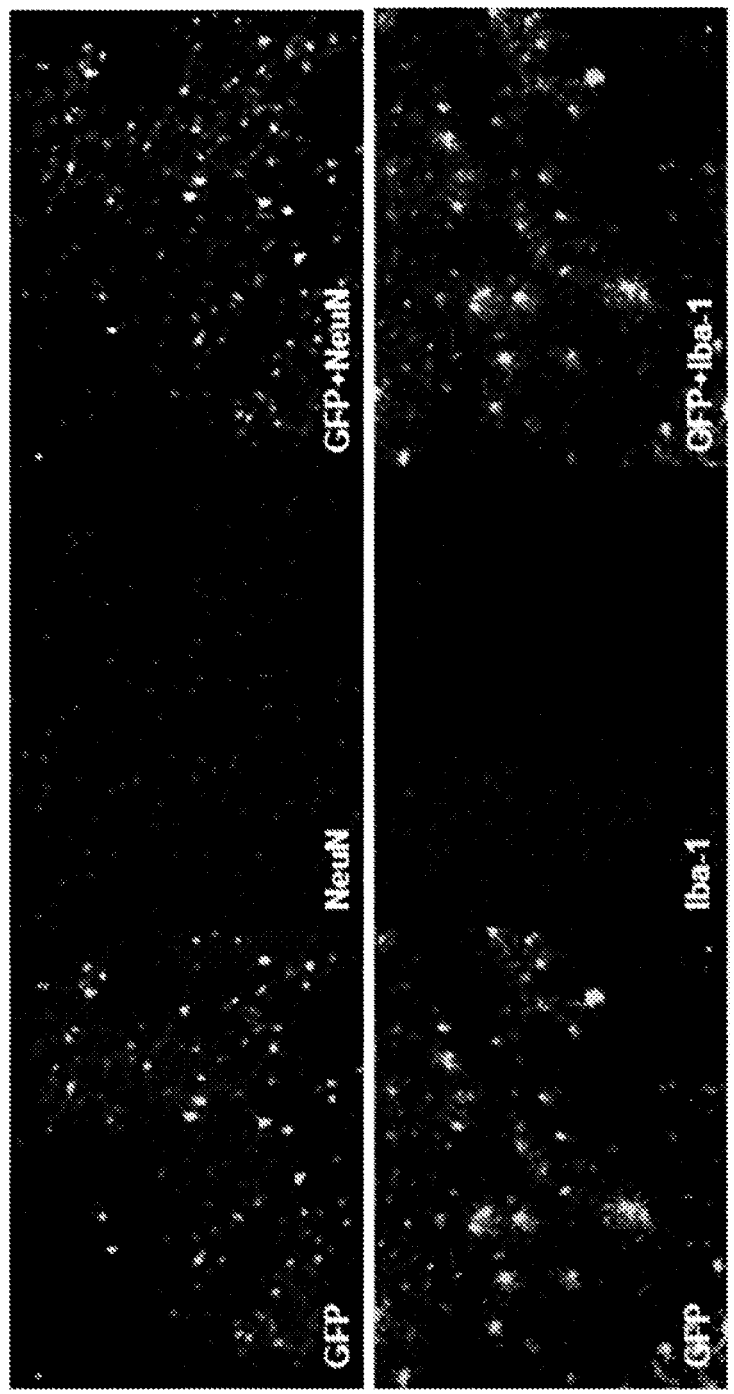

As mentioned above, AAV1-eGFP transduced many more astrocytes (S-100 marker) than neurons. GFP-positive astrocytes were detected in the sites of primary transduction (striatum) as well as in cortical regions projecting to striatum. Examples of GFP-transduced astrocytes are shown in FIG. 10C. For AAV2-eGFP vectors, only sporadic GFP+ astrocytes could be detected surrounding the track of the infusion cannulas. To determine whether the vectors transduced other antigen-presenting cells in the brain, representative brain sections from all monkeys were co-stained with antibodies against GFP and Iba-1, specific for microglia. None of the animals showed double-labeled cells, excluding this possibility (FIG. 10E). In turn, in all tested monkeys, staining against Olig-2, the marker for oligodendrocytes, showed only a few cells positive for both GFP and Olig-2. Those sparse cells were detected mainly in the vicinity of the cannula tracks (data not shown).

Brain sections were stained with hematoxylin-eosin (H&E) to determine whether these vectors triggered neuroinflammation. Sections were examined mainly for the

TABLE 9

Efficiency of neuronal transduction by AAV1-eGFP and AAV2-eGFP vectors within the striatum but outside the primary areas of transduction (OPAT) of the non-human primate brain.

| Subject No. | 1 | 2 | 3 | 6 | 7 |
|---|---|---|---|---|---|
| Targeted region | AAV1-eGFP (TT) | AAV1-eGFP (TT) | AAV1-eGFP (TT) | AAV2-eGFP (TT) | AAV2-eGFP (TT) |
| Left putamen | 14.2 ± 9.49% | 6.88 ± 6.48% | 14.2 ± 7.87% | 0.57 ± 0.53% | 1.28 ± 0.69% |
| Right putamen | 4.36 ± 2.06% | 4.04 ± 4.36% | 5.35 ± 3.68% | 0.51 ± 0.61% | 0.80 ± 0.55% |
| Left caudate | 10.1 ± 7.42% | 2.01 ± 2.54% | 9.11 ± 5.24% | 0.86 ± 0.95% | 0.71 ± 0.36% |
| Right caudate | 10.8 ± 6.37% | 6.89 ± 5.62% | 8.76 ± 3.50% | 0.51 ± 0.91% | 0.71 ± 0.93% |

Figures 12A, 12B:
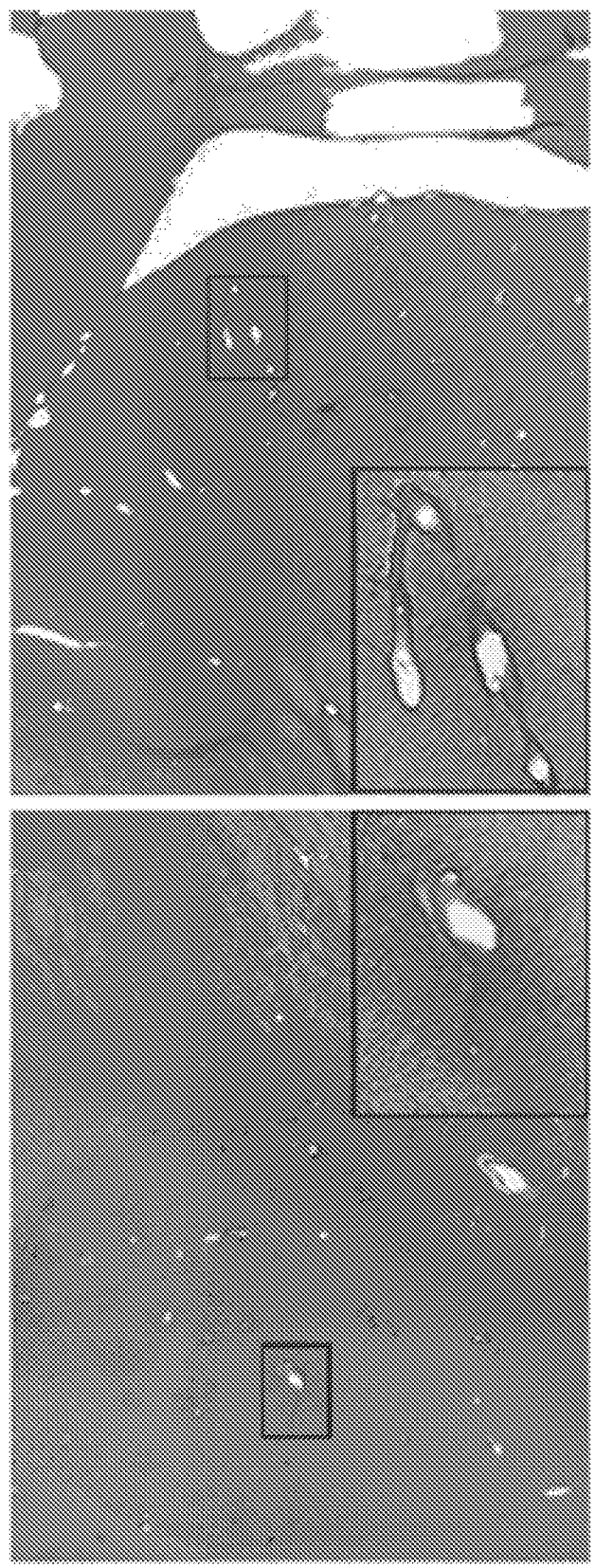
FIGS. 12A & 12B show vector-related histological findings. Independent evaluation of hematoxylin and eosin (H&E) staining of coronal sections from areas of primary transduction (PAT) revealed normal gliosis related to cannula insertion in all experimental groups. H&E staining also revealed perivascular cellular infiltrates in all animals regardless of the vector used. The incidence and severity of perivascular cuffs was increased in groups injected with AAV1, especially when the vector was prepared by the TT method.

| Subject No. | 5 | 4 | 9 | 8 |
|---|---|---|---|---|
| Targeted region | AAV1-eGFP (PCL) | AAV1-eGFP (PCL) | AAV2-eGFP (PCL) | AAV2-eGFP (PCL) |
| Left putamen | 2.82 ± 1.99% | 12.3 ± 6.27% | 1.16 ± 0.87% | 1.98 ± 2.20% |
| Right putamen | 3.59 ± 3.01% | 9.83 ± 5.64% | 1.17 ± 1.18% | 2.68 ± 0.90% |
| Left caudate | 7.11 ± 4.61% | 10.7 ± 5.53% | 0.85 ± 0.63% | 3.61 ± 3.22% |
| Right caudate | 6.95 ± 5.82% | 4.18 ± 2.94% | 1.13 ± 0.65% | 1.99 ± 1.26% | presence of perivascular cuffing—the accumulation of lymphocytes or plasma cells in a dense mass around blood vessels. Although varying degrees of such infiltrates were detected in all monkeys, no other vector/transgene-related histological findings were observed. However, AAV1 was observed to cause slightly more pronounced infiltration of macrophages and lymphocytes within the primary areas of transduction than did AAV2 (FIGS. 12A and 12B). Also, vectors produced by Triple Transfection seemed to cause more extensive perivascular cuffing than vectors generated by Producer Cell Line process. Of note, no infiltrates were detected in projecting areas of transduction (cortical regions).

Example 4: Absence of Detectable GFP Expression in Peripheral Tissue Outside of the Central Nervous System (CNS)

Peripheral organ tissues, including kidney, liver, lung, heart, and spleen, were collected at necropsy to evaluate whether CED administered AAV-GFP transgene expression could be detected outside the CNS.

Results

Figure 13A:
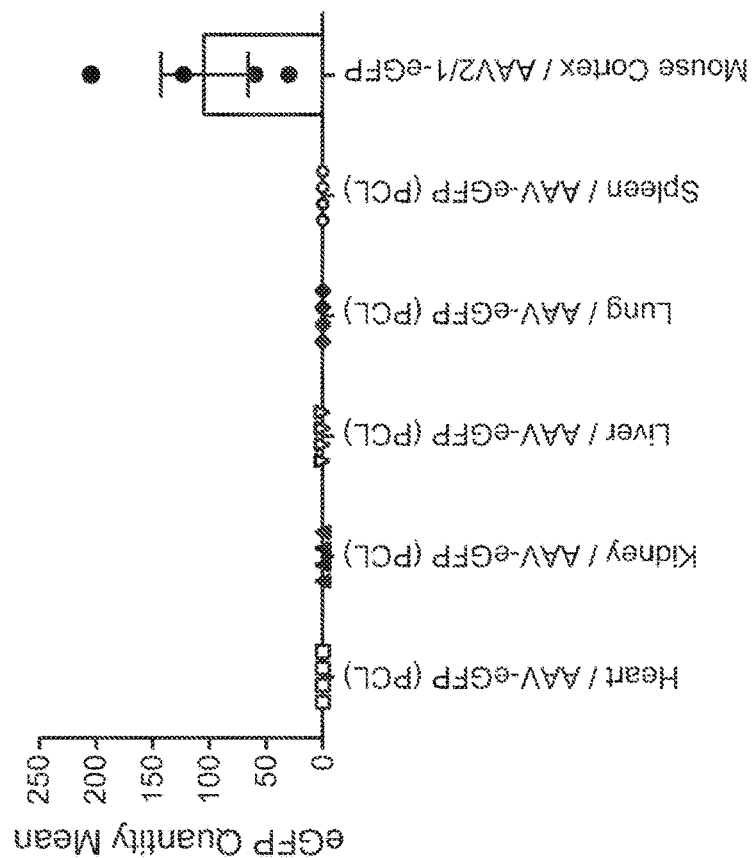
FIGS. 13A & 13B show quantitative PCT (QPCR) analysis of eGFP mRNA expression in liver, spleen, heart, kidney, and lung samples 1 month following injection of AAV1-eGFP into Rhesus monkey caudate and putamen.
Figure 13B:
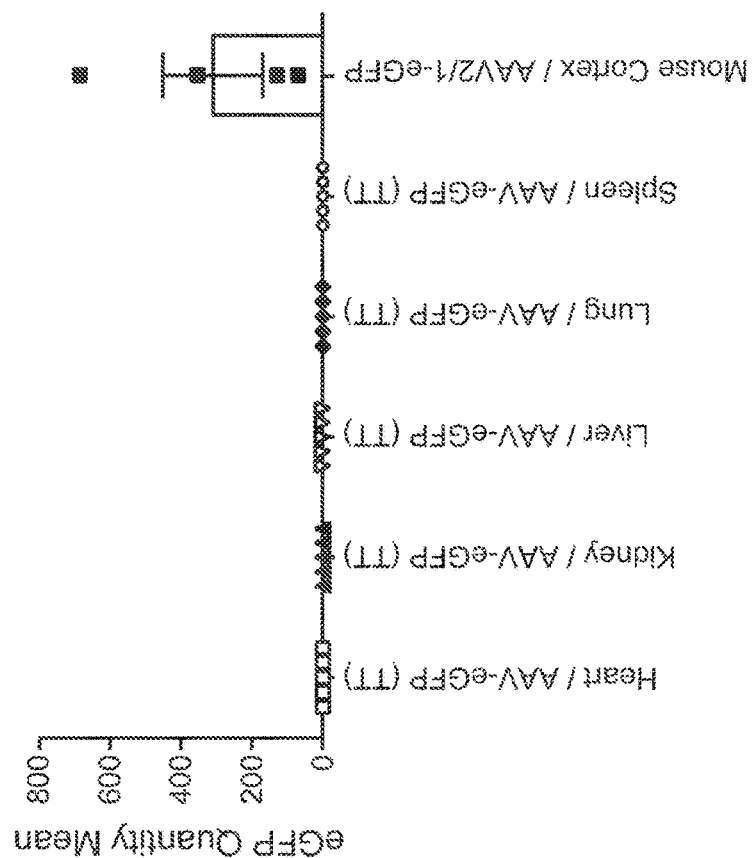

No detectable levels of GFP were detected in any of the organs collected. Both AAV-GFP (TT) (FIG. 13A) and AAV-GFP (PCL) (FIG. 13B) vectors showed no detectable peripheral expression of GFP. Mouse brain tissue injected with AAV2/1-GFP (TT) vectors were used as positive controls for this assay.

CONCLUSIONS

Efficient delivery of therapeutic proteins to the brain remains a serious obstacle to achieving clinical efficacy while minimizing adverse effects. Developments in gene delivery have provided an opportunity to establish production of biologics within the brain parenchyma. These advances have led to the initiation of multiple clinical trials in which AAV vectors have become a preferred vector system for treating neurologic disorders. Although focal targeting of a specific nucleus can be reliably accomplished by stereotactic neurosurgical infusion, the extensive convoluted arrangement of the human cortex is not easily targeted by direct infusion of viral vectors. The difficulties in safely achieving widespread gene expression in the brain have hindered the development of potential treatments for neurologic diseases which require cortical delivery.

As described herein, AAV vectors (e.g., AAV1 and AAV2) are capable of providing extensive delivery to the entire primate striatum (caudate and putamen), as well as delivering to significant numbers of cells within the cerebral cortex (including frontal cortex, occipital cortex, and layer IV), thalamus, and hippocampus. GFP, a reporter protein with no known function in the cerebral cortex, was utilized in the studies discussed herein. AAV1 and AAV2-GFP infused into the caudate and putamen using a CED delivery method resulted in a high level of GFP expression in both caudate and putamen as well as several regions of the cortex. GFP-positive neurons in the frontal cortex were located >20 mm from the AAV-GFP infusion site, thereby demonstrating axonal transportation of the GFP protein and AAV vector. Without wishing to be bound by theory, because GFP remains cytoplasmic and is not a secreted protein, the presence of GFP in the cortex is thought to indicate direct cellular transduction and active transportation of AAV2 vector along single axonal projections. Huntington's disease is an exemplary disease for which striatal delivery of AAVs (e.g., CED striatal delivery) may be useful. Huntington's disease affects both striatal and cortical regions and thus a therapeutic strategy that targets both areas is ideal.

The findings disclosed herein underscore the potential for delivery of AAV vectors (e.g., AAV1 and AAV2) to transduce neurons located a considerable distance from the striatal infusion site. Intrastriatal administration of AAV vectors (e.g., AAV1 and AAV2) is therefore ideal for use in treating CNS disorders that require delivery of therapeutic molecules to the striatum and cortex, including but not limited to, Huntington's disease. In addition, as AAV vectors generated by the triple transfection method and producer cell line method show comparable transgene expression patterns and levels of transduction, triple transfection and producer cell line methods of generating AAV vectors are suitable for use in the present invention.

What is claimed is:

1. A method for delivering a recombinant adeno-associated viral (rAAV) particle comprising an AAV serotype 2 (AAV2) capsid to the central nervous system of a mammal comprising using a convection enhanced delivery system comprising a cannula to deliver a composition comprising the rAAV particle to the putamen of each hemisphere of the striatum at a rate from about 3 uL/min to about 5 µL/min, wherein the rAAV particle comprises an rAAV vector comprising a heterologous nucleic acid encoding amino acid decarboxylase and the rAAV vector is operably linked to a cytomegalovirus immediate early promoter, wherein the rAAV particle undergoes retrograde transport in the cerebral cortex, and wherein the heterologous nucleic acid is expressed in either the prefrontal association cortical areas and the extensive regions of the occipital cortex of the brain of the mammal.

2. The method of claim 1, wherein the viral titer of the rAAV particles is from $5 \times 10^{10}$ to $100 \times 10^{10}$ infectious units/mL.

3. The method of claim 1, wherein the viral titer of the rAAV particles is from $5 \times 10^{10}$ to $10 \times 10^{10}$ infectious units/mL.

4. The method of claim 1, wherein the viral titer of the rAAV particles is from $50 \times 10^{10}$ to $100 \times 10^{10}$ infectious units/mL.

5. The method of claim 1, wherein the viral titer of the rAAV particles is from $10 \times 10^{10}$ to $50 \times 10^{10}$ infectious units/mL.

6. The method of claim 1, wherein the viral titer of the rAAV particles is from $5 \times 10^{9}$ to $100 \times 10^{9}$ transducing units/mL.

7. The method of claim 1, wherein the viral titer of the rAAV particles is from $50 \times 10^{9}$ to $100 \times 10^{9}$ transducing units/mL.

8. The method of claim 1, wherein the viral titer of the rAAV particles is from $25 \times 10^{9}$ to $50 \times 10^{9}$ transducing units/ml.

9. The method of claim 1, wherein the viral titer of the rAAV particles is from $5 \times 10^{9}$ to $25 \times 10^{9}$ transducing units/mL.

10. The method of claim 1, wherein positioning of the cannula is monitored by MRI.

\* \* \* \* \*